United States Patent [19]
Yachi et al.

[11] Patent Number: 5,737,010
[45] Date of Patent: Apr. 7, 1998

[54] SYSTEM FOR CONNECTION AND DISCONNECTION IN MULTIPOINT CONFERENCE SYSTEM OF CASCADE CONFIGURATION

[75] Inventors: Takako Yachi; Nobuyuki Tamura, both of Kanazawa; Kazuto Ban; Tohru Andoh, both of Ishikawa, all of Japan

[73] Assignee: Fujitsu Limited, Kanagawa, Japan

[21] Appl. No.: 333,507

[22] Filed: Nov. 2, 1994

[30] Foreign Application Priority Data

Mar. 18, 1994 [JP] Japan ................... 6-049592

[51] Int. Cl.[6] ...................................... H04N 7/15
[52] U.S. Cl. .................. 348/15; 379/202; 370/261
[58] Field of Search ................... 348/15, 14, 16; 379/202, 203, 204, 205, 206, 207, 94, 96, 93; 370/62, 260, 261

[56] References Cited
U.S. PATENT DOCUMENTS 5,555,017  9/1996  Landante et al. .................. 348/15

Primary Examiner—Stella Woo
Attorney, Agent, or Firm—Helfgott & Karas, P.C.

[57] ABSTRACT

A system for connection and disconnection in a multipoint conference system of a cascade configuration, wherein when a list of line numbers of the MCUs and terminals engaging in the conference is input from an input unit of an MCU, a call origination/disconnection table is prepared comprised of the line numbers. When the table is prepared, a call origination/disconnection administrative unit identifies the terminals under the MCU and the other adjoining MCUs, calls and establishes a connection through lines, and, when the connections are completed, circulates a call origination/disconnection table to the other connected MCUs. These MCUs in turn then calls their terminals and their adjoining MCUs and so on until the end MCUs. Further, use is made of a connection list in which connection flags and the order of connection are successively written and use is made of a conference configuration list indicating the actual connections of the MCUs. This enables all the television conference terminals to be automatically connected and disconnected from a single location and enables MCUs which have become unnecessary to be automatically recognized and disconnected.

9 Claims, 51 Drawing Sheets

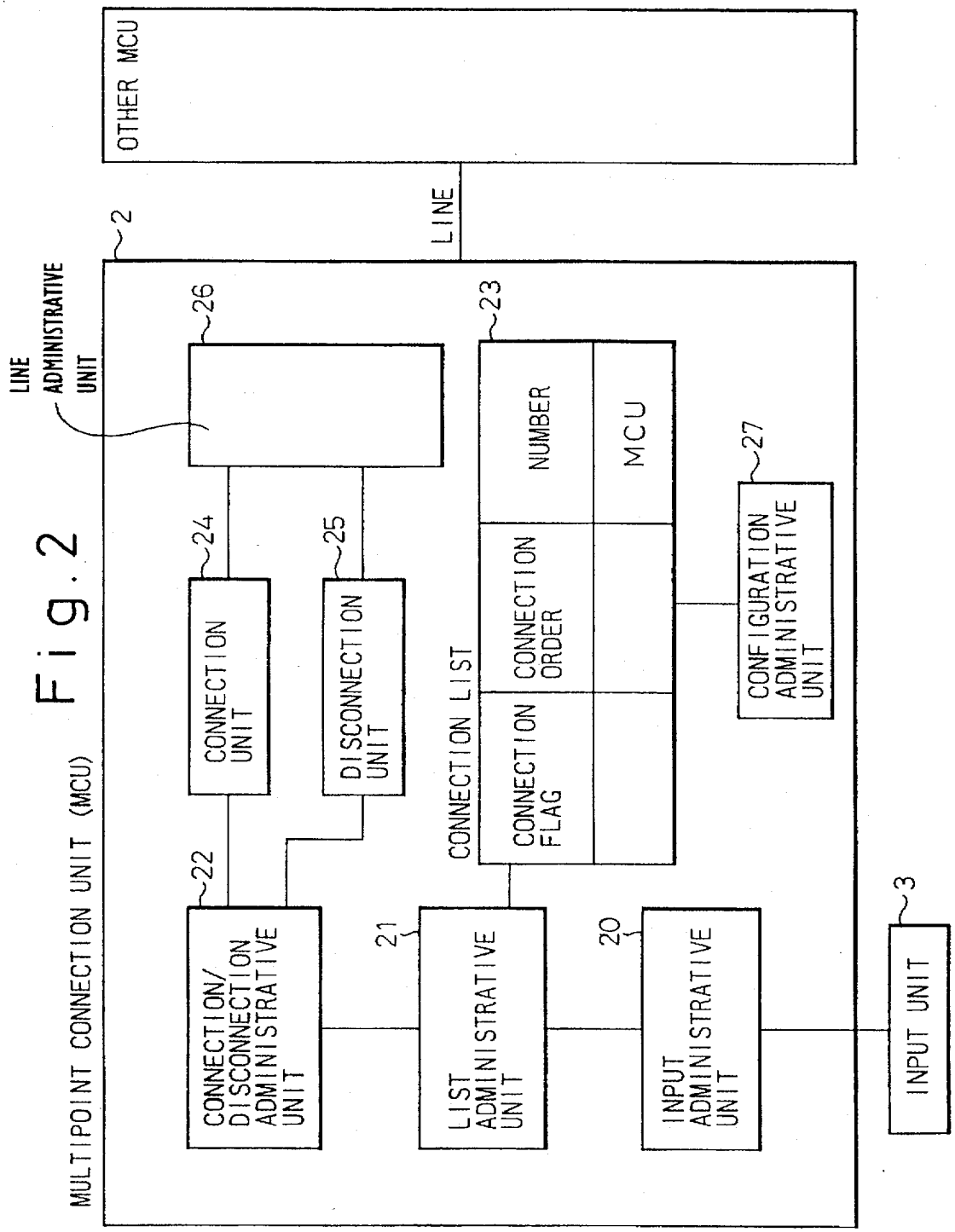

Fig. 3A

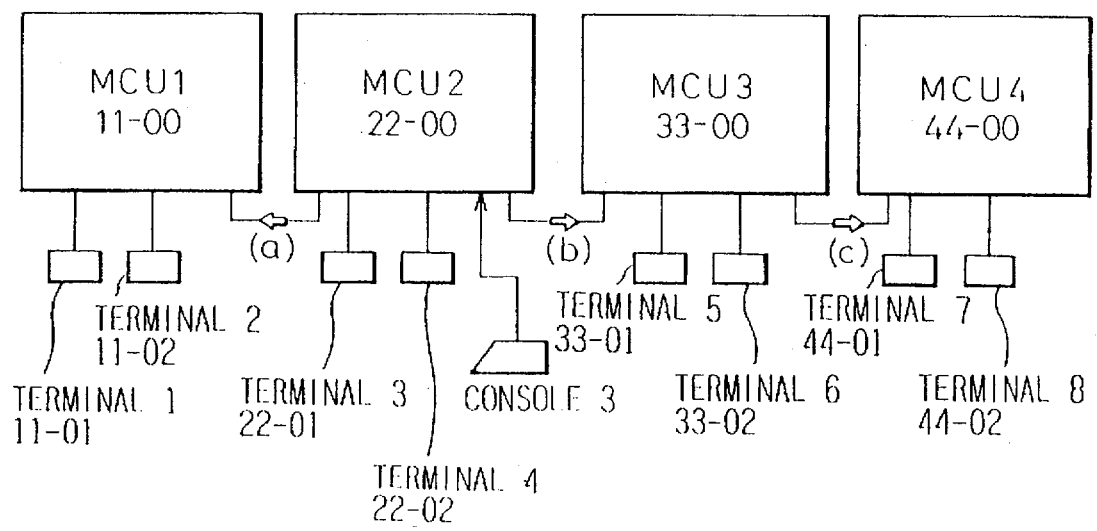

Fig. 3B

| | | |
|---:|:---|:---|
| MCU1 | MCU LINE NUMBER 11-00 | (i) |
| TELEVISION CONFERENCE TERMINAL 1 | TERMINAL NUMBER 11-01 | (ii) |
| TELEVISION CONFERENCE TERMINAL 2 | TERMINAL NUMBER 11-02 | (iii) |
| MCU2 | MCU LINE NUMBER 22-00 | (iv) |
| TELEVISION CONFERENCE TERMINAL 3 | TERMINAL NUMBER 22-01 | (v) |
| TELEVISION CONFERENCE TERMINAL 4 | TERMINAL NUMBER 22-02 | (vi) |
| MCU3 | MCU LINE NUMBER 33-00 | (vii) |
| TELEVISION CONFERENCE TERMINAL 5 | TERMINAL NUMBER 33-01 | (viii) |
| TELEVISION CONFERENCE TERMINAL 6 | TERMINAL NUMBER 33-02 | (ix) |
| MCU4 | MCU LINE NUMBER 44-00 | (x) |
| TELEVISION CONFERENCE TERMINAL 7 | TERMINAL NUMBER 44-01 | (xi) |
| TELEVISION CONFERENCE TERMINAL 8 | TERMINAL NUMBER 44-02 | (xii) |

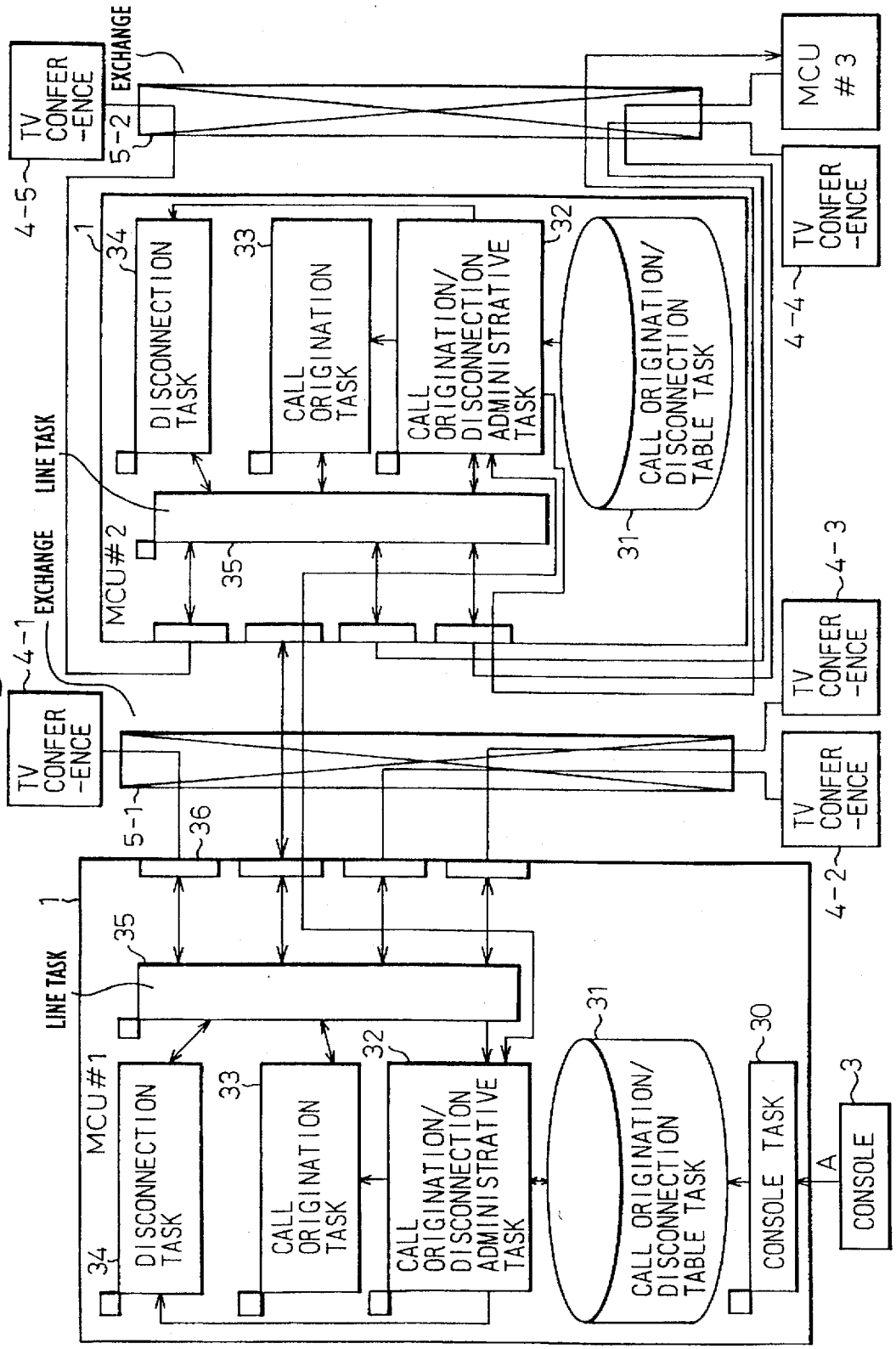

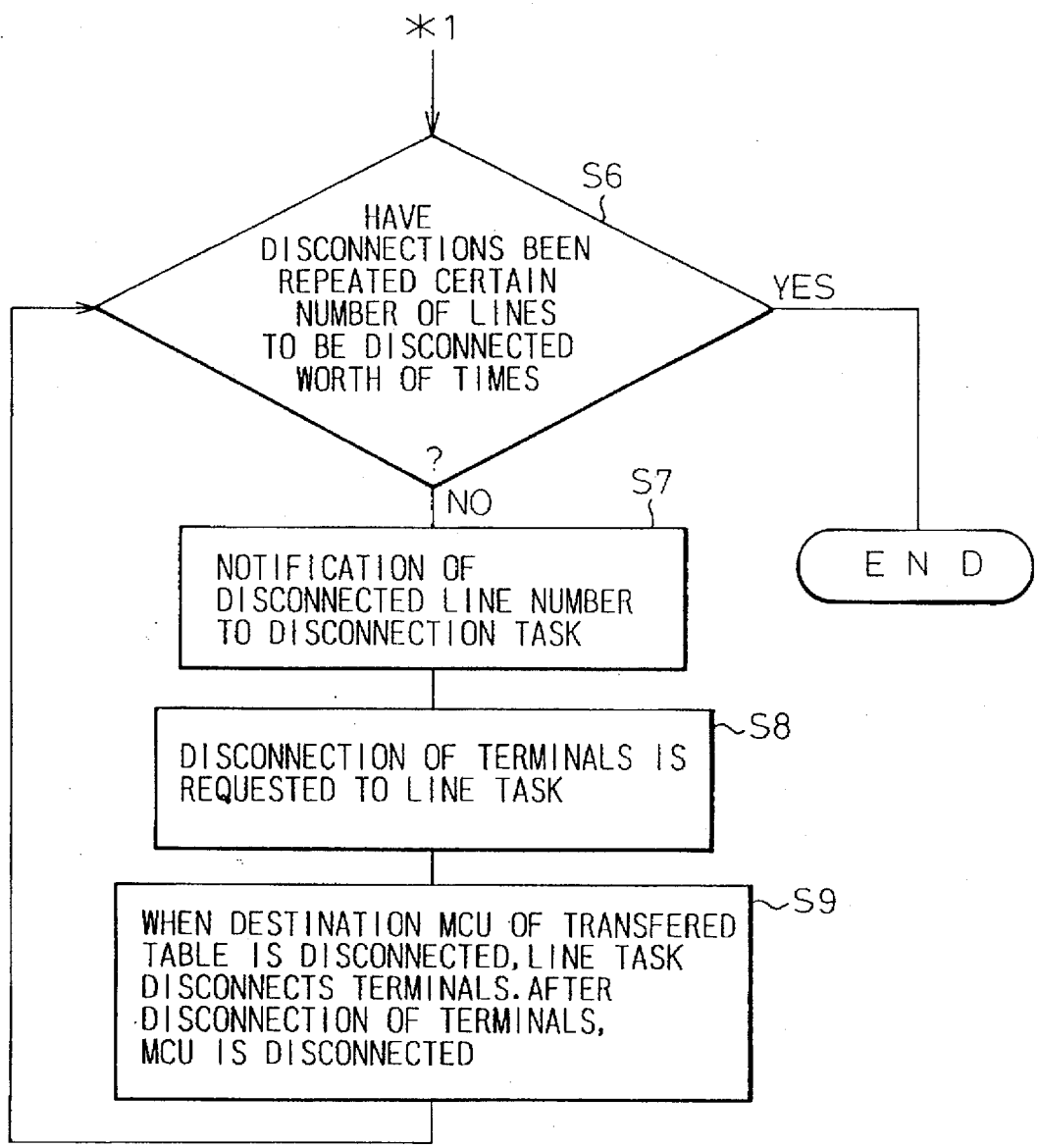

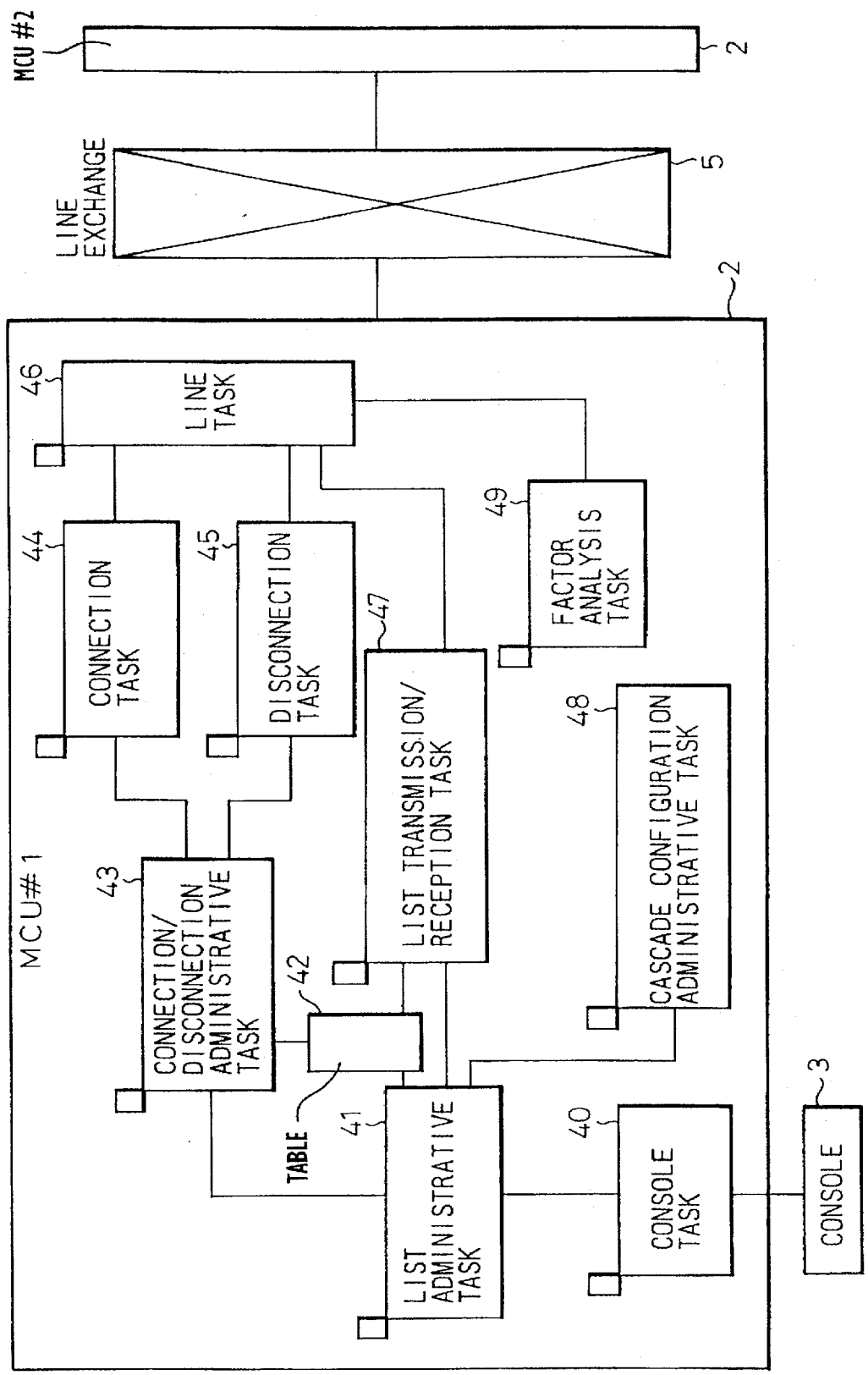

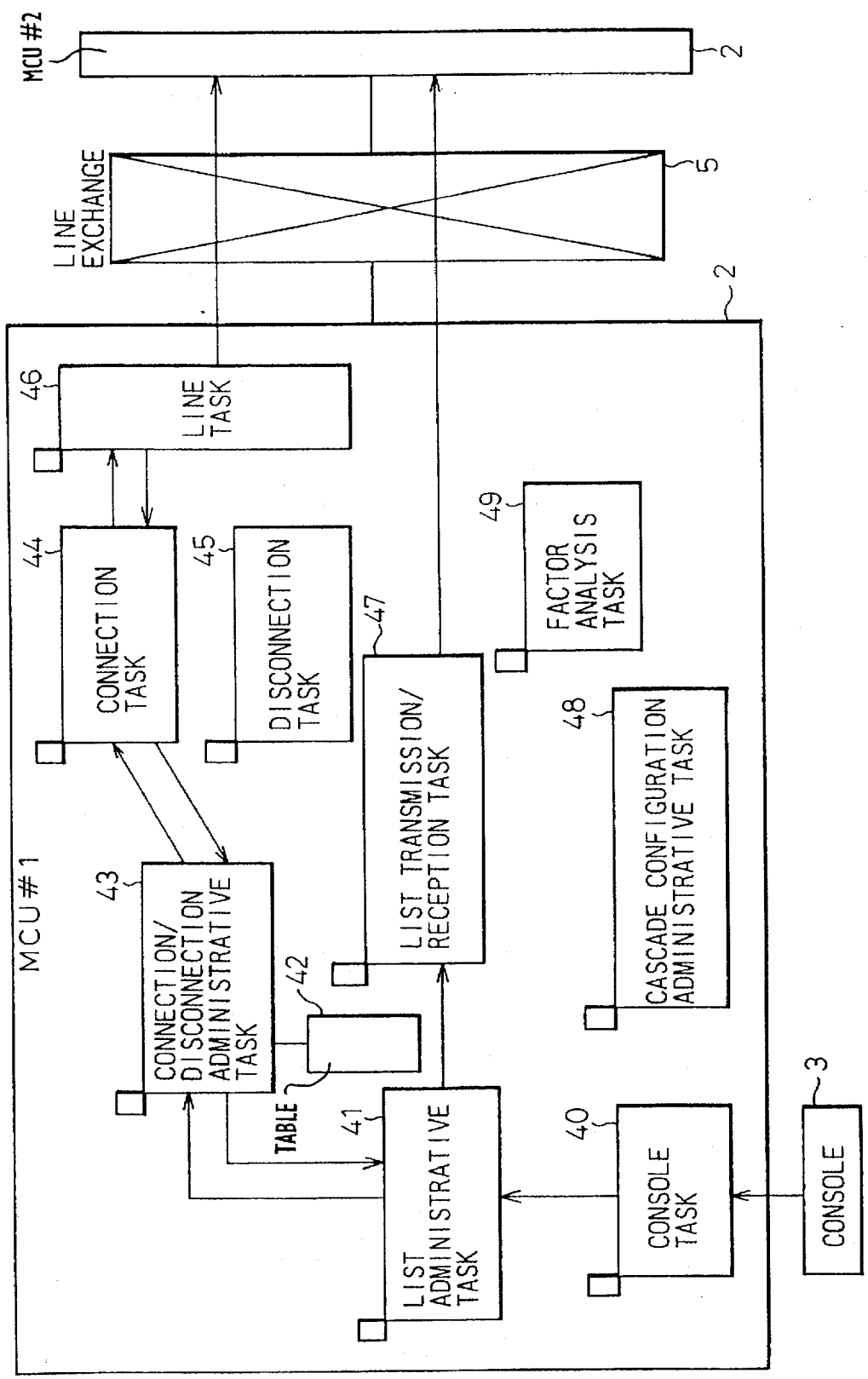

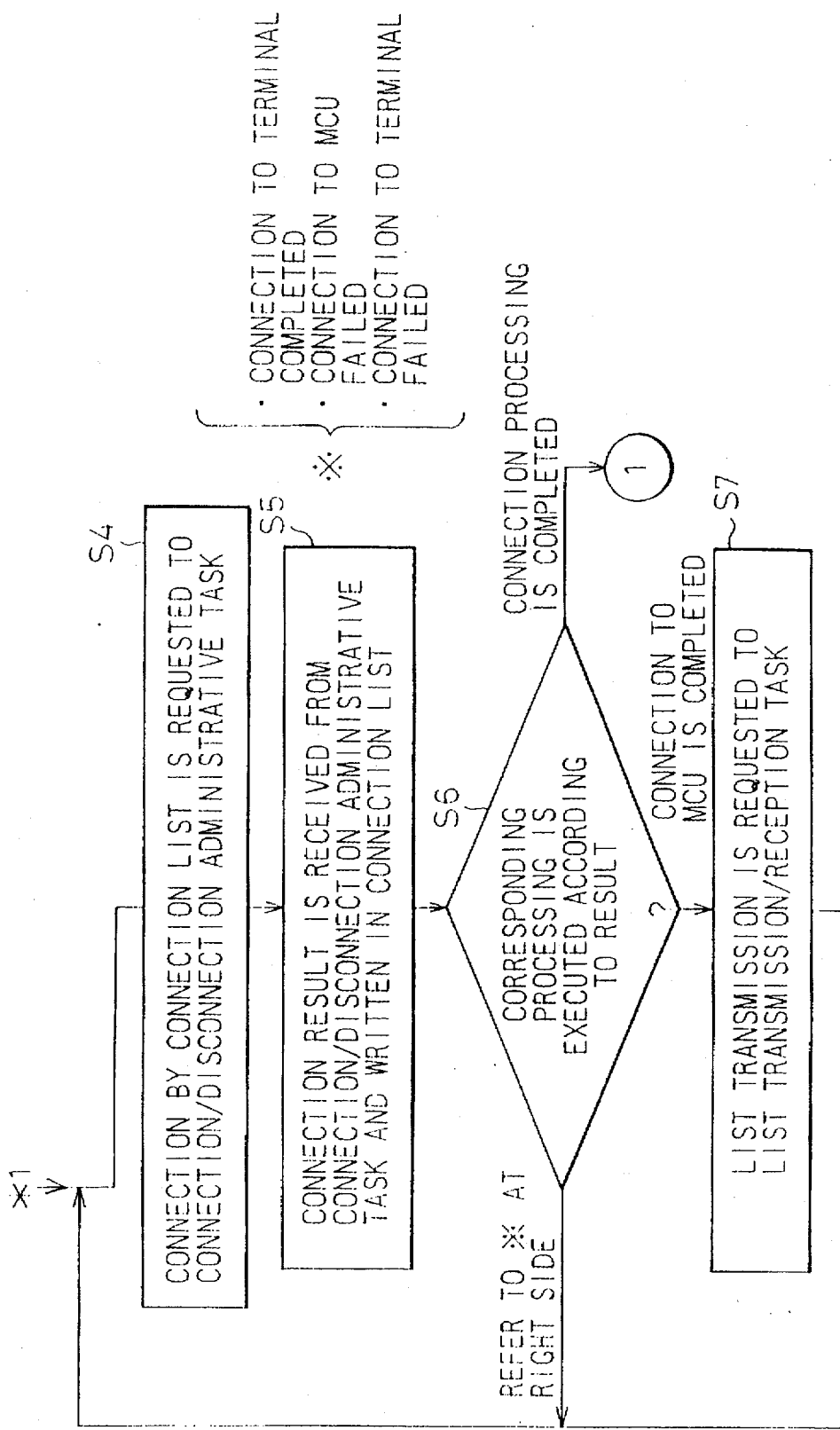

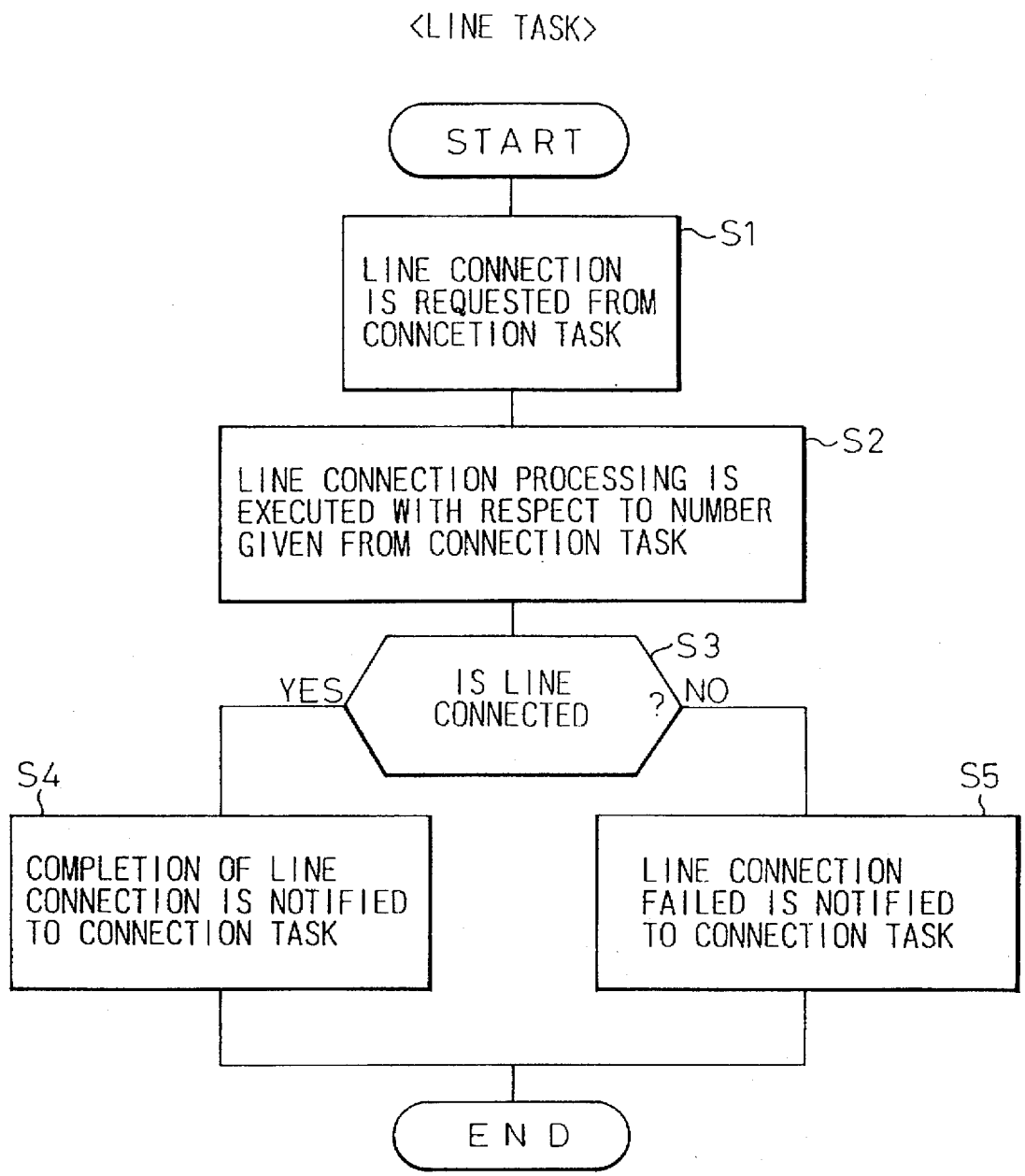

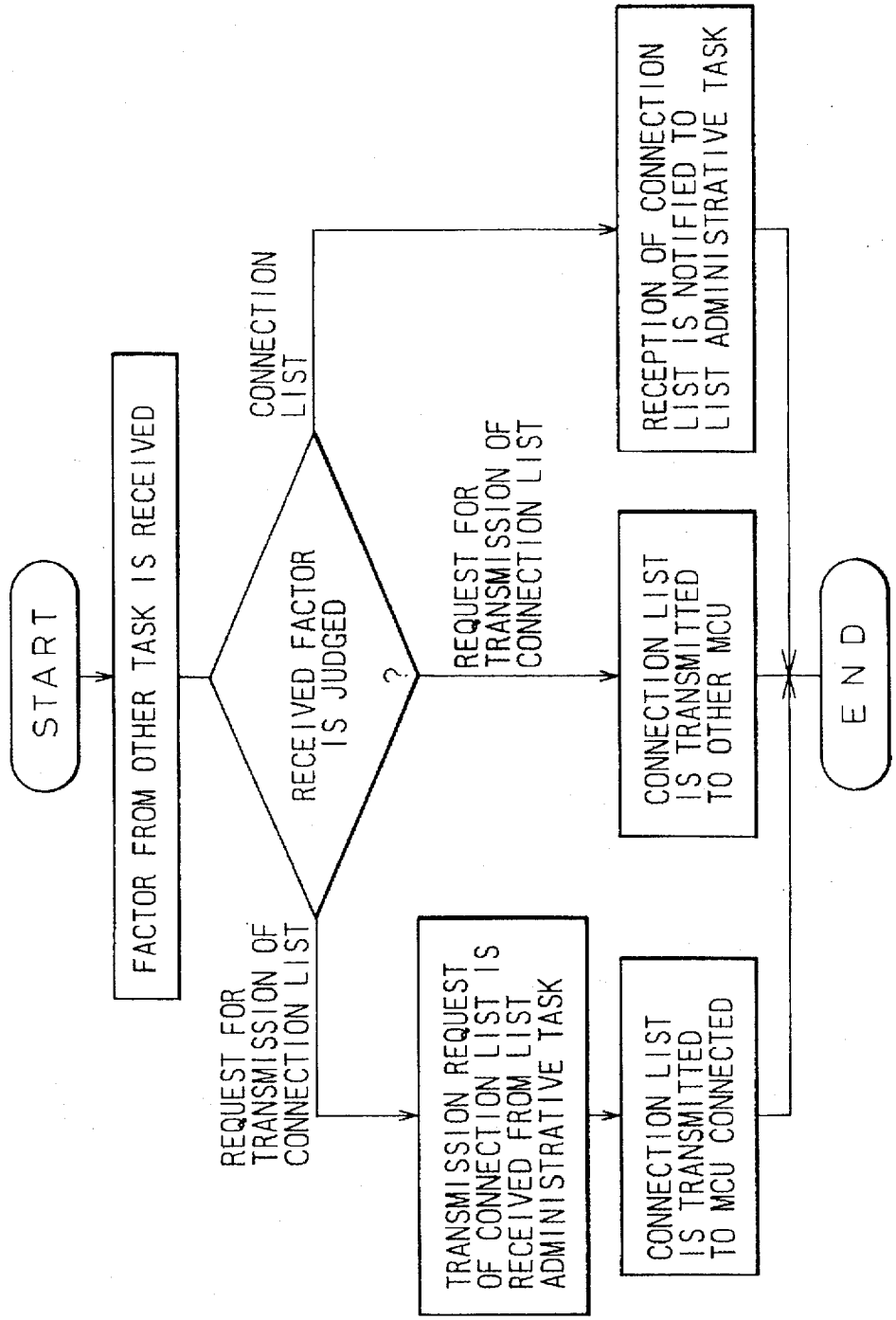

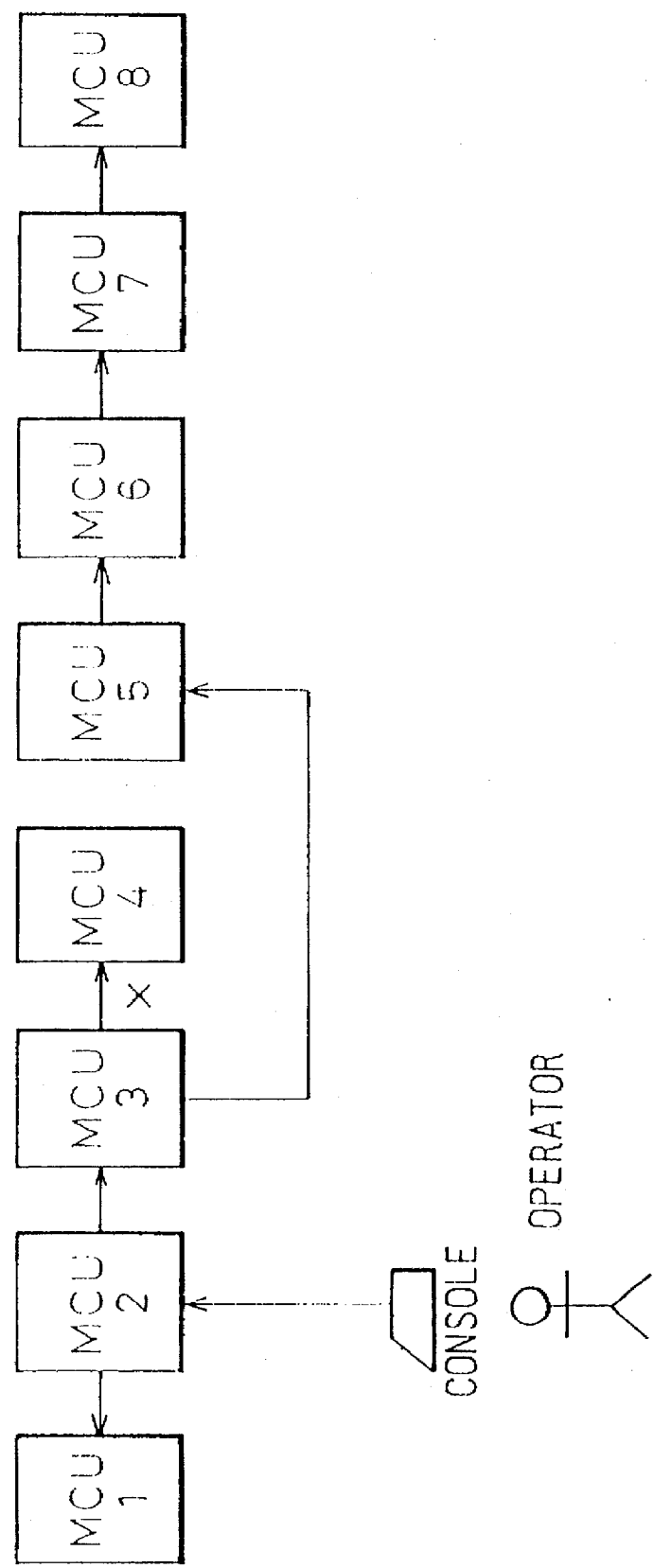

Fig.17B

CONNECTION LIST

| | |
|---|---|
| | MCU 1 NUMBER |
| | MCU 2 NUMBER |
| | MCU 3 NUMBER |
| | MCU 4 NUMBER |
| | MCU 5 NUMBER |
| | MCU 6 NUMBER |
| | MCU 7 NUMBER |
| | MCU 8 NUMBER |

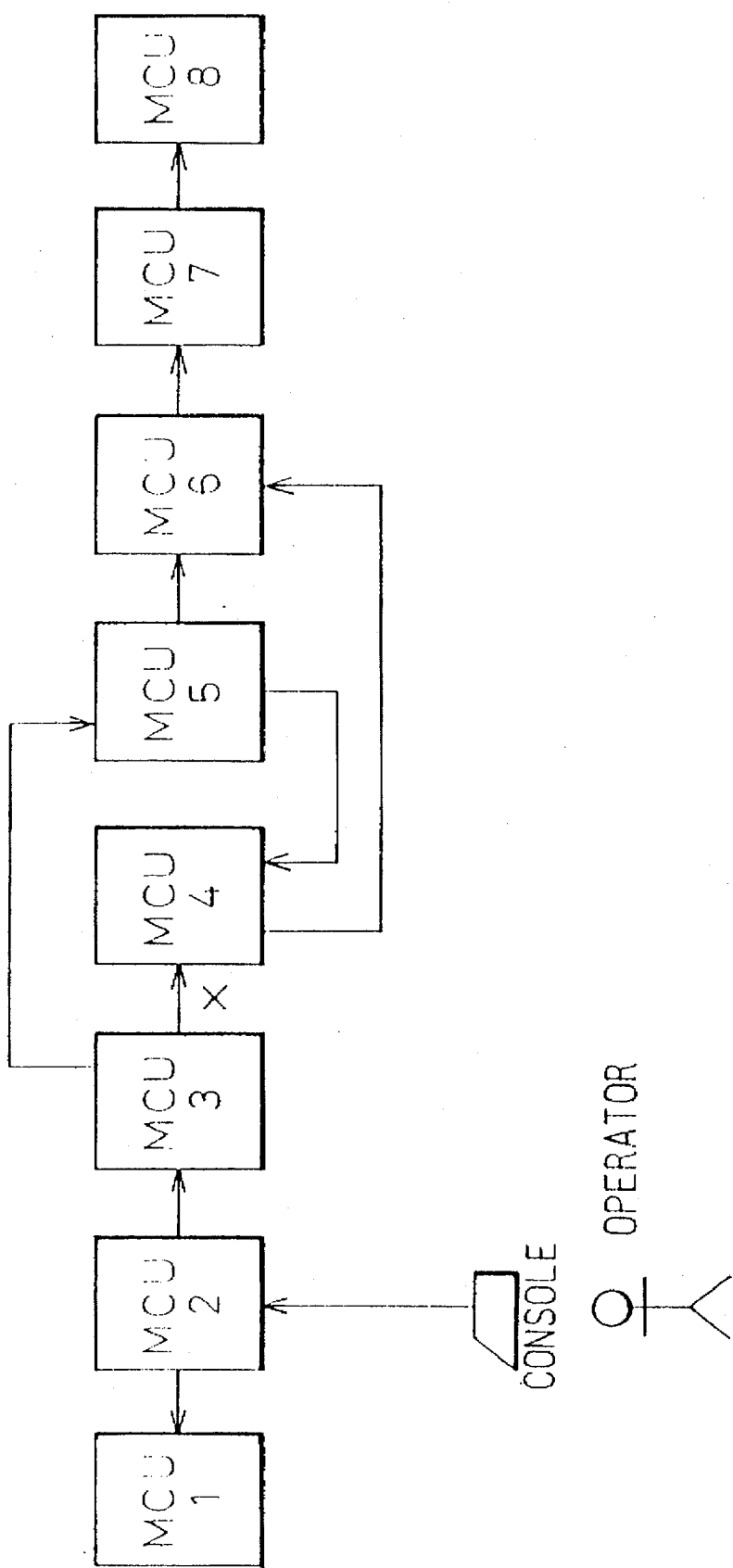

Fig.19B

CONNECTION LIST

| | | |
|---|---|---|
| | | MCU 1 NUMBER |
| | | MCU 2 NUMBER |
| | | MCU 3 NUMBER |
| | | MCU 4 NUMBER |
| | | MCU 5 NUMBER |
| | | MCU 6 NUMBER |
| | | MCU 7 NUMBER |
| | | MCU 8 NUMBER |

<LIST TRANSMISSION/RECEPTION TASK>

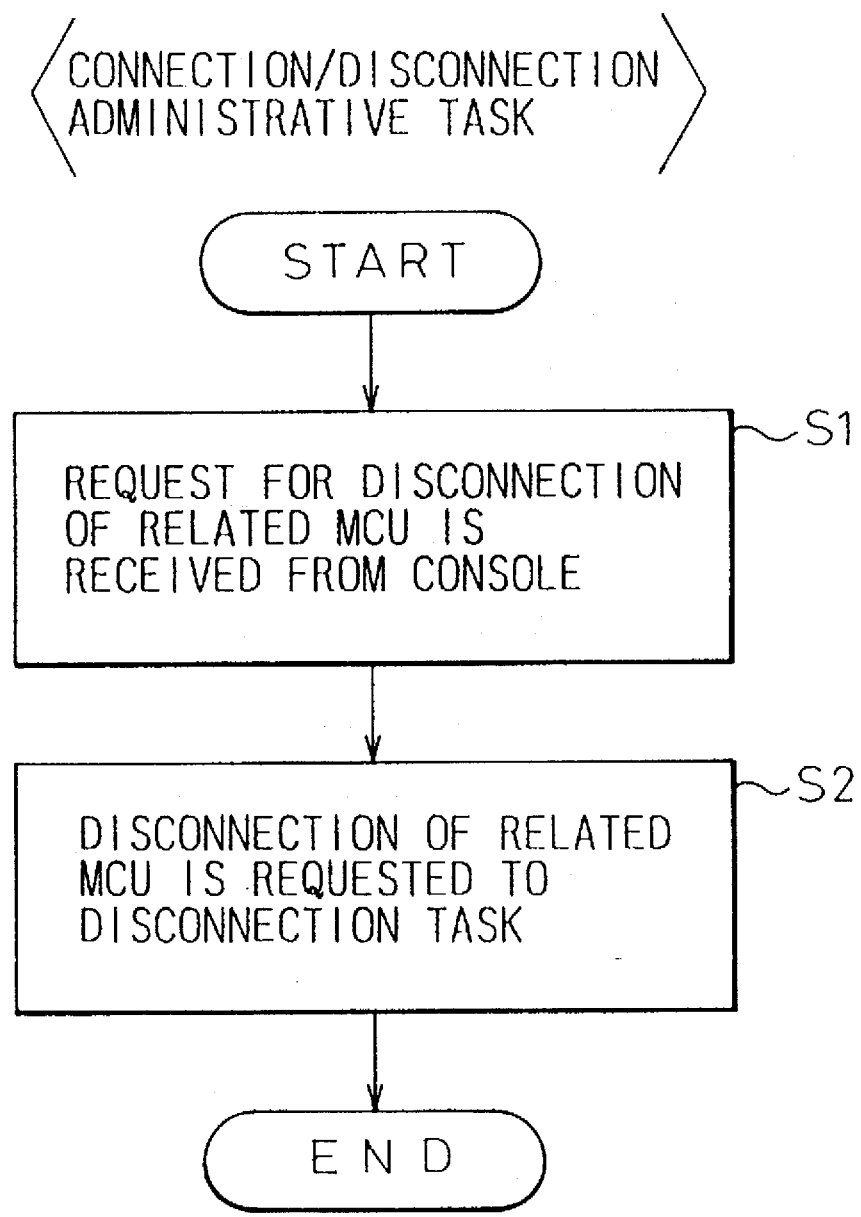

SYSTEM FOR CONNECTION AND DISCONNECTION IN MULTIPOINT CONFERENCE SYSTEM OF CASCADE CONFIGURATION

BACKGROUND OF THE INVENTION

1. Field of the Invention

The present invention relates to a system for connection and disconnection in a multipoint conference system of a cascade configuration.

In recent years, along with the general increase in use of television conferences, there has been an increase in the instances of connection of a group of independent television conference systems to enable participants at several different locations to confer in what is called a "multipoint conference". As a result, there has been a demand for more efficient connection and disconnection of the multipoint connection (conference) units (MCUs). used for switching and relaying the data and of the television conference terminals accommodated thereby.

2. Description of the Related Art

One method for enabling a television conference among participants at a number of different locations is to connect MCUs by a cascade configuration through a public network or other network and connect the MCUs and television conference terminals through sub-networks. As will be explained later in more detail with reference to the drawings, there were the following problems (1) to (5) in the conventional cascade configuration of MCUs:

(1) In order to connect the MCUs, each MCU operator or conference participant had to check the connection routes with other MCUs and the line connection times and decide on numerous operational procedures before the start of the conference.

(2) Since a number of television conference terminals are connected to each MCU, each conference participant and each MCU operator also had to check the line number of the MCU to be connected with, the line numbers of the television conference terminals to engage in the conference, and the starting time of the conference and decide between them on numerous other operational procedures before the start of the conference.

(3) In order to disconnect the MCUs at the end of the multipoint conference, each MCU operator or each conference participant had to perform disconnection processing.

(4) In order to disconnect the television conference terminals from each MCU at the end of the multipoint conference, each conference participant and MCU operator had to perform disconnection processing for each MCU and television conference terminal.

(5) When all participants at television conference terminals connected to an MCU located at an end of the cascade configuration signed off from the multipoint conference in progress, that MCU continued to be connected to the multipoint conference. This became a factor in delay of the data transmission and, further, wastefully ran up line charges. Since the other conference participants could not learn of the existence of this MCU, either the MCU operator had to constantly monitor the situation and disconnect the MCU or else the adjoining MCUs had to disconnect the MCU at the time of the end of the multipoint conference.

Further, in the conventional method explained later in more detail, there were the following problems (6) to (8) in the connection among MCUs:

(6) When connecting MCUs in a cascade configuration, each MCU operator or conference participant had to perform processing to connect to the adjoining MCUs. When not able to connect, further, he had to determine the MCU to be next connected and then continue the connection processing, so time was taken for the connection and there was the problem of a slow start of the conference.

(7) When connecting the MCUs, if there were an MCU unable to be connected due to the line of the MCU being busy, the operator or conference participant had to repeatedly request connection to that MCU (retry) and therefore there was the problem that it took time to build the cascade configuration.

(8) With current MCUs, there is no way for the MCUs to determine the cascade configuration during a conference, so the MCUs cannot disconnect on their own. Further, when all terminals connected to an MCU sign off, while the lines to the adjoining MCUs could be disconnected at any time, an MCU in the middle of the cascade configuration ("intermediate MCU") could not disconnect without interrupting the conference.

In the example of FIG. 40, when all terminals of the MCU3 sign off from the conference, it would be necessary to temporarily interrupt the conference and connect once again from the MCU2 to the MCU4 in order to bypass the intermediate MCU3. To avoid interrupting the conference, the intermediate MCU had to be kept connected during the conference, which meant wasteful use of lines.

(9) When establishing a bypass route, an operator had to first determine the status of each MCU and then determine the bypass route, connect through the bypass route, and disconnect the intermediate MCU in question, which was both troublesome and time-consuming.

SUMMARY OF THE INVENTION

Therefore, the present invention has as its object the provision of a system for connection and disconnection in a multipoint conference system of a cascade configuration which eliminates the above problems (1) to (5), enables the automatic connection and disconnection of MCUs and of television conference terminals connected to the MCUs from a single location, and enables automatic recognition of unnecessary MCUs and disconnection of them from the cascade configuration.

Further, the present invention has as another object the provision of a system for connection and disconnection in a multipoint conference system of a cascade configuration which eliminates the above problems (6) to (9), enables a cascade configuration to be built in a short time, enables MCUs unable to be connected to be connected again in a short time, enables each MCU to recognize the cascade configuration, and enables bypass connection and disconnection of an intermediate MCU without interruption of the conference and without the intervention of an operator.

To attain the above objects, the present invention provides a system for connection and disconnection in a multipoint conference system of a cascade configuration, wherein when an operator inputs a list of line numbers of MCUs and terminals to engage in a conference from an input unit of an MCU, the MCU prepares a call origination/disconnection table comprised of the line numbers, a call origination/disconnection administrative unit identifies the terminals under the MCU and the adjoining MCUs, calls and connects to them through the lines, and, when completing the connections, circulates a call origination/disconnection table to the connected MCUs. Those MCUs in turn then call their own terminals and adjoining MCUs. This is continued until the MCUs at the end of the cascade configuration ("end MCUs") are connected. Further, use is made of a connection list in which connection flags and the order of connection are successively written, and use is made of a conference configuration list indicating the actual connections of the MCUs. This enables all the television conference terminals to be automatically connected and disconnected from a single location and enables MCUs which have become unnecessary to be automatically recognized and disconnected.

BRIEF DESCRIPTION OF THE DRAWINGS

The above object and features of the present invention will be more apparent from the following description of the preferred embodiments with reference to the accompanying drawings, wherein:

FIG. 2 is a view of the configuration of a second aspect of the present invention, FIGS. 3A and 3B are views for explaining the decision of connection/disconnection using a call origination/disconnection table, FIG. 4 is a view of the block construction and connections of MCUs according to an embodiment, FIG. 10 is a view of the internal configuration of an MCU according to an embodiment and its relationship with other units, FIG. 11 is an explanatory view of the operation at an MCU preparing a connection list, FIGS. 13A and 13B are flow charts of the processing of a list administrative task, FIGS. 15A and 15B are flow charts of the processing of a connection task and line task, FIG. 16 is a flow chart of the processing of a list transmission/reception task, FIGS. 17A and 17B are view of an example of the building of a cascade construction of a plurality of MCUs by the connection list, FIG. 28A to 28D are flow charts of the processing of tasks of connection, disconnection, list transmission/reception, and connection/disconnection administration.

DESCRIPTION OF THE PREFERRED EMBODIMENTS

Before describing the embodiments of the present invention, the related art and the disadvantages therein will be described with reference to the related figures.

Figure 40:
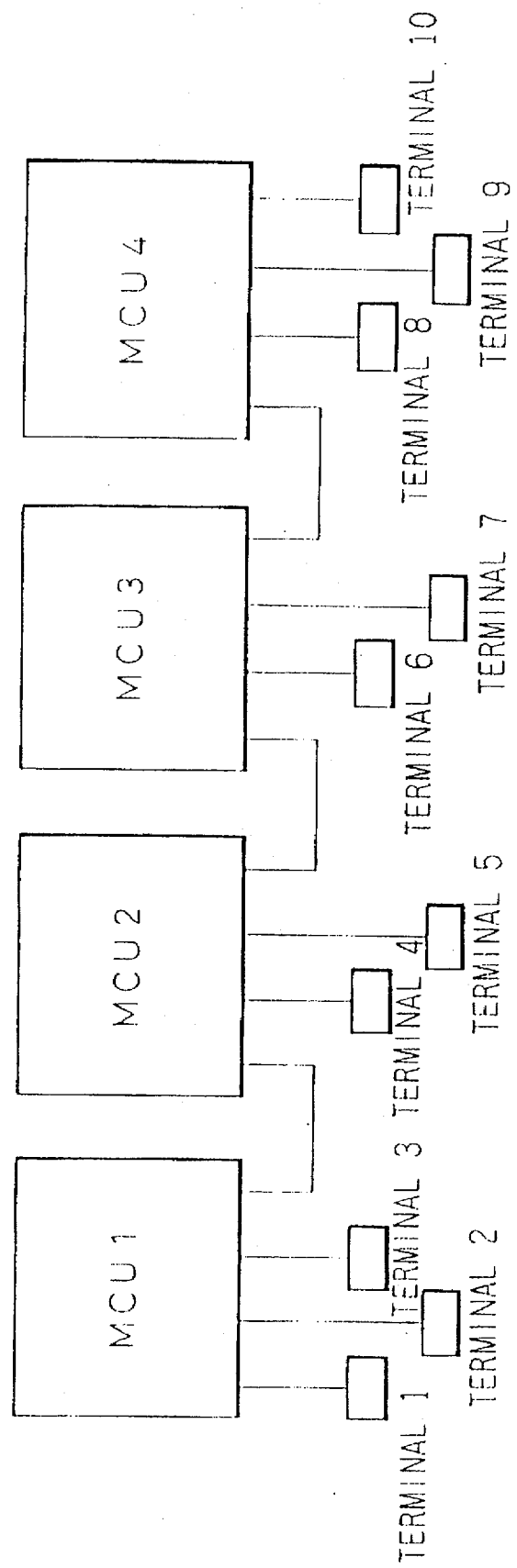
FIG. 40 is an explanatory view of a cascade configuration of conventional MCUs.

FIG. 40 is an explanatory view of the cascade configuration of conventional MCUs.

As mentioned earlier, one method for enabling a television conference among participants at a number of different locations is to connect MCUs by a cascade configuration through a public network or other network and connect the MCUs and television conference terminals (shown by terminals 1 to 10) through sub-networks.

In such a conventional system of connection of MCUs, each conference participant (terminal) of the MCUs or each operator of a console connected to an MCU (in this case, connected to the MCU2) issued a request for line connection to the adjoining MCUs. That is, when the MCUs which govern the terminals taking part in the conference are determined, the line connections between the MCUs had to be successively established by manual operation from terminals or consoles to realize the cascade configuration.

For the line connections between the MCUs and terminals, either the television conference terminals (terminals 1 to 10) had to connect the lines to their MCUs or each conference participant and operator of the MCUs had to connect the lines to the television conference terminals.

To disconnect the lines between MCUs after the end of the conference, the conference participants and the operator of each MCU issued a request for line disconnection to the adjoining MCUs at the time of the end of the conference so as to disconnect the MCUs. To disconnect the MCUs and terminals, either the television conference terminals each issued a request for line disconnection to the MCU in question or the operator of each MCU disconnected the lines from the MCU to the television conference terminals.

In this way, the lines between the MCUs were disconnected manually at the end of the conference. When all of the television conference terminals of an MCU located at the end of the cascade configuration, for example, the terminals 8 to 10 connected to the MCU4 in the cascade configuration shown in FIG. 40, signed off from the conference while still in progress, however, the other participants in the television conference could not learn of this and therefore the line between the MCU3 and the MCU4 remained connected.

According to the above related art, the problems (1) to (8) discussed above occurred.

The present invention provides a system for connection and disconnection in a multipoint conference system of a cascade configuration which eliminates the problems (1) to (5), enables the automatic connection and disconnection of MCUs and of all television conference terminals connected to the MCUs from a single location, and enables automatic recognition of unnecessary MCUs and disconnection of them from the cascade configuration.

Further, the present invention provides a system for connection and disconnection in a multipoint conference system of a cascade configuration which eliminates the problems (6) to (9), enables a cascade configuration to be built in a short time, enables MCUs unable to be connected to be connected again in a short time, enables each MCU to recognize the cascade configuration, and enables bypass connection and disconnection of an intermediate MCU without interruption of the conference and without the intervention of operator.

Figure 1:
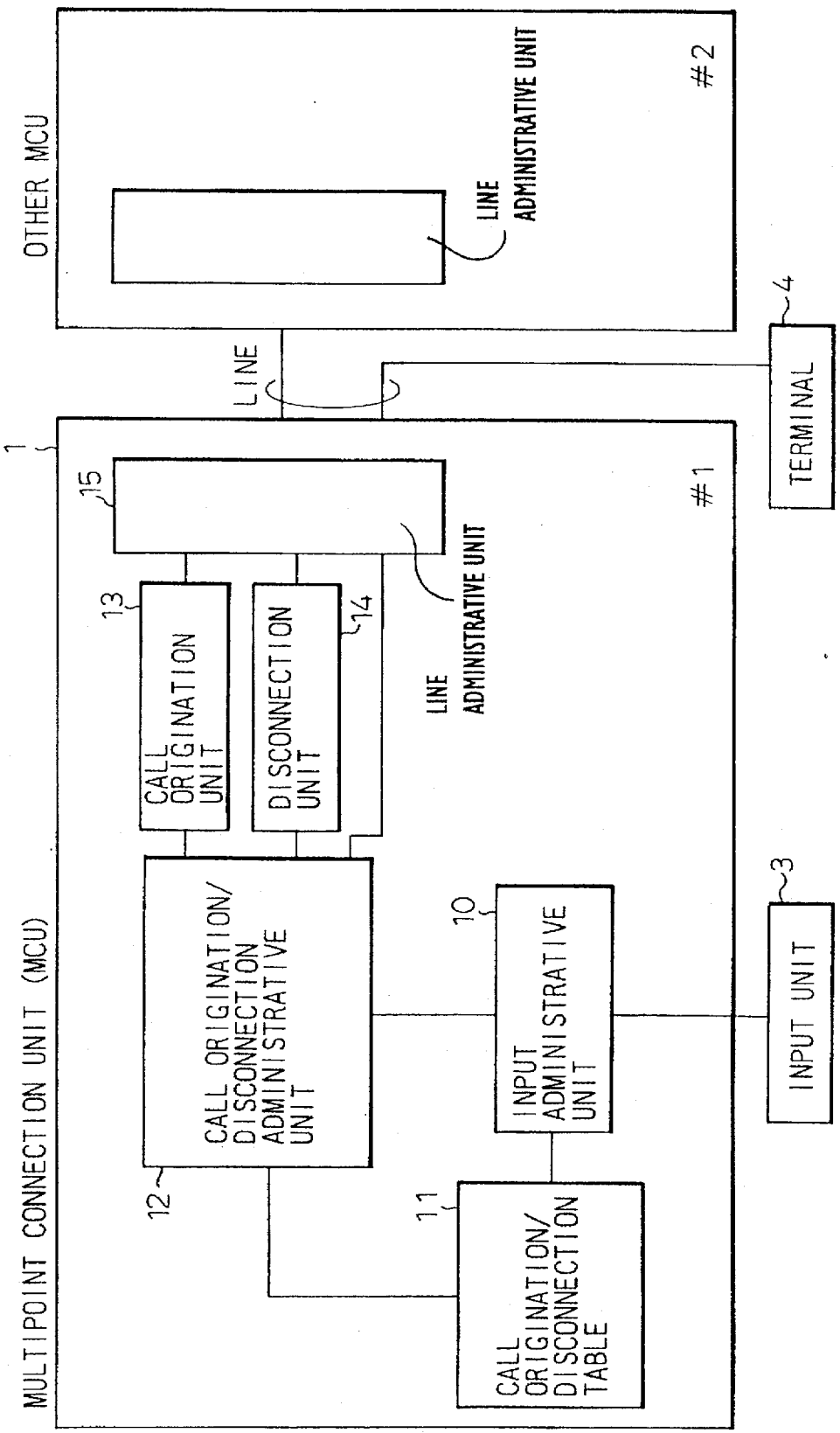
FIG. 1 is a view of the configuration of a first aspect of the present invention.

FIG. 1 is a view of the configuration of a first aspect of the present invention for achieving the first object mentioned above. In the figure, 1 is an MCU (MCU1, MCU2, . . . ), 10 is an input administrative unit for preparing a call origination/disconnection table (11) from line connection/disconnection instructions given from an input unit, 11 is the call origination/disconnection table, 12 is a call origination/disconnection administrative unit, 13 is a call origination unit, 14 is a disconnection unit, 15 is a line administrative unit, 3 is the input unit, and 4 is a television conference terminal (sometimes referred to simply as a "terminal").

FIG. 2 is a view of the configuration of a second aspect of the present invention for achieving the second object mentioned above. In the figure, 2 is an MCU, 20 is an input administrative unit, 21 is a list administrative unit for preparing a connection list of the cascade configuration of the MCUs engaging in the conference, instructed from the input unit 3, for engaging in transmission and reception with other MCUs, and for administering the connection list of the results of connection processing, 22 is the connection list, 23 is a connection/disconnection administrative unit, 24 is a connection unit, 25 is a disconnection unit, 26 is a line administrative unit, 27 is a configuration administrative unit for administering the cascade configuration, and 3 is the input unit.

In the first aspect of the present invention, the MCUs and the television conference terminals forming the cascade configuration for the television conference are specified and connections instructed by input from an input unit 3 to an MCU. A call origination/disconnection table 11 is then prepared for the connection processing. This table is circulated around the MCUs to enable connection with the other MCUs and television conference terminals. These other MCUs then perform processing for connection with the television conference terminals under them. When disconnecting as well, the MCU's and television conference terminals to be disconnected are instructed from the input unit 3. A table is then prepared and circulated among the MCUs instructed by the table and the television conference terminals are then disconnected from them. If a disconnection instruction is input in the case of disconnecting using this call origination/disconnection table, the disconnection instruction is circulated among all the MCUs to disconnect them from each other as well.

In the second aspect of the present invention, the MCUs to be connected when engaging in a television conference and the terminals under the same (television conference terminals) are input from an input unit 3 of an MCU. That MCU then prepares a connection list. The MCU refers to the connection list and performs processing for connection with the adjoining MCUs, writes the results of the processing in the connection list, sends the list to the connected MCUs, and writes the result sequentially in the connection list. When connection is not possible, it establishes a bypass route in accordance with the list. The MCUs at the two ends of the cascade configuration send back the connection list carrying the results of processing to the MCU of the original input unit. This prepares a final connection list showing the state of connection from the connection lists carrying the results of processing and uses the same for various types of control.

In FIG. 1, the line numbers of the MCUs to participate in the television conference and television conference terminals (terminals) under the MCUs and the call origination instruction (command) are input from the input unit 3. Receiving these, the input administrative unit 10 prepares a call origination/disconnection table 11 comprised of the information on the numbers of the MCUs and television conference terminals (including information indicating call origination) and then activates the call origination/disconnection administrative unit 12. The call origination/disconnection administrative unit 12 refers to the call origination/disconnection table 11, identifies the other MCUs to be connected from it, and activates the call origination unit 13.

The call origination unit 13 requests from the line administrative unit 15 a call origination to the other MCUs. When connected to another MCU, it sends the content of the call origination/disconnection table 11 to that MCU. When there are television conference terminals under the original MCU, the call origination unit 13 instructs the line administrative unit 15 to perform processing for connection to those terminals. The line administrative unit 15 then connects to the instructed terminals through the lines.

The other MCUs also read the content of the call origination/disconnection table. When there is other MCUs to be connected, they call the next MCUs by a similar operation and thus successively connect to the MCUs in the configuration. At the same time, the television conference terminals belonging to the MCUs are called and connected.

To disconnect MCUs connected in a cascade configuration in this way, a disconnection instruction is input from the input unit 3 to the input administrative unit 10. The input administrative unit 10 disconnects the lines currently connected by referring to the call origination/disconnection table 11 and disconnecting lines to the television conference terminals under it and activating the disconnection unit 14 to send a disconnection instruction to the other MCUs indicated in the call origination/disconnection table 11 through the currently connected lines. When the instruction reaches the end MCUs through the MCUs in the cascade configuration, the end MCUs disconnect the lines to their terminals, notify the completion of the disconnection to the next MCUs up, and disconnect the lines to those MCUs.

Note that when all the terminals of an end MCU in a cascade configuration sign off during the conference, the line between that MCU and the other MCU is suspended. The line between that MCU and the next MCU up is then disconnected.

Next, in the configuration shown in FIG. 2, information on the numbers of all the MCUs with terminals (television conference terminals) engaging in the television conference and their terminals is successively specified from the input unit 3 of the MCU2. The list administrative unit 21 is then driven through the input administrative unit 20 and a connection list 23 prepared. This connection list 23 includes the numbers of the MCUs and the numbers of the terminals under the same. Each MCU is provided with a region in which the order of connection (order of MCU) is written and a region in which a flag showing if connection has been completed or is impossible is shown.

When the connection list is prepared, the connection/disconnection administrative unit 22 operates and, in accordance with the connection list 2, activates the connection unit 24 so as to execute processing for connection by the line administrative unit 26 to the adjoining MCUs and the terminals under the MCUs. When connected, it writes the order (of the MCUs) and flags in the connection list 23 and sends the connection list to the other MCUs. When connection to an adjoining MCU is not possible, it sets the flag to indicate connection is not possible, skips over that unconnectable MCU, performs processing for connection with the next MCU on the connection list 23, and sends the connection list to that MCU.

The MCUs receiving this use the received connection list to perform processing for connection to their adjoining MCUs and their terminals, write the results in the connection list, and send the connection list in turn to their connected MCUs.

Assuming that the MCU2 which prepared the connection list is in the middle of the cascade configuration, the MCU2 connects with the adjoining MCUs at the left and right. The connection proceeds in the left and right directions until reaching the MCUs at the two ends of the cascade configuration. The MCUs at the two ends receive the connection list so know that they are at the ends of the cascade configuration. Accordingly, they execute processing for connection to their terminals, write the results in the connection list, then send the connection list with the results of the connection processing up to then back to the MCU2, shown in FIG. 3, which first issued the connection list (order in connection list of "0"). The MCU2 receives the lists from the left and right MCUs and then rearranges its own list based on the content of the two to show the actual order of connection of the MCUs and thereby produce the final conference configuration list.

The conference configuration list shows the connections which are actually formed among the MCUs (including bypass routes) and the terminals for which connections have been established and which are participating in the conference. The list is sent to the adjoining MCUs through the lines and are further sent on from the adjoining MCUs to the next MCUs until the MCUs at the ends of the cascade configuration and is thereby held at all the MCUs. As a result, all the MCUs can determine their current location in the configuration. The configuration administrative unit 27 uses the conference configuration list to administer the cascade configuration.

First, an explanation will be made of embodiments of the first aspect of the present invention with reference to FIG. 3 to FIG. 8.

FIGS. 3A and 3B are views for explaining the decision of connection/disconnection using a call origination/disconnection table. FIG. 3A shows the connection processing in the case of four MCUs, that is, MCU1 to MCU4, and connecting the television conference terminals (given as "terminals") under those MCUs for the television conference. To establish such connections, an operator inputs a command requesting call origination, the line numbers of the MCUs desired to be connected to, and the line numbers of the terminals under the MCUs from the console 3 (corresponding to the input unit 3 in FIG. 1).

As a result of this, the MCU2 prepares a call origination/disconnection table. The call origination/disconnection table has the configuration shown in FIG. 3B. In it is arranged; in order, information on the numbers of the lines of the MCUs and terminals. In the information of the line numbers, information is set indicating if there is a call origination in accordance with a command for call origination from the input unit 3.

The MCUs shown in FIG. 3A perform the following judgements from the call origination/disconnection table of FIG. 3B. The MCU2 determines its own line number (iv) and finds the line number (i) of the MCU above it and the line number (vii) of the MCU below it. From the MCU line numbers (i, vii) found, it learns that it should connect to the adjoining MCU1 and MCU3. It calls them and establishes the connection, then circulates the call origination/disconnection table to the MCU1 and MCU3. Further, the MCU2 finds the line numbers (v) and (vi) of the terminal 3 and terminal 4 under it and uses these for the call and connection processing.

The MCU1 finds its line number (i) from the call origination/disconnection table, confirms that it is the upper end of the cascade configuration in the call origination/disconnection table, finds the line numbers (ii) of the terminals under it, and uses the same for connection. The MCU3 finds its line number (vii) from the call origination/disconnection table, confirms that it is connected from the line number (iv) of an MCU above it, and finds the line number (x) of the MCU under it. The MCU3 connects to the line of the number of the MCU found (MCU4), circulates the call origination/disconnection table, finds the line numbers (viii) and (ix) of the terminals under it, and connects to the same.

The MCU4 finds its line number (x) from the call origination/disconnection table, confirms that it is the lower end of the cascade configuration, finds the line numbers of the terminals under it, and connects to the same. In FIG. 3A, (a) to (c) show the circulated call origination/disconnection tables.

Next, an explanation will be made of the configuration for realizing connection and disconnection between MCUs and between MCUs and their terminals using the call origination/disconnection table shown in FIG. 3B.

FIG. 4 is a view of the block configuration and connections of MCUs of one embodiment of the invention.

In FIG. 4, 1 is an MCU (MCU1, MCU2, MCU3) for switching and relaying picture data and voice data, and 30 to 36 are parts of the MCU, wherein 30 is a console task having the function of preparing a call origination/disconnection table when instructed to connect or disconnect lines from the console, 31 is the call origination/disconnection table, and 32 is a call origination/disconnection administrative task for finding the number of the MCU from the call origination/disconnection table, making a request for connection and disconnection of lines to adjoining MCUs, making a request for connection and disconnection of lines to television conference terminals under it, and circulating the call origination/disconnection table to the adjoining MCUs.

Reference numeral 33 is a call origination task for requesting the line task to perform processing for line connection in accordance with the request from the call origination/disconnection administrative task, 34 is a disconnection task for requesting the line task to perform processing for line disconnection upon a request from the call origination/disconnection administrative task, 35 is a line task for performing processing for connecting and disconnecting lines upon receipt of call origination/disconnection requests, and 36 is a port for the line connected to the exchange, from which port the other MCUs or the television conference terminals (TV terminals) are connected to. Further, 3 is a console, 4-1 to 4-5 are television conference terminals (TV terminals) having the functions of transmitting and receiving voice and picture data, and 5-1 and 5-2 are exchanges having the functions of connecting, disconnecting, and switching lines in public networks, intra-company networks, etc.

Figure 5A:
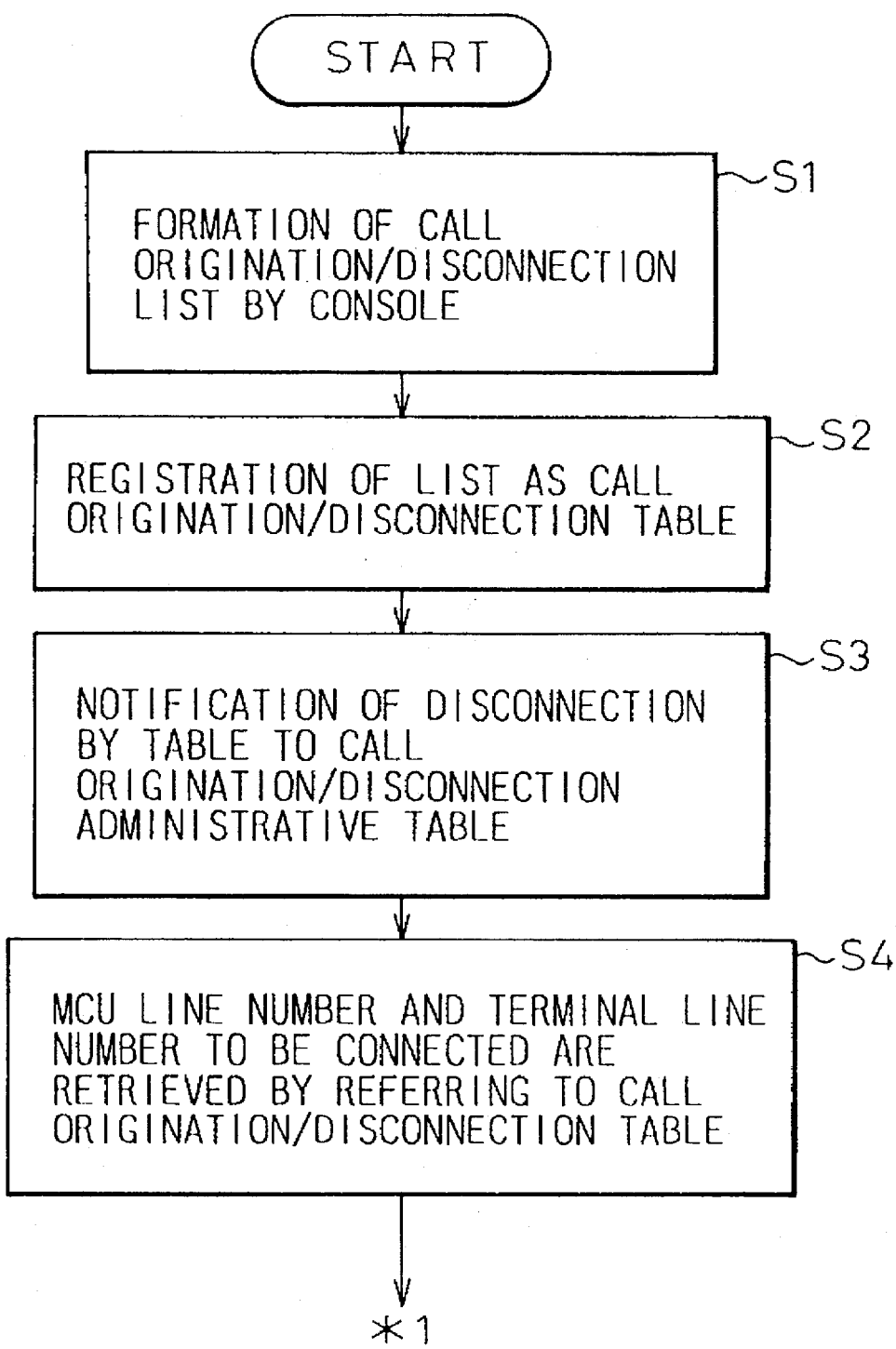
FIGS. 5A and 5B are flow charts of the processing for automatic connection in the configuration of FIG. 4, FIGS. 6A and 6B are flow charts of the processing for automatic disconnection in the configuration of FIG. 4.
Figure 5B:
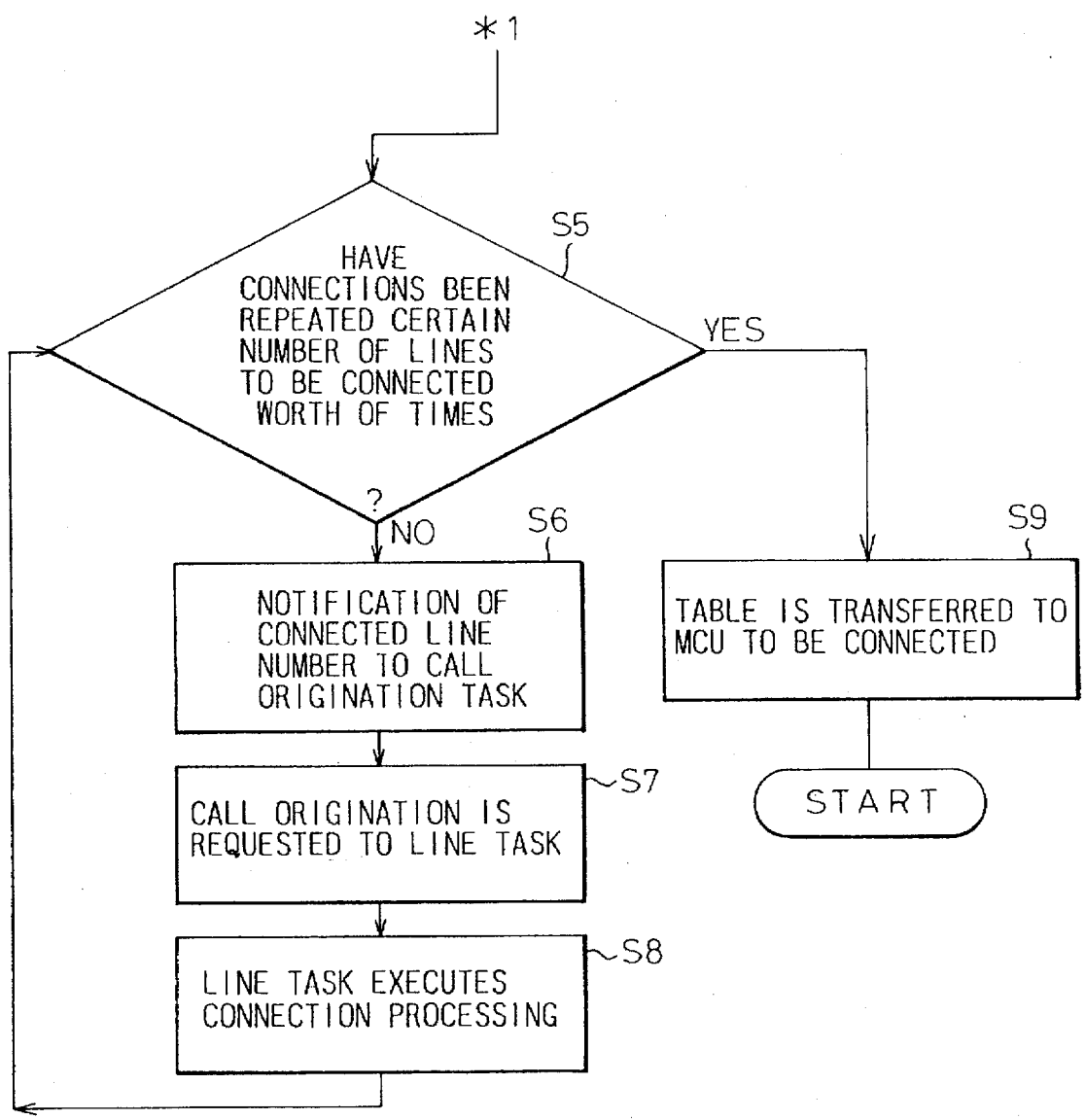

FIGS. 5A and 5B are flow charts of the processing for automatic connection in the configuration of FIG. 4.

First, the call origination/disconnection list is prepared at the console 3 and input to the MCU1 by a command for call origination (S1 in FIG. 5A). The console task 30 of the MCU1 performs processing for recording the input call origination/disconnection list as the call origination/disconnection table 31 (S2). At this time, however, information is added showing the call origination at the line numbers of the call origination/disconnection table 31. When this table is prepared, the console task 30 notifies the call origination/disconnection administrative task 32 of the call origination by the table (S3).

The call origination/disconnection administrative task 32 refers to the call origination/disconnection table and finds the line numbers of the MCUs and terminals to which that MCU should be connected (S4). When finding the lines to be connected, it notifies the connection line numbers to the call origination task 33 (S5 and S6 in FIG. 5B). The call origination task 33 notifies the line numbers to the line task 36. The line task 36 uses the received line numbers to call the exchange 5-1 through the ports 36 and perform connection processing (S8). The processing for line connection by the call origination task 33 and line task 35 is repeated until all the MCUs and terminals found at S4 have been connected. When the connections of the MCU with the other MCUs and the television conference terminals under it have been completed, that MCU circulates a call origination/disconnection table to the connected MCUs through the lines (S9).

Receiving this, the MCU2 performs the processing of S2 to S9 of FIGS. 5A and 5B. When the MCU2 is not the end of the cascade configuration, it connects to the next MCU where the same processing is performed. In this way, the connections between MCUs and between MCUs and their terminals shown in the call origination/disconnection table are automatically established.

Note that when it is desired to successively connect the desired MCUs and a call origination/disconnection list showing the connections is prepared and input as the call origination/disconnection list from the console 3, a corresponding call origination/disconnection table may be prepared and automatic connection of the MCUs designated performed by the flow of processing of FIGS. 5A and 5B.

Further, when it is desired to designate a desired MCU and its terminals for participation in a conference and a corresponding call origination/disconnection list is input as the call origination/disconnection list from the console 3, a corresponding call origination/disconnection table may be prepared and the designated terminals may be automatically connected to at the MCU.

Figure 6A:
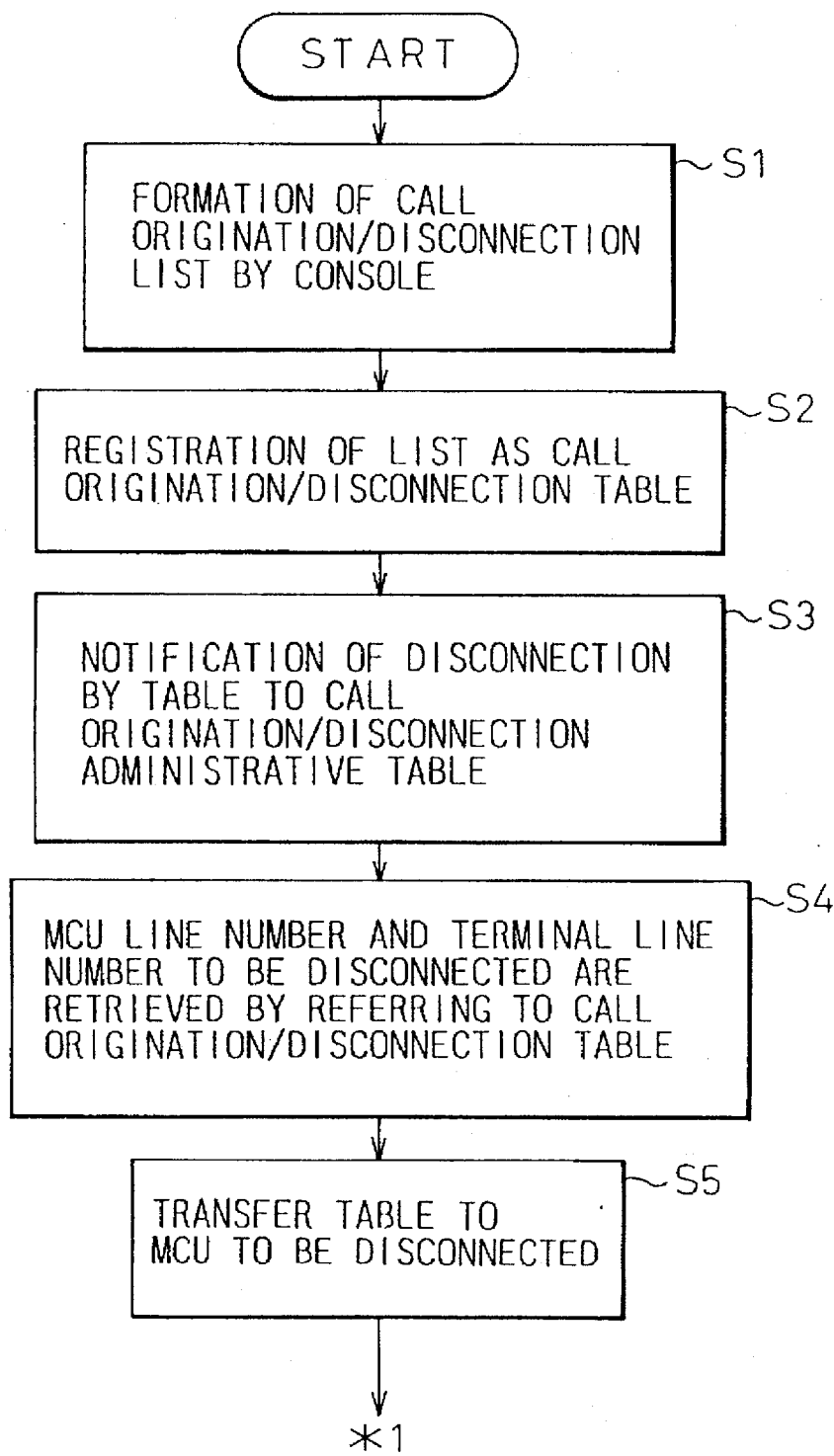

FIGS. 6A and 6B are flow charts of the processing for automatic disconnection in the configuration of FIG. 4.

The operator uses the console 3 to prepare a call origination/disconnection list including the line numbers of the MCUs and terminals to be disconnected and inputs the same to the MCU1 along with the command instructing disconnection (S1 in FIG. 6A). The console task 30 of the MCU1 receives this, then records it as the call origination/disconnection table 31 (S2). However, information indicating disconnection is added along with the line numbers in the table. The console task 30 then notifies the call origination/disconnection administrative task 32 of the disconnection processing by the table (S3). The call origination/disconnection administrative task 32 then refers to the call origination/disconnection table 31 to find the line numbers of the MCUs and the line numbers of the terminals to be disconnected (S4). When it finds the adjoining MCU to be disconnected, it circulates the call origination/disconnection table 31 to the MCU to be disconnected through the currently connected line (S5).

In this way, when there is an MCU to be disconnected, that MCU is first sent a call origination/disconnection table indicating the disconnection. When the table finishes being circulated to the MCU to be disconnected, the processing is started to disconnect the line between that MCU at the MCU connected to it and to disconnect the lines to the terminals under that MCU. That is, when the disconnection task 34 is notified of the numbers of the lines for disconnection (S6 and S7 in FIG. 6B), the disconnection task 34 requests the line task 35 to disconnect the terminals (S8). The line task performs processing for disconnection of the terminal when a MCU to which the table has been circulated is disconnected and, after this terminal disconnection, performs processing for disconnection of the MCU (S9). In this way, the MCU1 is automatically disconnected.

Here, an explanation will be made of the processing for disconnection in the case where the MCU2 and MCU3 adjoining the MCU1 in the configuration of FIG. 2 are to be disconnected.

When a call origination/disconnection table instructing disconnection is circulated from the MCU1 to the MCU2, the call origination/disconnection task 32 of the MCU2 prepares a call origination/disconnection table 31 based on the table received. The line numbers of the MCUs adjoining the MCU1 are found from the call origination/disconnection table 31 of the MCU2 and the line numbers of the MCUs which the MCU2 is to disconnect are notified to the disconnection task 34. The call origination/disconnection administrative task 32 of the MCU2 circulates the call origination/disconnection table 31 of the MCU2 to the call origination/disconnection administrative task of the MCU3 adjoining the MCU2 through the exchange 5-2.

Next, when the line task 35 of the MCU2 confirms that the MCU3 to which the call origination/disconnection table 31 of the MCU2 has been circulated has disconnected, it disconnects the terminals (4-4 and 4-5) by the numbers of the lines for disconnection notified from the disconnection task 34 of the MCU2. The line task 35 of the MCU2 disconnects the MCU1 from which the call origination/disconnection table was circulated after disconnecting all terminals. The line task 35 of the MCU1 confirms that the MCU2 to which the call origination/disconnection table was circulated disconnected and disconnects all terminals (4-1 to 4-3) by the numbers of the lines for disconnection notified from the disconnection task 34 of the MCU1. Note that when the line task 35 of the MCU1 confirms that the MCU2 has disconnected, it disconnects all terminals (4-1 to 4-3) by the numbers of the lines to be disconnected notified from the disconnection task 34.

In this way, the other MCUs perform the processing of S2 on in FIGS. 6A and 6B based on the received call origination/disconnection table instructing the disconnection.

Figure 7:
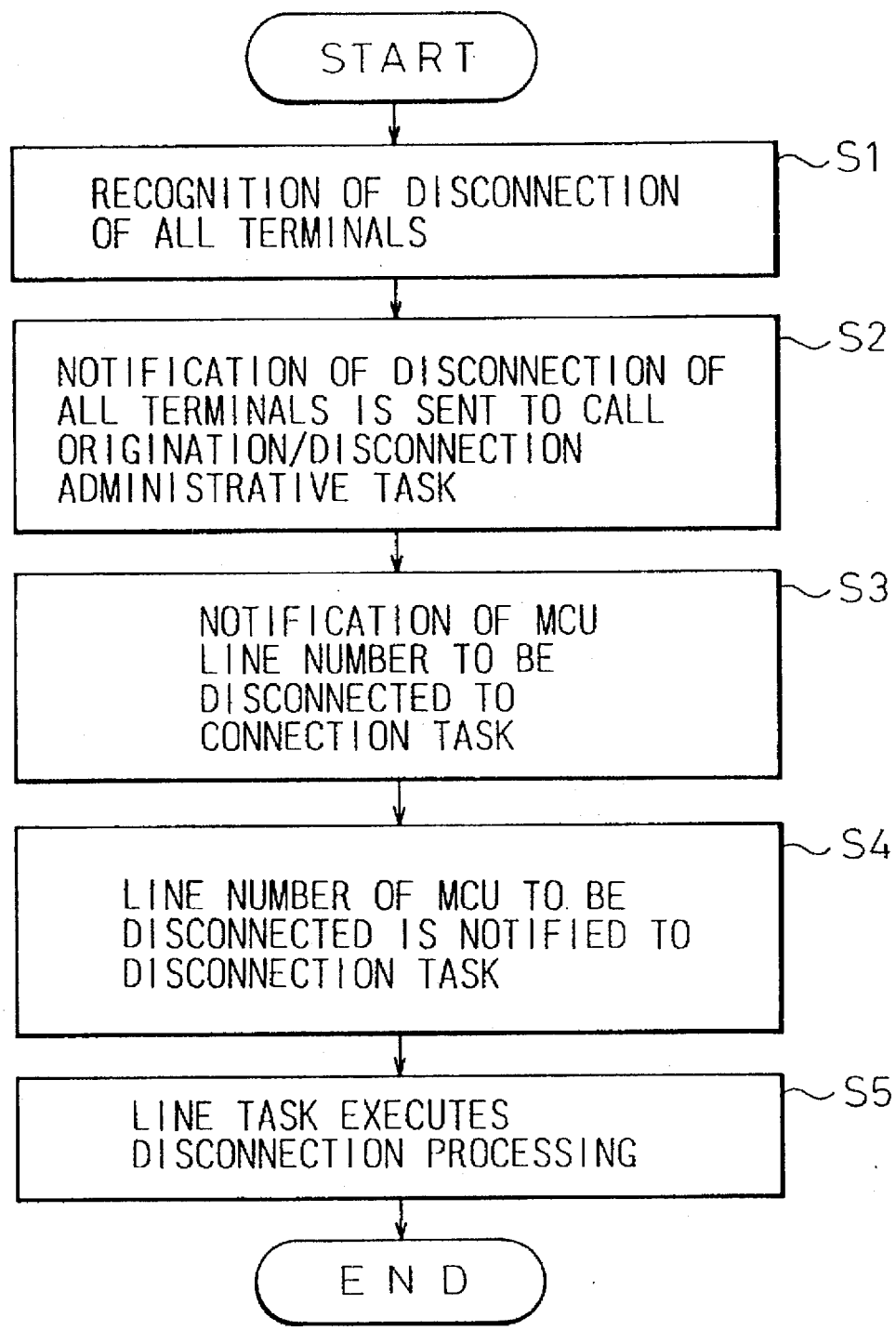
FIG. 7 is a flow chart of the processing for automatic disconnection at an end MCU in the cascade construction.

FIG. 7 is a flow chart of the processing for automatic disconnection at an end MCU in a cascade construction.

In this case, assume that the terminals connected to an end MCU in the cascade configuration finish participation in the conference and sign off.

When the end MCU confirms that all the terminals have signed off (S1 in FIG. 7), the line task 35 sends a notification that all terminals have signed off to the call origination/disconnection administrative task 32 (S2). This then notifies the line number of the MCU to be disconnected to the disconnection task 34 (S3). The disconnection task 34 then requests disconnection from the adjoining MCU to the line task 35 (S4). The line task then performs processing for disconnection from that MCU (S5).

Figure 8:
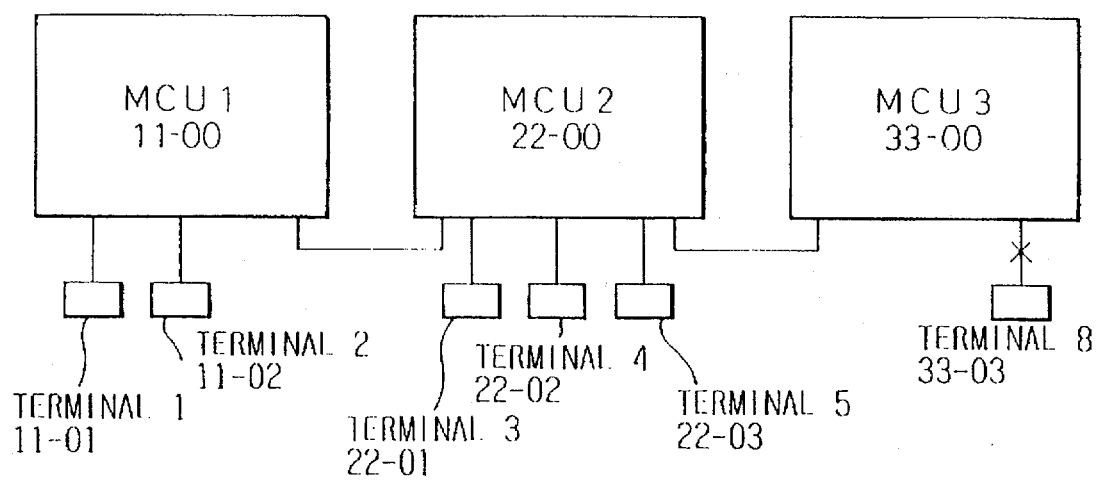
FIG. 8 is a view of a specific example of the case of disconnection of a terminal connected to an end MCU.

FIG. 8 shows a specific example of the case where a terminal connected to an end MCU signs off.

In this example, when the terminal (television conference terminal) 8 connected to the MCU3 signs off, the MCU3 confirms that there is no longer any terminal connected to it. Since the only other MCU it is connected to is the MCU2, it confirms that it is an end unit of the cascade configuration. As a result, the MCU3 disconnects the line to the MCU2 and leaves the multipoint television conference. As a result, there is no need to maintain a meaningless line at the end MCU.

By doing this it is possible to disconnect any MCU from another MCU at the same time as when related terminals sign off.

When desiring to automatically disconnect the lines between an MCU and its terminals, the line numbers of the terminals to be disconnected are input from the console of FIG. 2 by a command instructing disconnection. The console task 30 prepares a call origination/disconnection table 31 including the line numbers of those terminals and activates the call origination/disconnection administrative task 32. The call origination/disconnection administrative task 32 notifies the disconnection task 34 of this when the terminals belong to its MCU and has the line task 35 perform the processing for disconnection of the terminals. At the same time, it circulates the call origination/disconnection table to the call origination/disconnection administrative task of the adjoining MCU2. The MCU2 then disconnects its own terminals and circulates the call origination/disconnection table to the MCU3.

Figure 39:
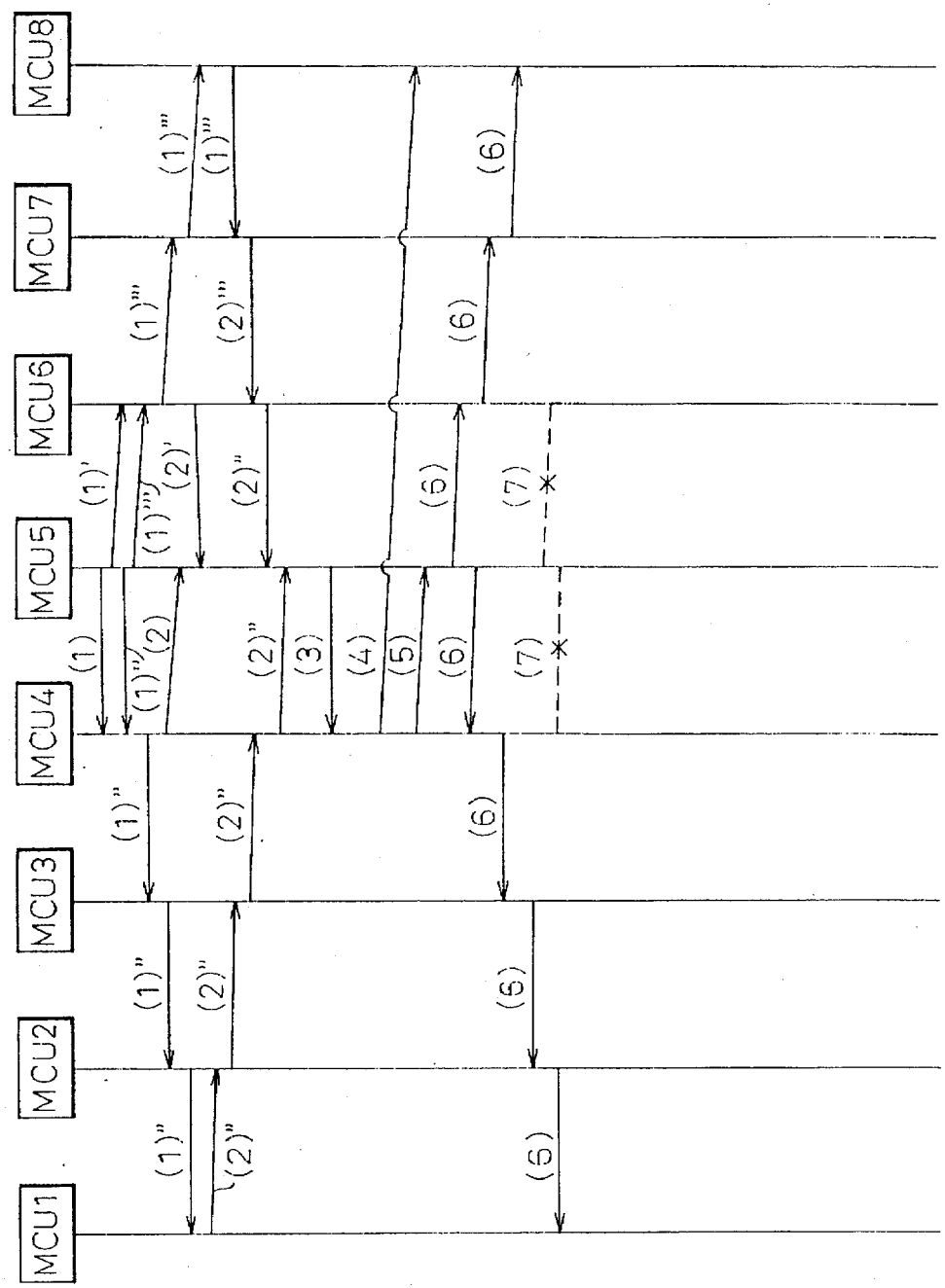
FIG. 39 is a view of the sequence of operations of FIG. 38.

An explanation will now be given of an embodiment of a second aspect of the present invention (see FIG. 2) with reference to FIGS. 9A and 9B and FIG. 39.

Figure 9A:
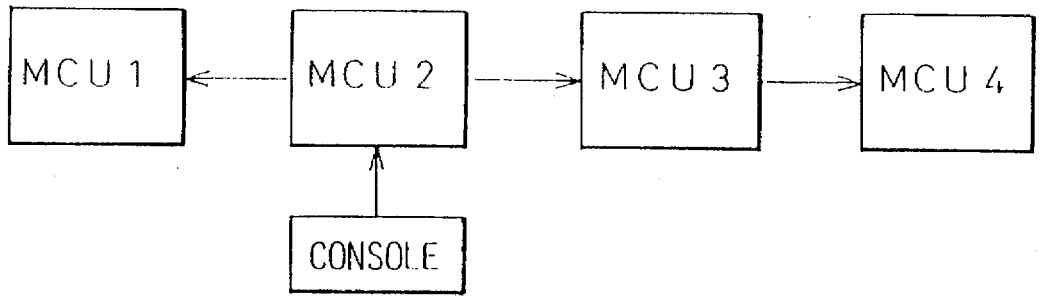
FIGS. 9A and 9B are views explaining the configuration and function of a connection list according to the present invention.
Figure 9B:
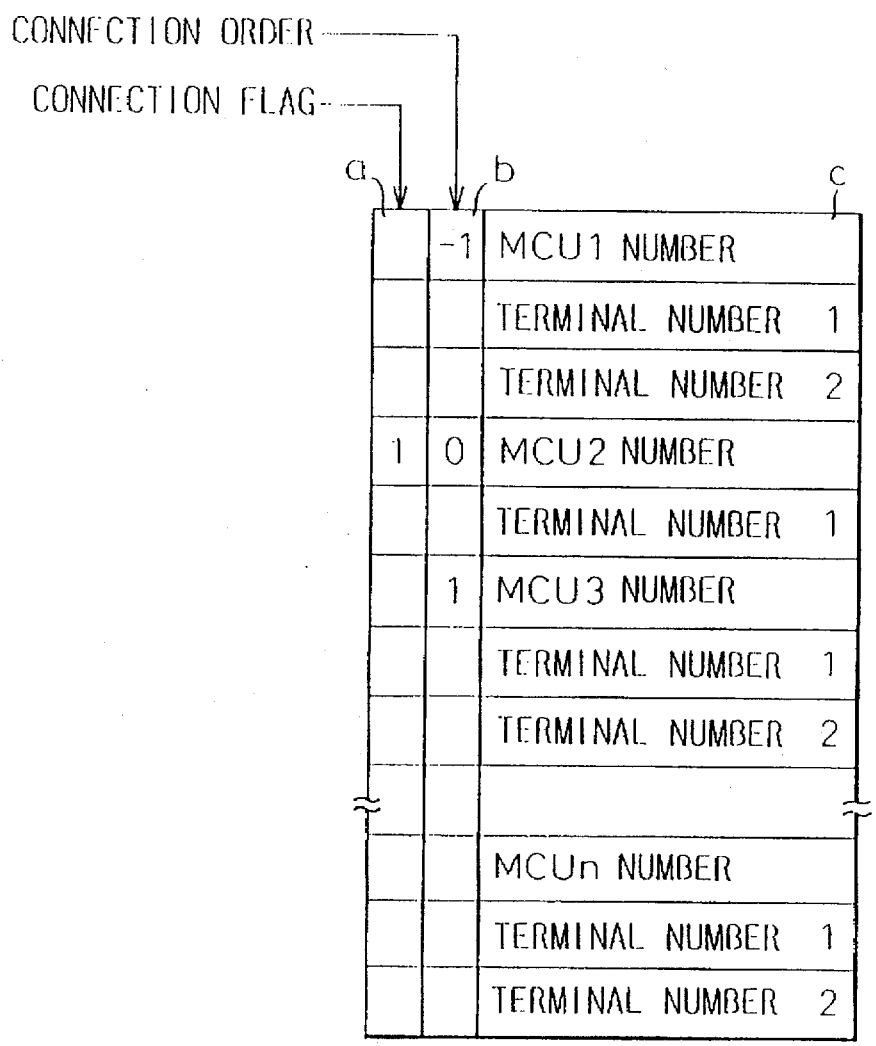

FIGS. 9A and 9B are views explaining the configuration and function of a connection list according to the present invention.

FIG. 9A is an example of the configuration of an MCU. The MCU1, MCU2, MCU3 . . . are connected to a public network etc. in that order. FIG. 9B shows the connection list according to the present invention. The connection list is prepared by the MCU (origination MCU) requesting the television conference by the list. The connection list stores in order in the column c the numbers (line numbers etc.) of the MCUs and terminals (television conference terminals) desired to be connected. The column a is the region for writing the connection flags indicating if each MCU has been connected to the conference configuration ("1") or has not been able to be connected (left as "0"). The column b is the region for writing the order of connection starting from the MCU which first prepared the connection list (MCU2 here), which MCU is made "0" in the case where all MCUs are connected. In the order of connection, for example, the MCU2 is made "0" and the MCUs to the right of the MCU2 (called "higher" here) are assigned positive numbers in the order of connection from the same. If the MCU3 is connected, its order of connection therefore becomes "1". If the MCU4 at the right of the MCU3 is connected, its order of connection becomes "2". The MCU1 at the left side (called "lower" here) of the MCU2 is assigned a negative number, or −1, for the order of connection.

The connection list is sent from the origination MCU 2 to the adjoining MCU1 and MCU3. These MCUs confirm their own positions from the connection list. An MCU above the MCU which requested the connection list connects to the MCU above it, while an MCU below it connects to an MCU further below it. After connection, they write the results of the connection processing in the connection flag and write the connection order in the connection order region. When failing in connection, they set the connection flag of the MCU to indicate inability of connection and perform processing for connection to the next MCU on the connection list. Similarly, these other MCUs search for the MCUs to be connected from them from the connection list and perform processing for connection to these MCUs. This is continued until the MCUs at the top and bottom ends of the cascade configuration are reached.

The MCUs confirm their own locations. The MCUs above the origination MCU (order of connection of "0") judge the connection flags of the MCUS below them and, if indicating that the MCUs are not connected, perform processing for connection to the MCUs. Further, if connected, they perform processing for connection to the higher MCUs. Similarly, the MCUs below the origination MCU judge the connection flags of the MCUs above them and, if indicating that the MCUs are not connected, perform processing for connection to the MCUs. Further, if connected, they perform processing for connection to the lower MCUs. When the lower MCUs are also connected, they perform processing for connection to the further lower MCUs on the connection list.

With each connection processing, the results of the processing are written in the connection flags at the MCU, the connection order is written in the connection order region, and the connection list is then transferred to the next connected MCU.

FIG. 10 is a view of the internal configuration of the MCU of the embodiment and the relation with other units.

In FIG. 10, 2 is an MCU for switching and relaying picture data and voice data at the time of a television conference spanning several locations. In the figure, two units MCU1 and MCU2 are shown. Reference numeral 3 is a console on which an operator can perform an input or output operation, and 5 is an exchange. Reference numerals 40, 41, and 43 to 49 in the MCUs are tasks provided with respective processing functions. Reference numeral 42 is a table in which a connection list is stored.

Explaining the functions of the tasks in brief, 40 is console task for requesting a list administrative unit to prepare a connection list upon instruction from the console 3 and for notifying the other tasks of data from the console 3, 41 is a list administrative task for preparing a connection list based on the data given from the console 3, notifying it to the connection/disconnection administrative task, and sending it to the list transmission/reception task (47) to enable transmission of the conference configuration list after connection between MCUs, 43 is a connection/disconnection administrative task for selecting from the connection list the MCUs to be connected or disconnected, notifying the required data to the connection task or disconnection task, and adding the necessary data to the connection list, 44 is a connection task for performing processing for connection of lines between one MCU and another and between an MCU and its terminals, and 45 is a disconnection task for performing processing for disconnection of lines between one MCU and another and between an MCU and its terminals.

Further, 46 is a line task for performing processing for connection and disconnection with a line with the line exchange 5, 47 is a list transmission/reception task for transmitting a list notified from the list administrative task and receiving a list from another MCU, 48 is a cascade configuration administrative task for administering an exchange during the conference and selecting a bypass route at the time of disconnection of the intermediate MCU, and 49 is a factor analysis task for identifying the type of the data from the MCUs and terminals and notifying data to the suitable task.

FIG. 11 is an explanatory view of the operation at the MCU preparing the connection list, while FIG. 12 to FIG. 16 are flow charts of the processing of the different tasks.

The MCU shown in FIG. 11 is assumed as the MCU1. Another MCU2 is connected to the line exchange 5.

The operator requests (by command) preparation of a connection list at the console 3 of the MCU1 and inputs a list of the numbers of the MCUs and terminals to be connected. The console task 40 is then activated.

Figure 12:
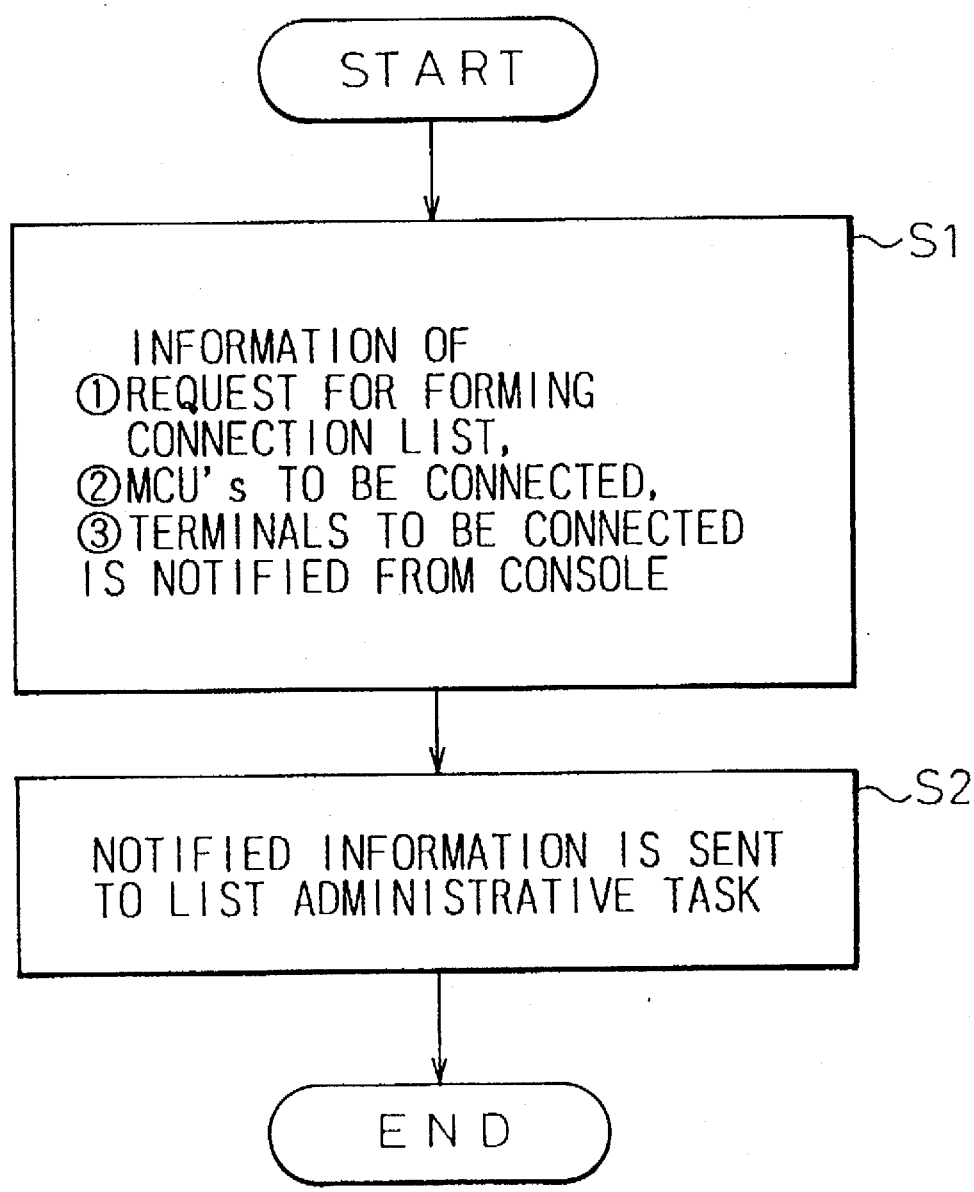
FIG. 12 is a flow chart of the processing of a console task.
Figure 13A:
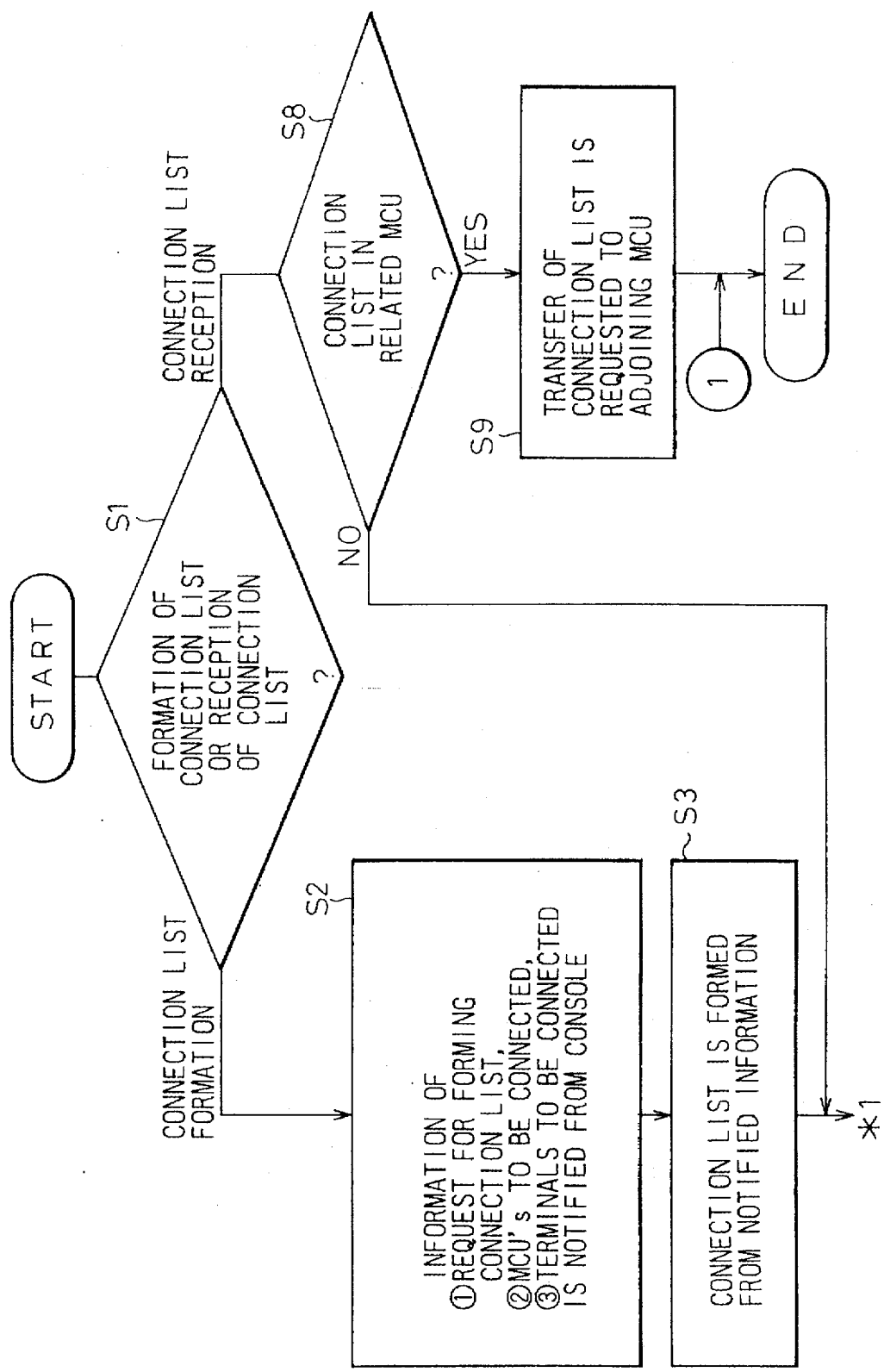

FIG. 12 shows the flow of processing of the console task. When a request for preparation of a connection list and the information on the connected MCUs and connected terminals input at the console is sent, that information is notified to the list administrative task. The list administrative task 41 performs the processing shown in FIGS. 13A and 13B. First, it judges if it should prepare a connection list or if it has received a connection list from another MCU (S1 in FIG. 13A). If it should prepare it, it receives information from the console task and prepares a connection list from that information (S2 and S3). The connection list is stored in the table 42.

Next, it requests connection processing based on the connection list to the connection/disconnection administrative task (S4 of FIG. 13B), receives the results of the connection processing from the connection/disconnection administrative unit and writes the same in the connection list (S5), judges the results (S6) and, in the case of completion of connection to the terminals, failure of connection to an MCU, failure of connection to the terminals, etc., requests the next connection on the connection list. In the case of completion of the connection to an MCU, it requests the list transmission/reception task to send the list (S7). Note that in FIG. 12, when the task receives a connection list from another MCU, it judges if there is a connection list in its MCU and if there is a list requests that the connection list be transferred to the adjoining MCUs.

The transmission/reception task performs the processing shown in FIG. 16. In the above case, it transmits the requested connection list.

Figure 14:
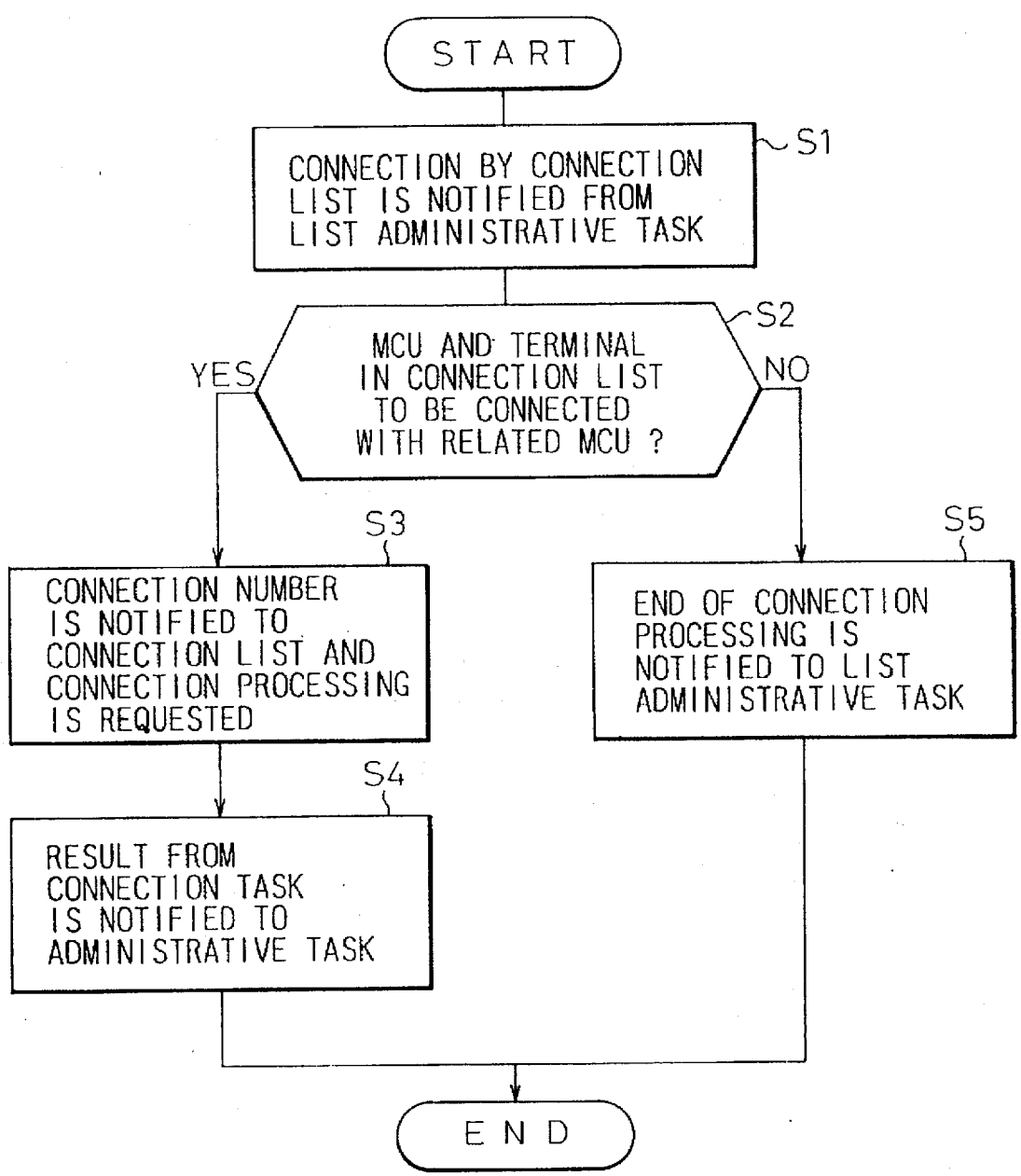
FIG. 14 is a flow chart of the processing of a connection/disconnection administrative task.

The connection/disconnection administrative task 43 is activated as a result of a request from the list administrative task 41 and then performs the processing shown in FIG. 14. That is, when a notification of connection by the connection list is received from the list administrative task 41 (S1 of FIG. 14), it judges if there is an MCU or a terminal under its own MCU which should be connected to according to the connection list (S2). If there is, it notifies the connection task of the connection number and requests connection processing. When receiving the results of the processing from the connection task, it notifies the results to the list administrative task (S3, S4). If there is not, it notifies the list administrative task of the completion of the connection processing (S5).

Figure 15A:
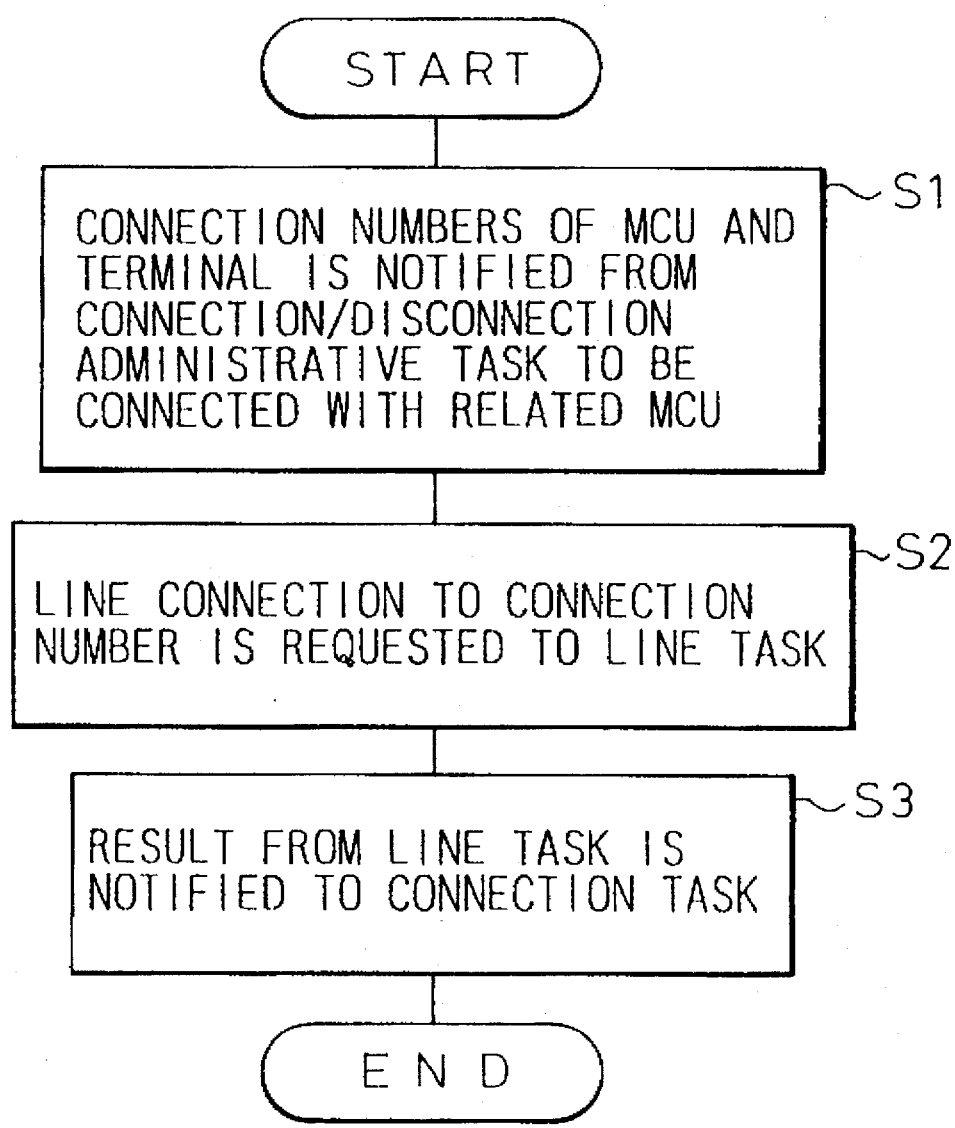

The connection task 44 is activated by a request from the connection/disconnection administrative task 43 and performs the processing shown in FIG. 15A. That is, when it receives from the connection/disconnection administrative task a notification of connection numbers of the MCUs and terminals which its MCU should connect to (S1 in FIG. 15A), it requests to the line task processing for connection to the connection numbers (S22) and notifies the results from the line task to the connection task (S3).

The line task performs the processing shown in FIG. 15B. When it receives a request from the connection task (S1 in FIG. 15B), it performs for processing for connection to the lines of the numbers given from the connection task (S2). It then judges if the lines are connected (S3) and, if connected, notifies the connection task of the completion of the line connection processing (S4). If not able to be connected, it notifies the connection task of the inability of line connection (S5).

The result of the connection processing by the line task is sent through the connection task 44 and connection/disconnection administrative task 43 to the list administrative task 41. There, the results of the processing are written in the connection list of the table 42. That is, the results of the processing for connection to the terminals under its MCU and the adjoining MCUs shown in FIG. 9B (whether connection is completed or not possible) are written in the corresponding flag regions. In the case of connection to MCUs, the order of connection is written in the connection order region.

At the point of time when the results of the processing for connection to the MCUs are written, the list administrative task 41 notifies the list transmission/reception task 47 of the connection list (S7 of FIG. 13B). The list transmission/reception task 47 sends the connection list to the other connected MCUs (adjoining MCUs, in the example of FIG. 11, the MCU2), through the lines.

When the line task 46 fails in line connection, it notifies the connection task 44 of the inability to connect the line.

The connection task 44 then notifies the connection/ disconnection administrative task 43 of the inability of connection and the connection/disconnection administrative task 43 writes the inability of connection in the connection list of the table 42. If connection to an MCU is not possible, it judges the next MCU to be connected (MCU above or below unconnectable MCU) from the connection list (by processing of S6 and S4 in list administrative task of FIG. 13B) and sends that information from the connection/ disconnection administrative task 43 to the connection task 44. The connection task 44 performs the processing for connection by the same routine as above.

The above operation will be explained for the case of building a cascade configuration of MCUs using the connection list shown in FIG. 17A and 17B and with reference to the sequence of operations for building a cascade configuration of FIGS. 17A and 17B shown in FIG. 18.

In the case of FIG. 17A, there are a total of eight MCUs, that is, the MCU1 to the MCU8, connected on a public network etc. Assume the operator of the MCU2 among these makes a request for building a cascade configuration television conference from the console 3. In this case, the MCU2 is the starting point. Note that the operations of (1), (2) ... correspond to the numbers shown in FIG. 18.

(1) A connection list is prepared in the MCU2 in response to a request for connection by a list from the console 3 connected to the MCU2.

(2) Processing is performed in the MCU2 for connection to the MCUs (and terminals) to be connected according to the connection list. Here, this is performed for the MCU3 and MCU1.

(3) After the connection processing, the connection information (connection flags and order of connection) is written in the connection list prepared at (1) and the list is sent to the MCU3 and MCU1.

(4) Receiving the connection list, the MCU1 reads the connection list to find the MCUs (or terminals) to be connected from itself. If there are no such MCUs, it sends the connection list back to the MCU2.

(5) The MCU3 receiving the connection list searches through the connection list for the MCUs (terminals) to be connected from it and performs processing for connection to the MCU4. In this case, however, connection from the MCU3 to the MCU4 is not possible, as shown in FIG. 17A.

(6) Due to the failure of connection to the MCU4, the MCU3 searches through the connection list, finds the next MCU5 to be connected, then performs processing for connection with the same. Due to this processing, the MCU4 is bypassed and the upper MCU5 is automatically connected with.

(7) In the same way as the above (3), the connection information is written in the list and the list sent to the MCU5.

(8) to (13) The above processing is executed in the same way for connection to the MCU8.

(14) The MCU8 determines from the connection list that there is no MCU to be connected, then sends back the list. The connection list is successively sent back and finally reaches the MCU2.

A cascade configuration can be built in this way.

Figure 18:
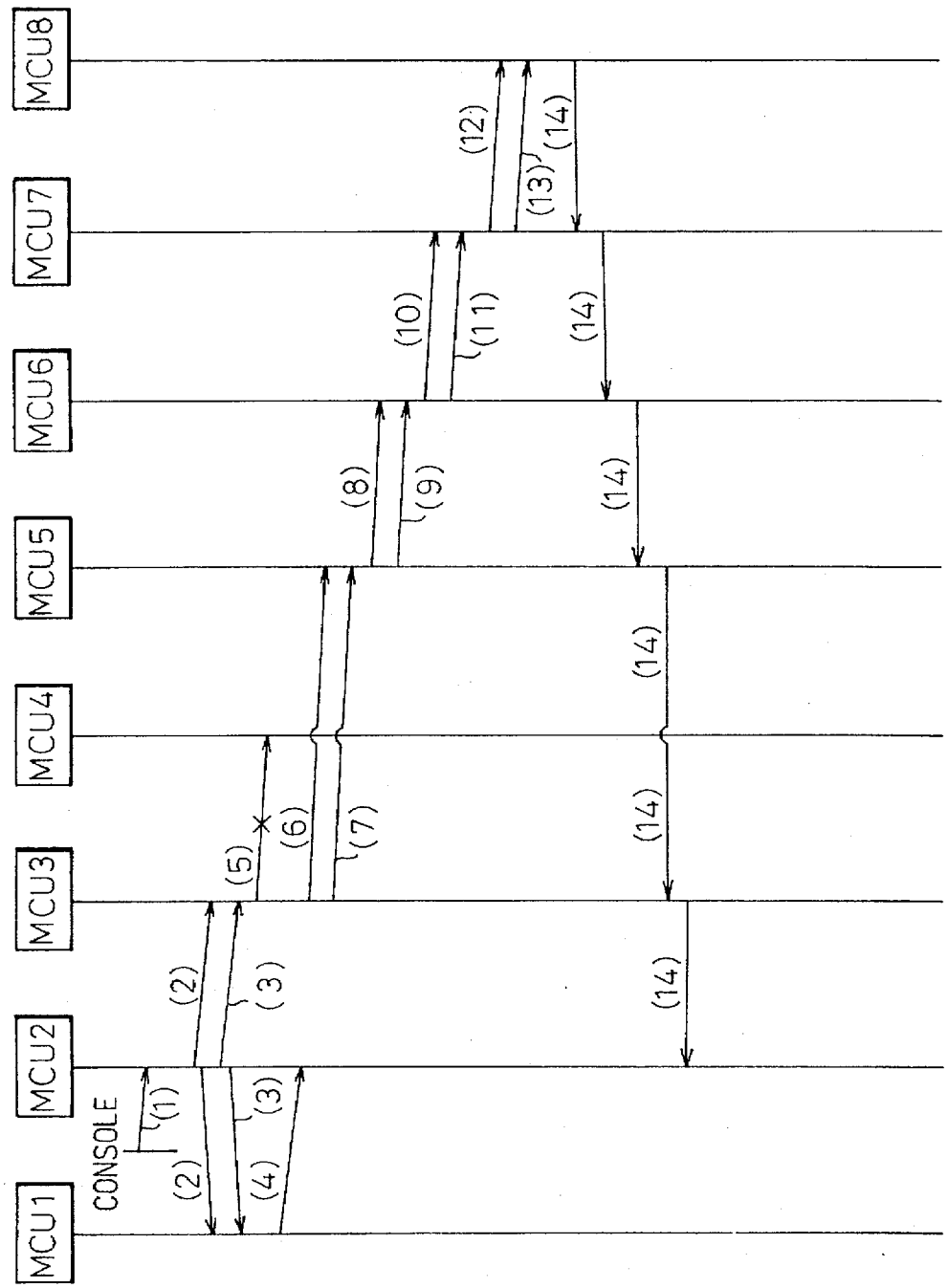
FIG. 18 is a view of the sequence of operations in the cascade configuration of FIG. 17, FIGS. 19A and 19B are views of an example of the building of a cascade configuration by a different route at an intermediate MCU.
Figure 20:
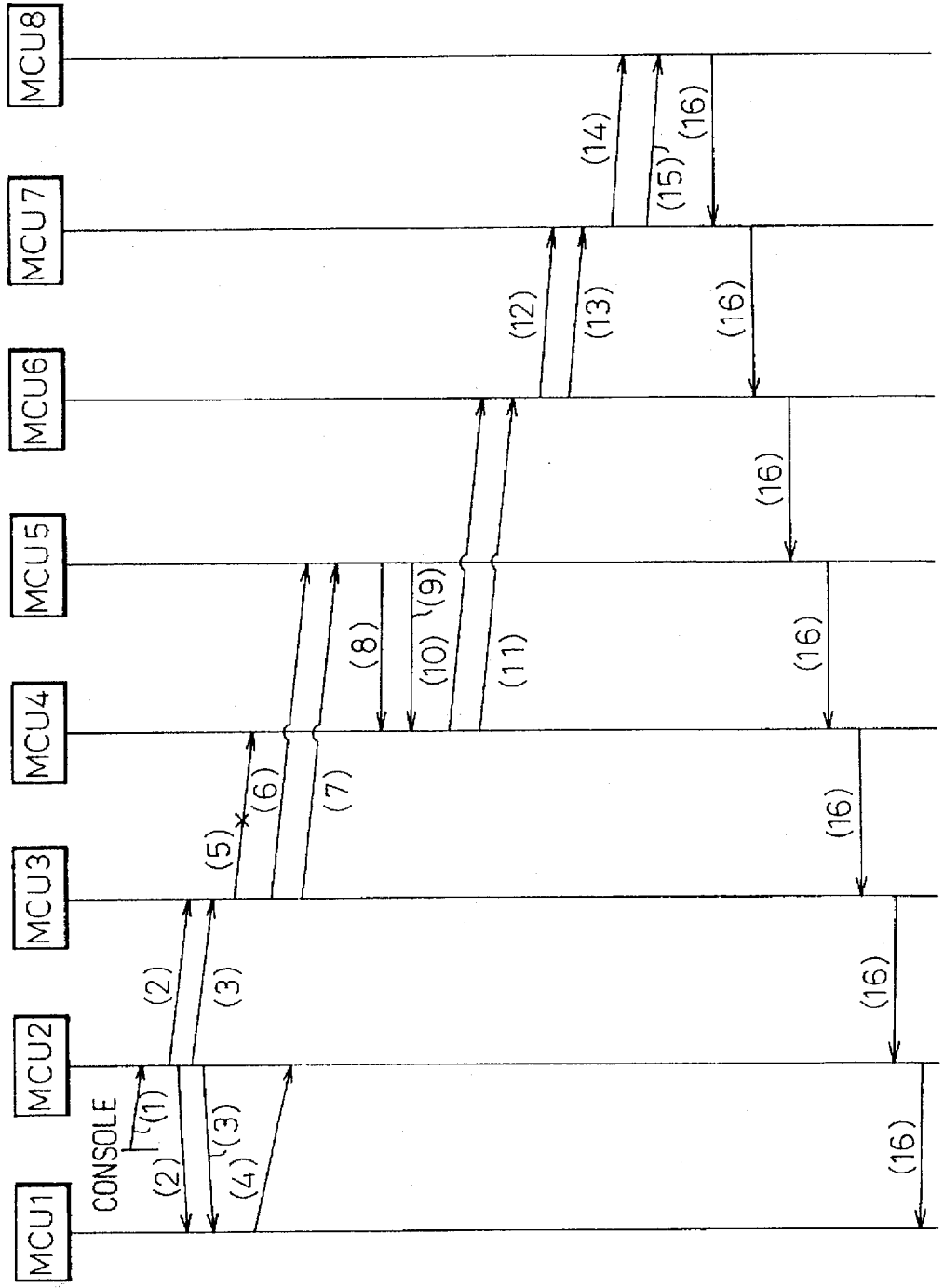
FIG. 20 is a view of the sequence of operations in the cascade configuration of FIG. 19, FIGS. 21A and 21B are flow charts of the processing of a factor analysis task and list transmission/reception task.

In the example of FIGS. 17A and 17B and FIG. 18, it was not possible to connect from the MCU3 to the MCU4, so a connection was established from the MCU3 to the MCU5 and from the MCU5 to the MCU6. The following FIGS. 19A and 19B show an example of building a cascade configuration by a different route at an intermediate MCU. FIG. 20 shows the sequence of operations for building the cascade configuration of FIG. 19A.

An explanation will be made of the example of FIGS. 19A and 19B with reference to FIG. 20.

(1) to (7) For the processing for connection up to the MCU5, similar processing as in the above FIG. 18 is performed.

(8) The MCU5 receives the connection list, then judges from the connection list how to connect to the unconnected MCU4 and performs processing for connection to the same.

(9) After connection, the connection information is written in the list and the connection list is sent to the MCU4.

(10) After the connection list is received, the MCUs to be connected are determined from the list and processing for connection to the MCU7 is performed.

(11) A connection list is sent to the MCU6 in the same way as the above (9) after the connection.

(12) to (15) Similar processing to as above is executed and processing is performed for connection to the MCU8.

(16) Similar processing is performed as (14) of FIGS. 17A and 17B.

In this way, connection is performed from the MCU5 back to the MCU4 and from the MCU4 to the MCU6 so as to incorporate the MCU4 in the cascade configuration.

As shown in FIG. 18 and FIG. 20, when the end of the cascade configuration in the connection list is reached, a connection list carrying the connection results from the end MCU is sent to the administrative MCU (meaning the origination MCU).

In the present invention, the MCU receiving the connection list including the connection results prepares a list of the MCUs in the order of connection (referred to hereinafter as the "conference configuration list"), distributes the same to all the MCUs, and thereby enables each of the MCUs to determine the configuration of the conference.

Figure 21A:
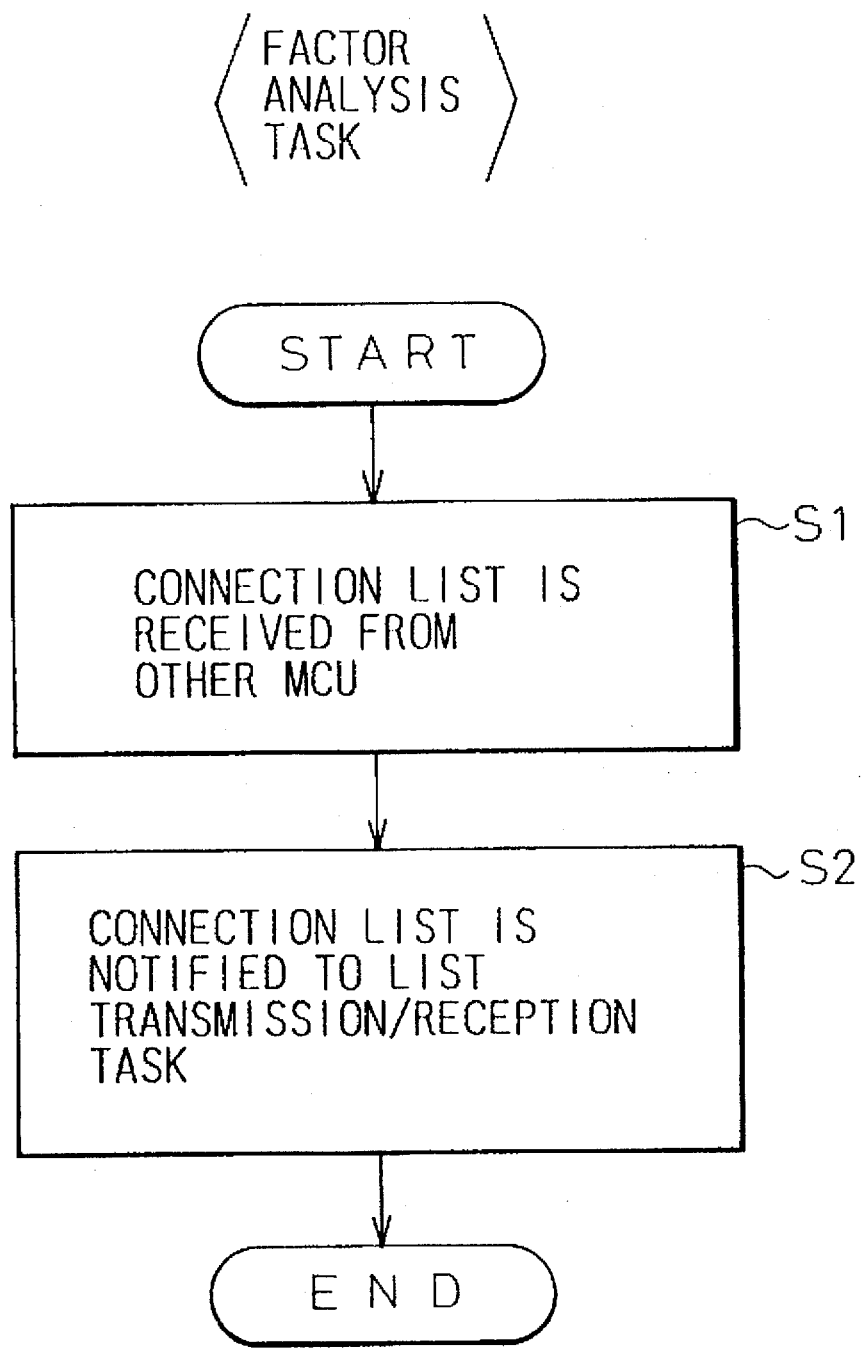
Figure 21B:
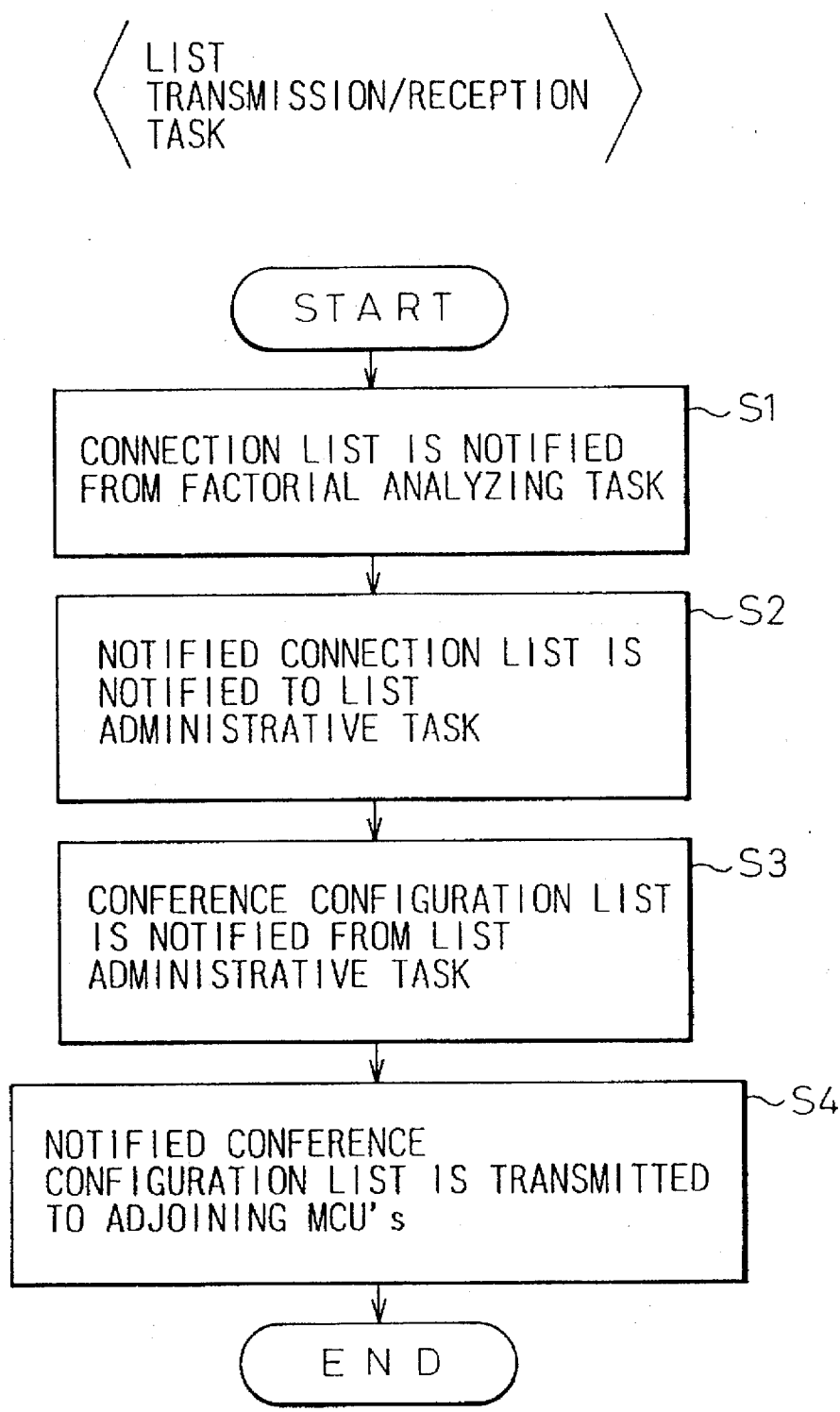
Figure 22:
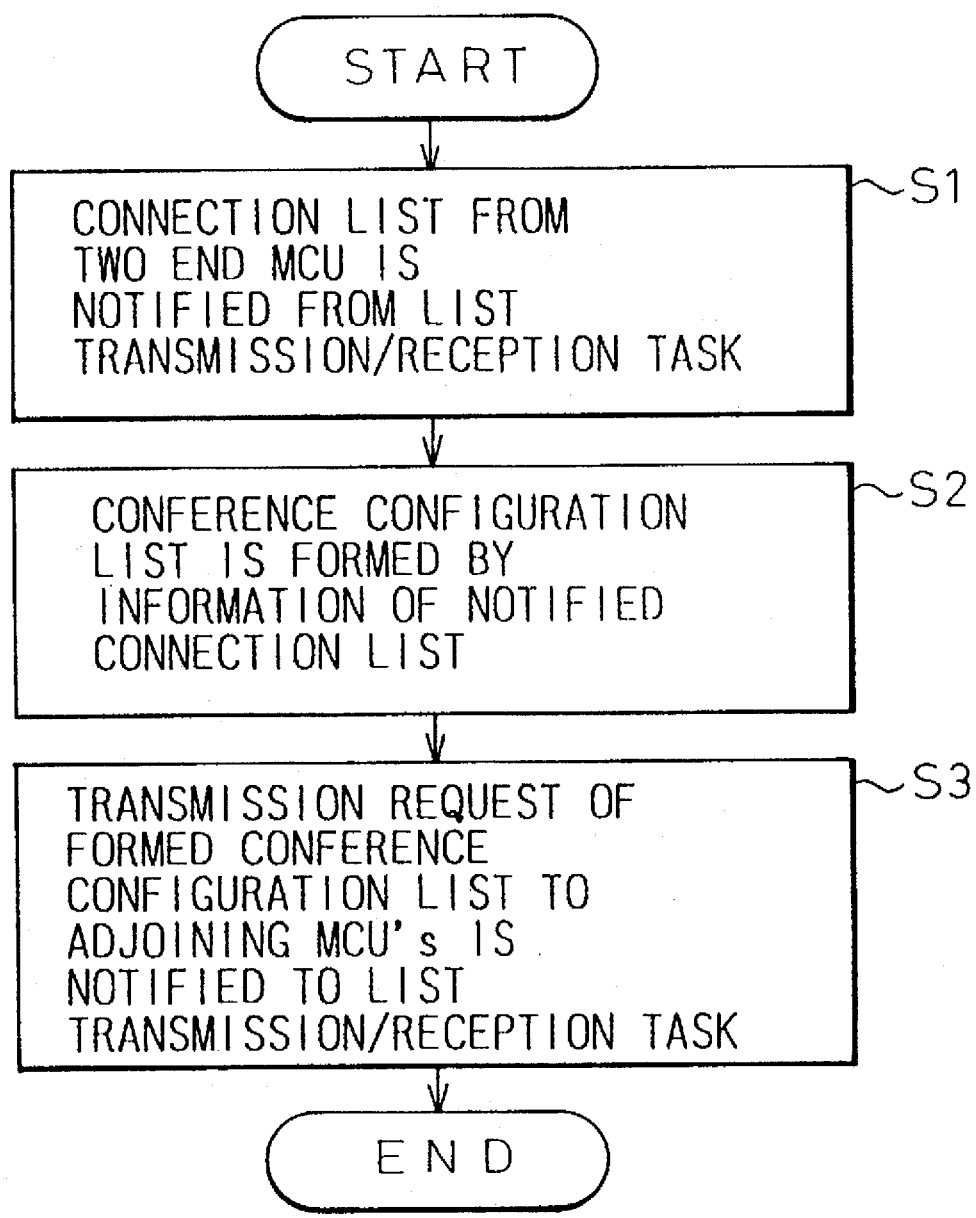
FIG. 22 is a flow chart of the processing of a list administrative task.

As shown by the sequence of operations of FIG. 18 and FIG. 20, when the administrative MCU is sent connection lists including the results of connection from the MCU1 and MCU8 at the ends of the cascade configuration, the administrative MCU performs the following processing. This will be explained with reference to the configuration of MCUs shown in FIG. 10. The received connection lists are notified to the list transmission/reception task 47 by the flow of processing shown in FIG. 21A, the processing shown by FIG. 21B is performed by the list transmission/reception task 47, and the received connection lists are transferred to the list administrative unit 41. The list administrative task 41 prepares the conference configuration list by the processing of FIG. 22.

That is, when the list administrative task 41 receives the connection lists from the two end MCUs, it prepares a conference configuration list based on the actual configuration from the connection information and order of connection in the connection lists. The prepared conference configuration list is then sent from the list administrative task 41 to the list transmission/reception task 47. The list transmission/reception task 47 sends the conference configuration list to the adjoining MCUs. The MCUs receiving this judge the next adjoining MCUs in their own internal list administrative tasks and send the list on to those MCUs. This is continued until the end MCUs.

Figure 23A:
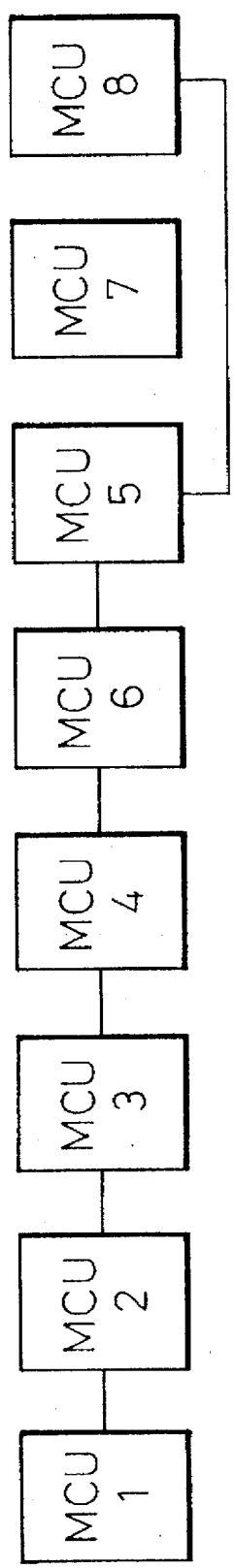
FIGS. 23A and 23B are views of an example of the preparation of a conference configuration list.
Figure 23B:
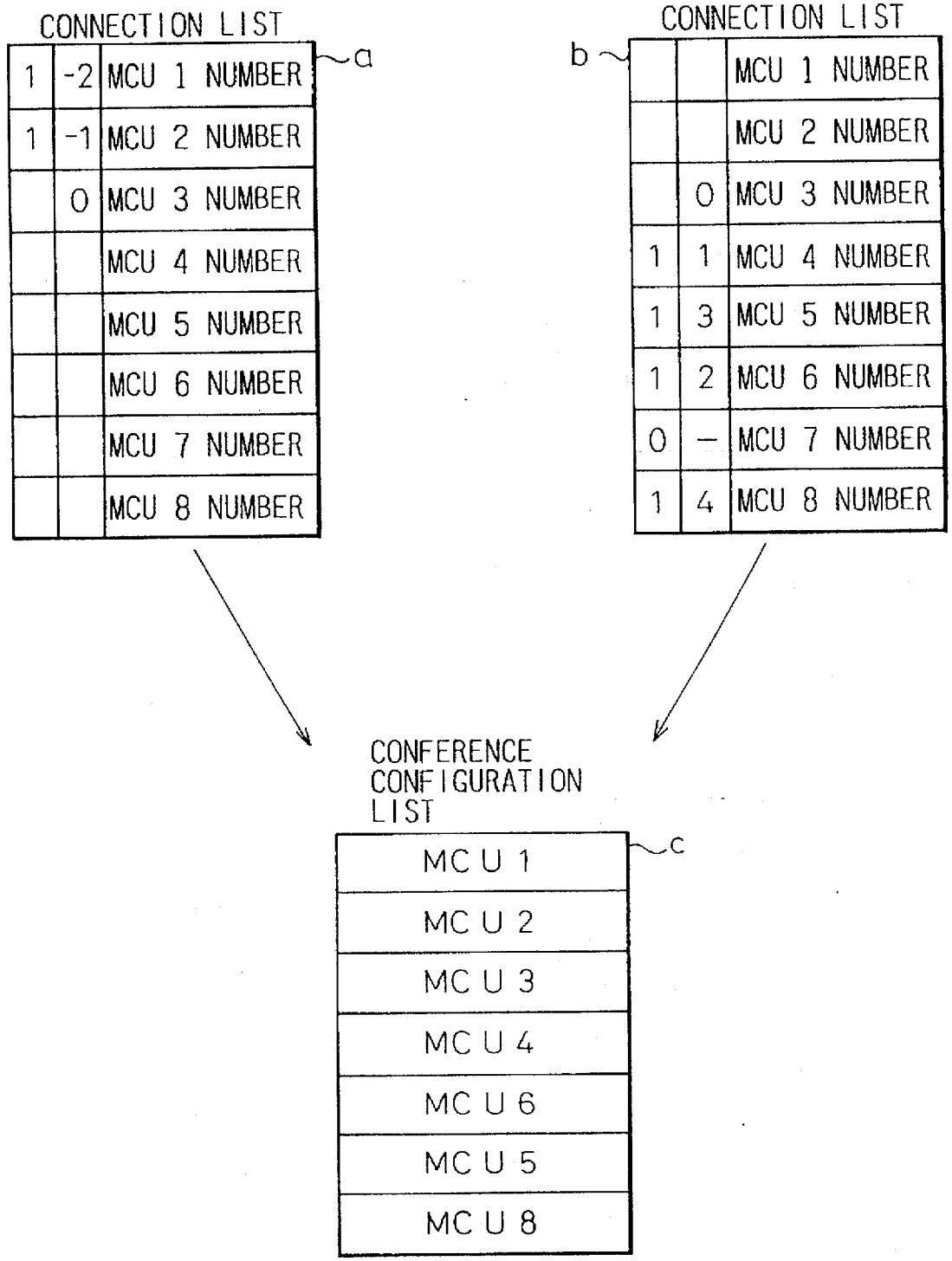

FIGS. 23A and 23B show an example of the preparation of a conference configuration list.

In the configuration from the MCU1 to the MCU8, the MCU3 is the administrative MCU and performs processing for connection in the direction of the lower MCU2 and the direction of the higher MCU4 in accordance with the input connection list and thereby successively connects to the same. When a cascade configuration is built excluding the MCU7 as a result as shown in FIG. 23A, the MCU1 and the MCU8 at the two ends of the cascade configuration give the connection list a and connection list b carrying the results of connection as illustrated. The connection list a is in the lower direction, so the order of connection is shown by negative numbers, while the connection list b is in the upper direction, so the order is shown by positive numbers. The connection flag is "0" for the MCU7, so nothing is written for its order of connection.

When the administrative MCU3 receives these two connection lists a and b, the list administrative task explained above rearranges its list using the numbers of the connection order for the MCUs with "1" connection flags. As a result, a conference configuration list shown by c is prepared. This conference configuration list is sent to the other connected MCUs so as to enable all MCUs to determine the cascade configuration during the conference.

When a cascade configuration is built in the manner explained with reference to the above FIG. 10 on, a conference configuration list such as shown in FIG. 23 is prepared and distributed to all the MCUs, and all the terminals connected to an MCU positioned in the middle of the cascade configuration sign off during the conference, the administrative MCU is notified of this by the mutual operation of the MCUs. In this case, the intermediate MCU may be disconnected manually by determination of the bypass route or may be disconnected automatically.

First, an explanation will be made of the operation of the MCUs related to the administrative MCU for manually establishing the bypass route.

Figure 24:
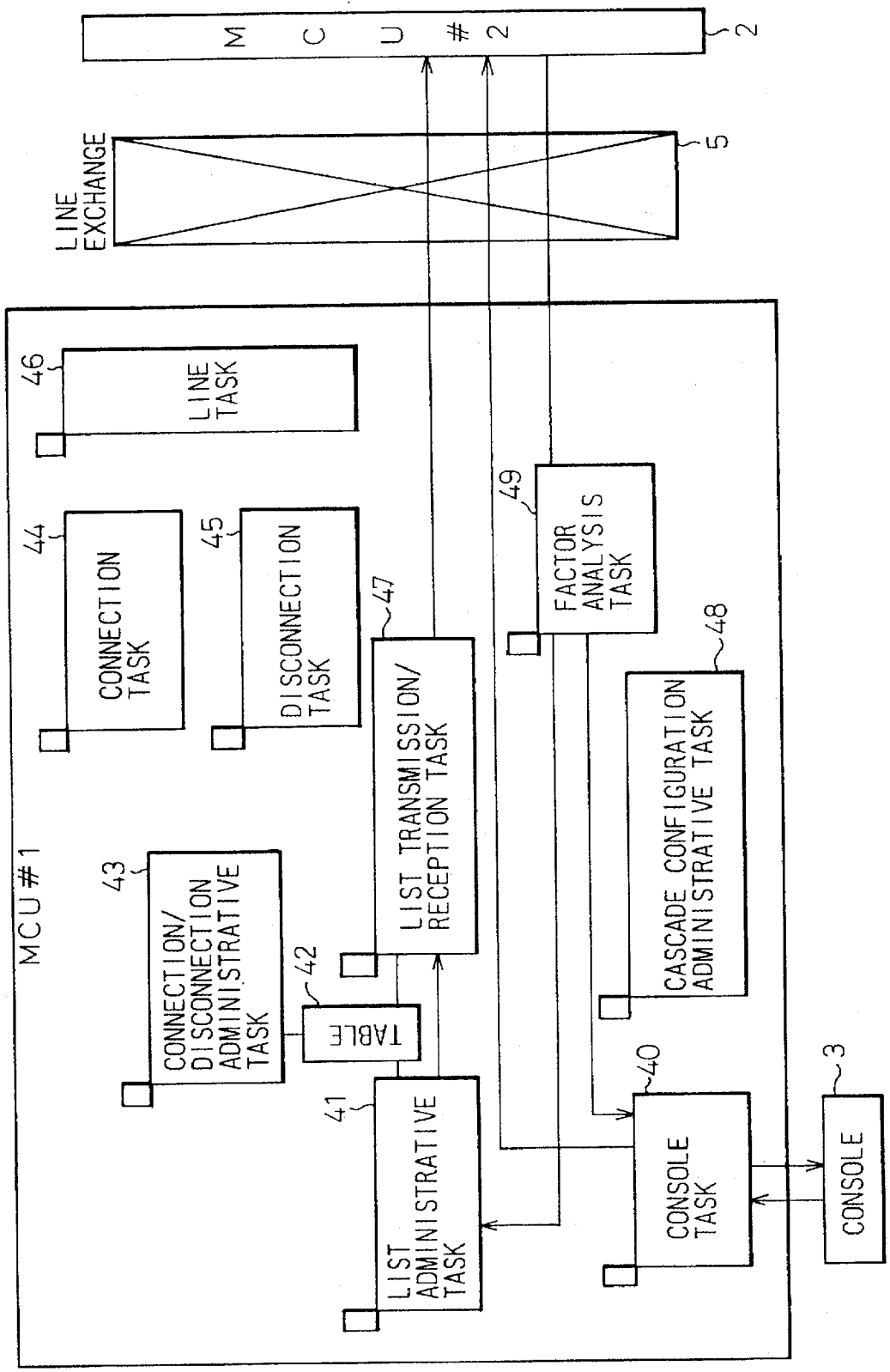
FIG. 24 is a view of the operation among tasks for manual disconnection of an intermediate MCU whose terminals have all signed off.
Figure 25:
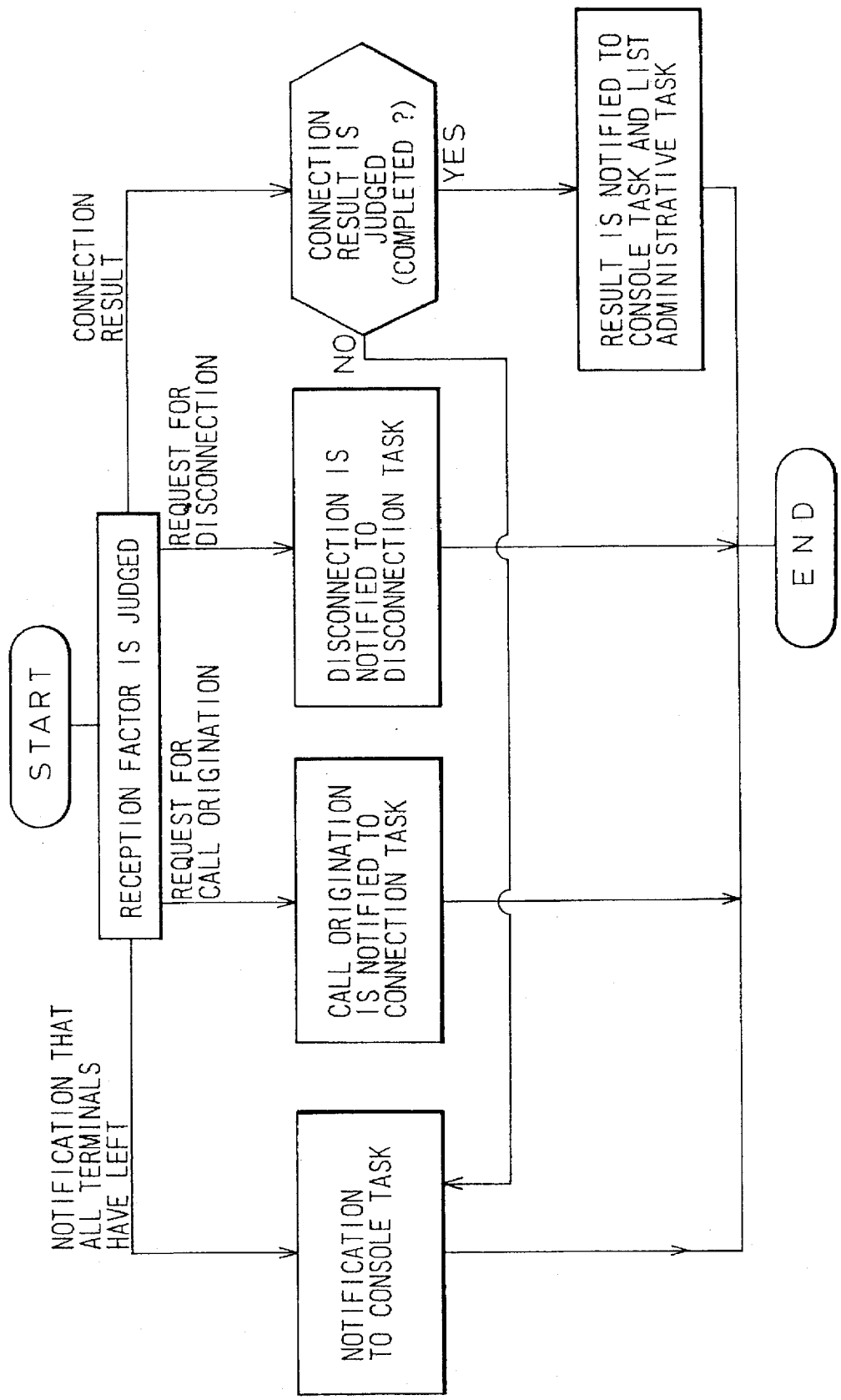
FIG. 25 is a flow chart of the processing of a factor analysis task.

FIG. 24 shows the operations among tasks for manual disconnection of an intermediate MCU whose terminals have all signed off. The explanation will be made below with reference to FIG. 25 to FIG. 30 showing the processing at each of the tasks.

When an intermediate MCU confirms that all of the terminals under it have signed off, it sends a notification to that effect to the administrative MCU which issued the conference configuration list.

This notification from the intermediate MCU goes through the factor analysis task 49 and console task 40 of the administrative MCU in FIG. 24 and reaches the console 3. That is, in the flow of processing of the factor analysis task shown in FIG. 25, judgement of the reception factor is made. When it is determined that the notification is one of all terminals having signed off, this is notified to the console task. That is, as shown in FIG. 24, the factor analysis task executes the processing in accordance with the call origination request, disconnection request, connection results, etc.

Figure 26:
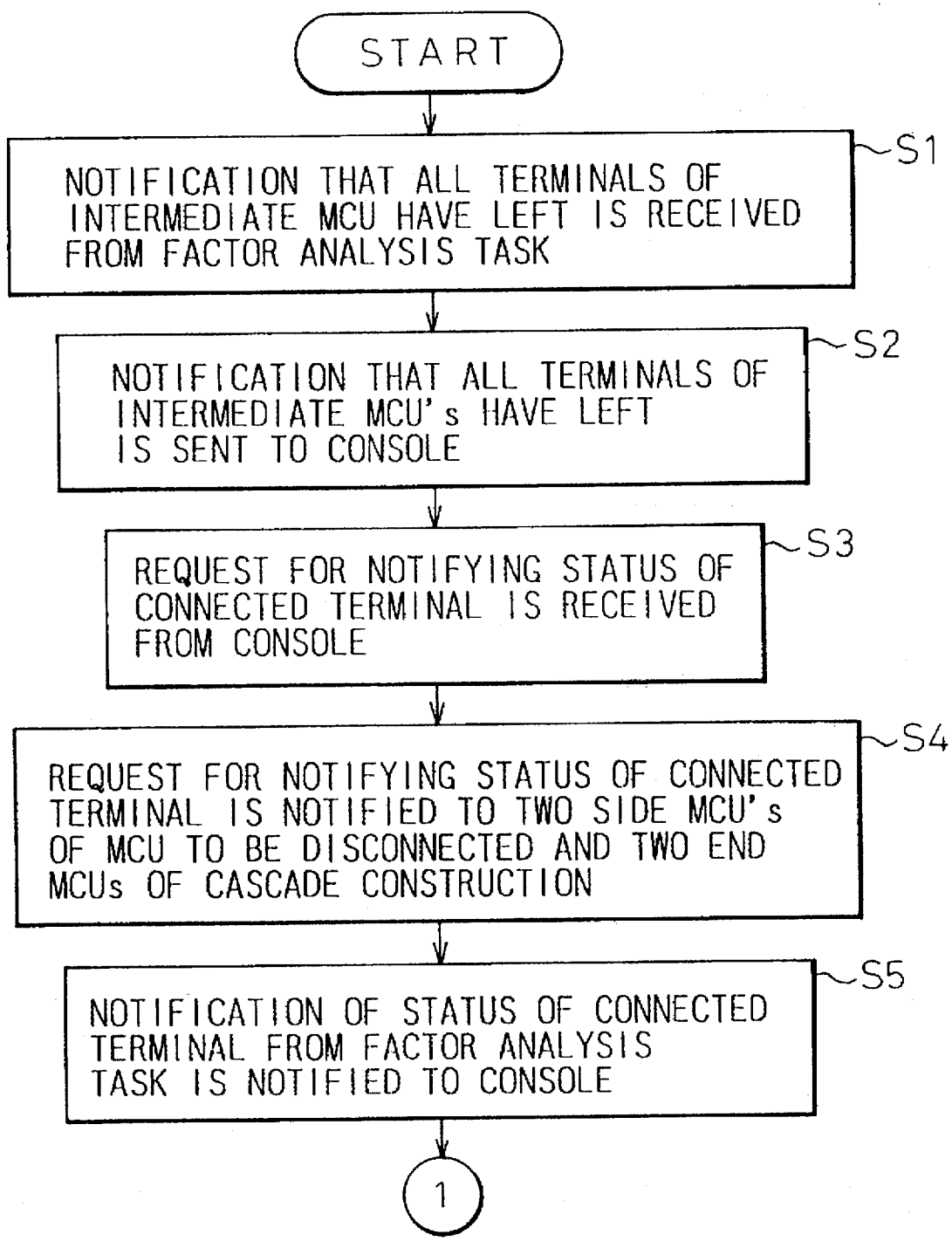
FIG. 26 is a first part of a flow chart of the processing of a console task.
Figure 27:
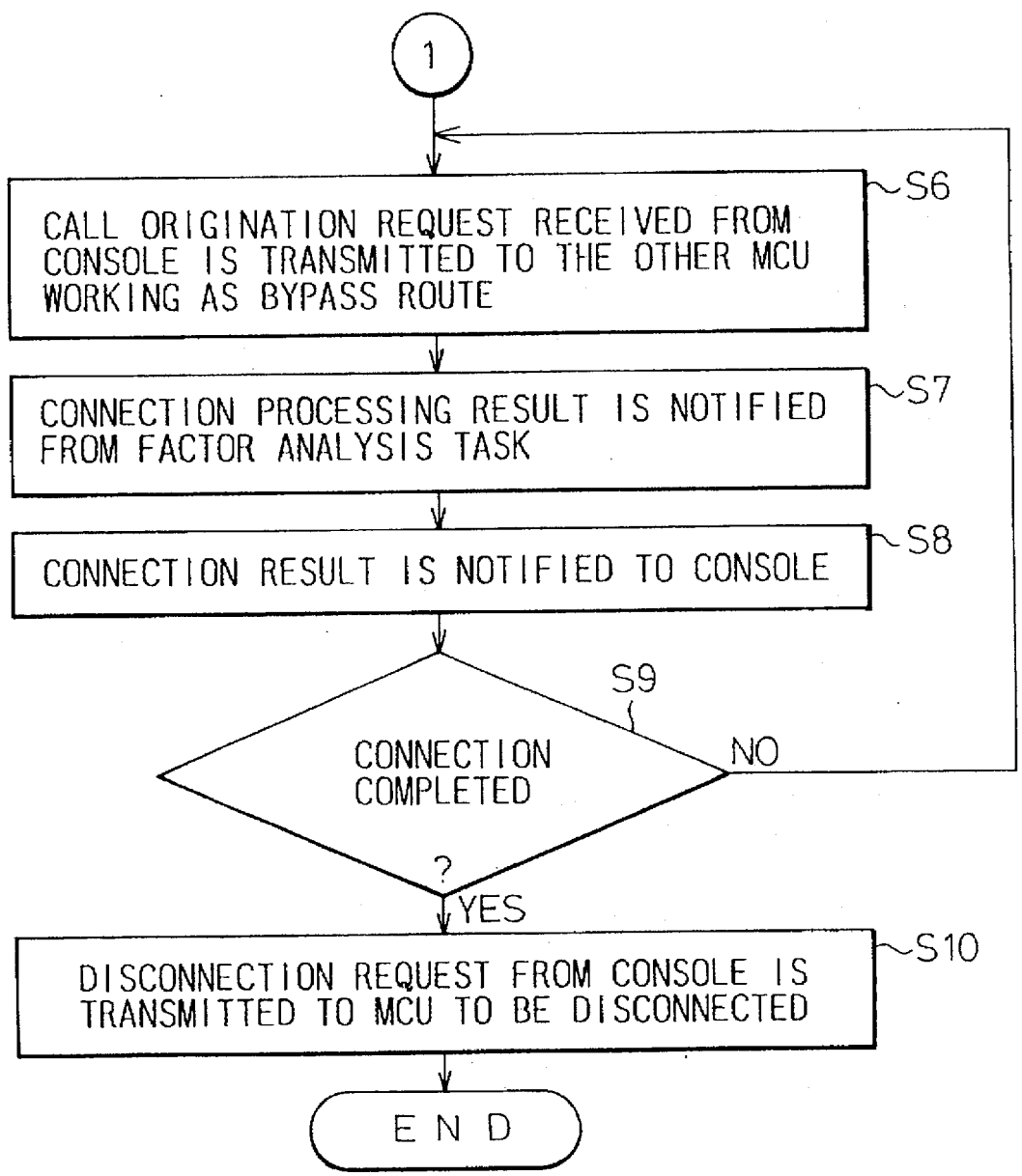
FIG. 27 is a second part of a flow chart of the processing of a console task.

The flow of processing of the console task is shown in FIG. 26 and FIG. 27. When there is a notification from the factor analysis task, this is notified to the console (S1 and S2 in FIG. 26). When the operator sees this notification (including conference configuration list and number of MCU whose terminals have all signed off) from the display on the console, he inputs a request for notification of the status of connected terminals from the MCUs at the two sides of the MCU to be disconnected and the MCUs at the two ends of the cascade configuration. This request is received at the console task and then notified to all the related MCUs (S3 and S4 in FIG. 26). Next, when the results of the notification of the status of connected terminals from the MCU to be disconnected are sent from the factor analysis task to the console task, this is notified to the console (S5).

The operator views the results, selects the bypass route, and sends a request for call origination to one of the MCUs of the bypass route. The request for call origination is sent to the MCU corresponding to the call origination request (S6 in FIG. 27). The MCU receiving this request for call origination performs processing for connection to form the bypass route. When the results of the connection processing are sent in from that MCU, it notifies this from the factor analysis task to the console task (S7) and then notifies the results to the console (S8) and judges if the connection has been completed or not (S9). When it judges that connection has been completed, it sends the disconnection request input by the operator from the console (for disconnection of the MCU whose terminals have all signed off) to the MCU to be disconnected (S10). When the connection is not completed, the routine returns to S6.

In the above processing, when one of the MCUs at the two sides of the MCU receiving the request for call origination and to be disconnected receives the call origination request, it performs processing for connection of the bypass route by the processing of the connection/disconnection administrative task, the connection task, and the line task in the MCU. The flow of processing is shown in FIG. 28A to 28D and FIG. 29. When the MCU receiving the call origination request finishes the connection processing, it notifies the results to the administrative MCU. The administrative MCU performs the processing of the list administrative task shown in FIG. 29, rearranges the conference configuration list in accordance with the results of connection, and sends a request for notification to the list transmission/reception task to notify the results to the MCUs at the two ends. In accordance with this, the list transmission/reception task shown in FIG. 28C sends the conference configuration list to the MCUs at the two sides.

Figure 28A:
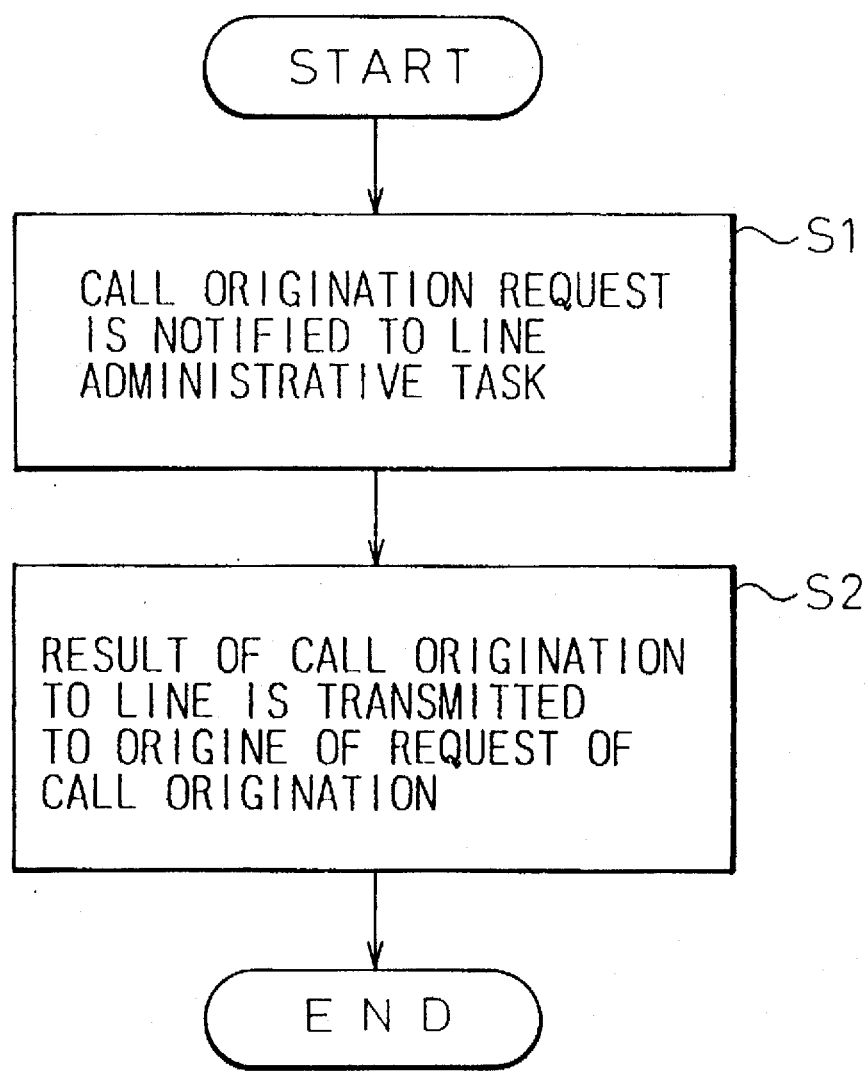
Figure 28B:
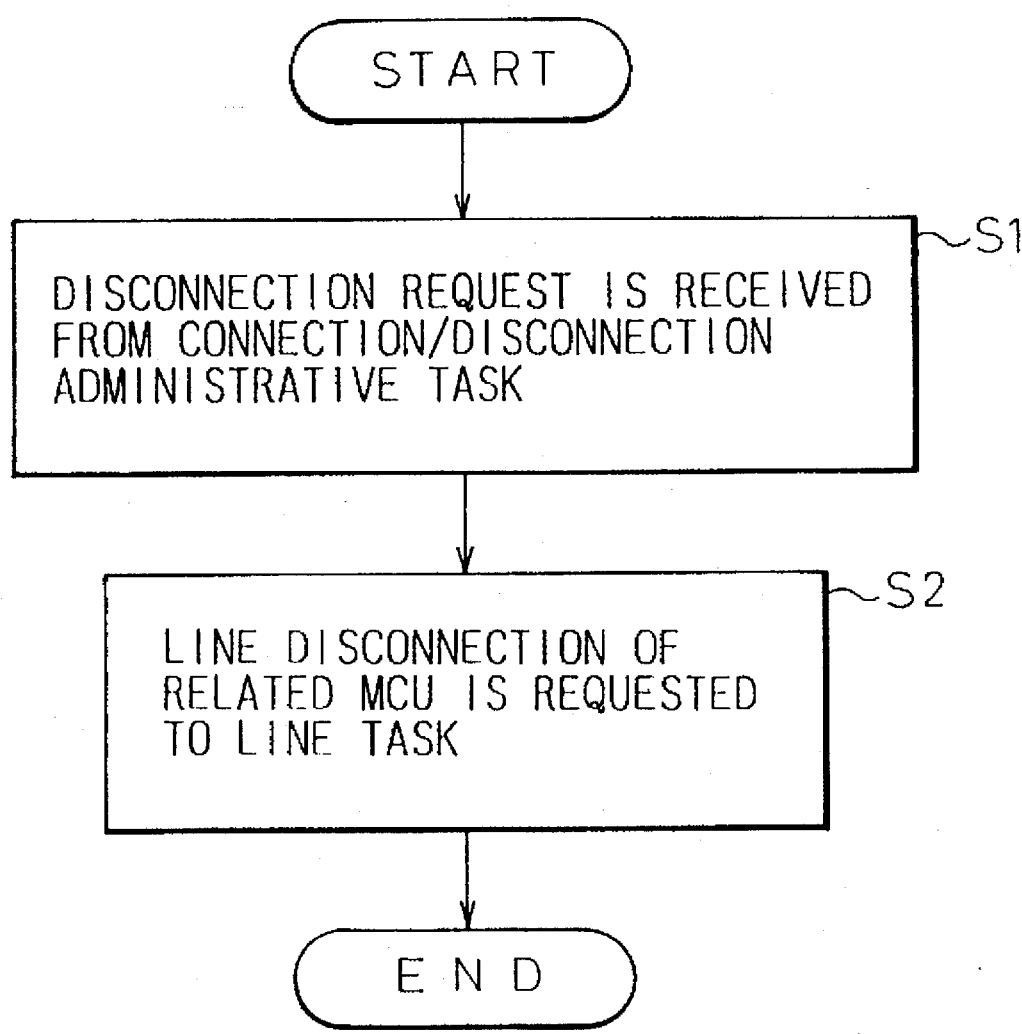
Figure 28C:
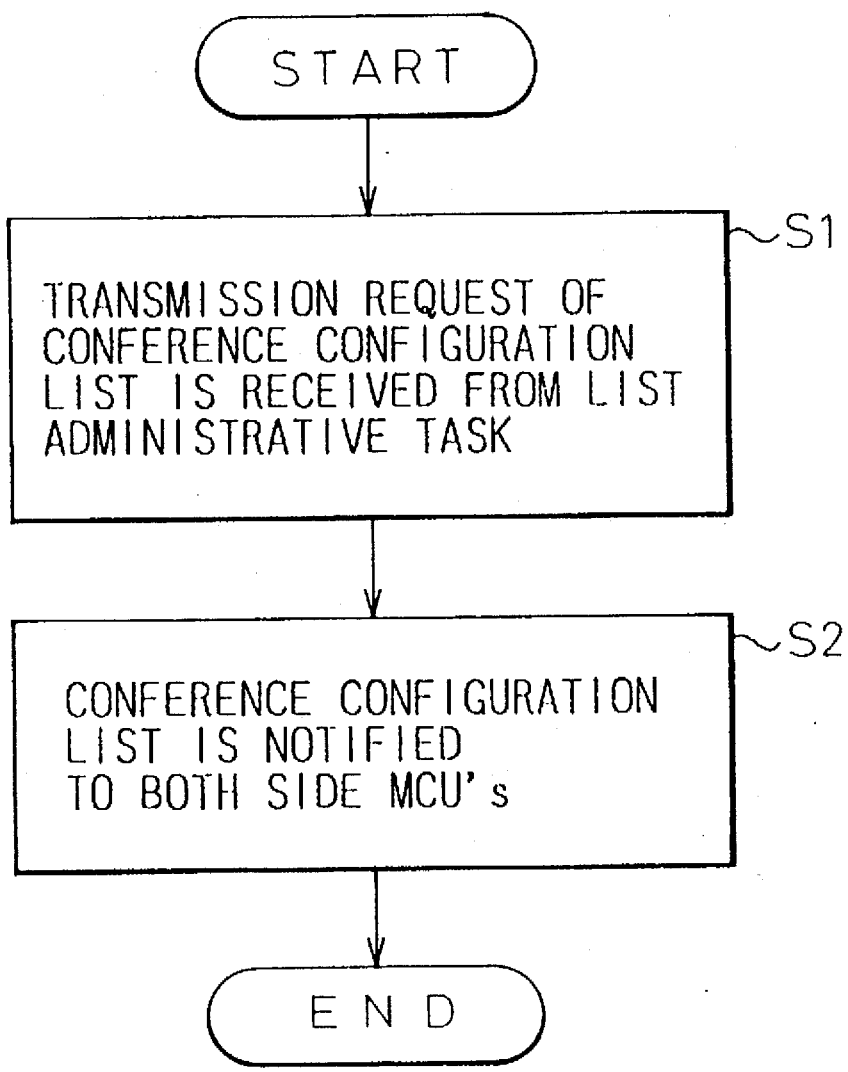
Figure 29:
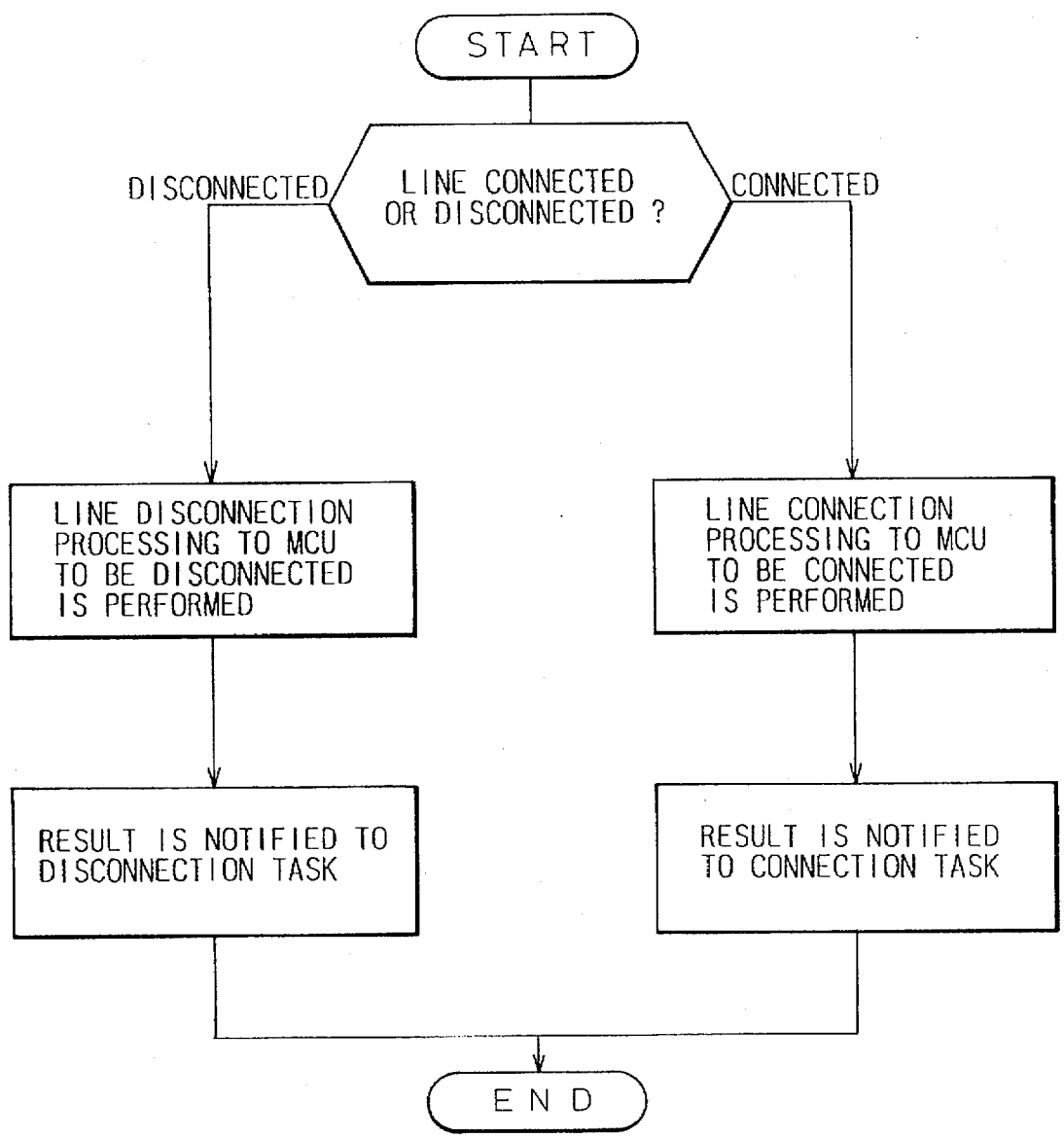
FIG. 29 is a flow chart of the processing of a line task.
Figure 30:
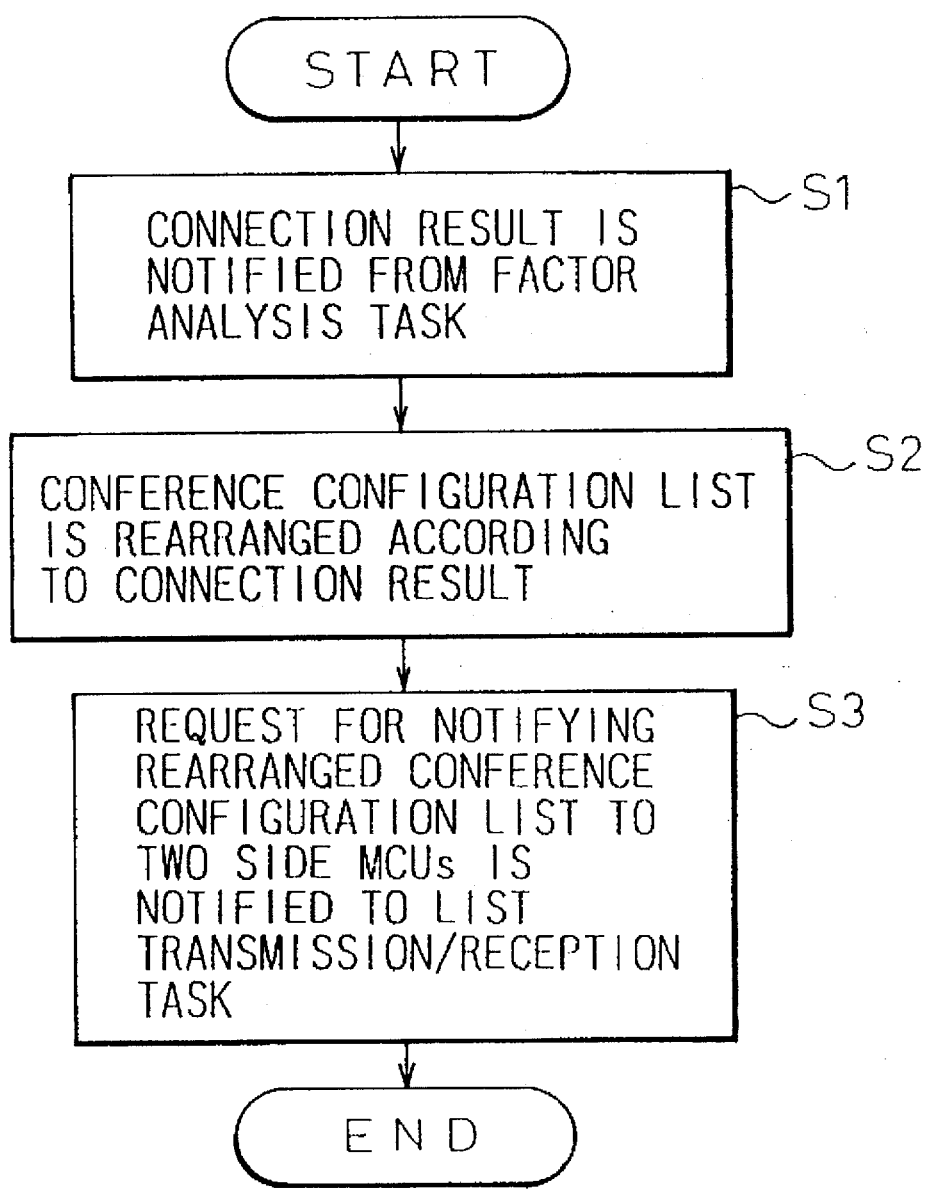
FIG. 30 is a flow chart of the processing of a list administrative task.

After the bypass route is established, the processing for disconnecting the MCU in question (whose terminals have all signed off) by a request for disconnection from a console is performed at the MCU in question by the processing of the connection/disconnection task shown in FIG. 28D, the disconnection task shown in FIG. 28B, and the line task shown in FIG. 29.

When establishment of the bypass route is not possible, the operator selects another bypass route and performs similar processing. The bypass route is selected by the method of giving priority to connection of the MCUs at the two sides of the MCU in question and, when that is not possible, finding a connectable bypass route. Further, the terminal for sending the call origination request is made the one of the MCU with the smaller number among the two MCUs forming the bypass route.

A more concrete example of the connection of a bypass accompanying the manual disconnection of an MCU explained with reference to FIGS. 24 to 30 will be shown in FIG. 31. The sequence of operations of the MCUs is shown in FIG. 32.

Figure 31:
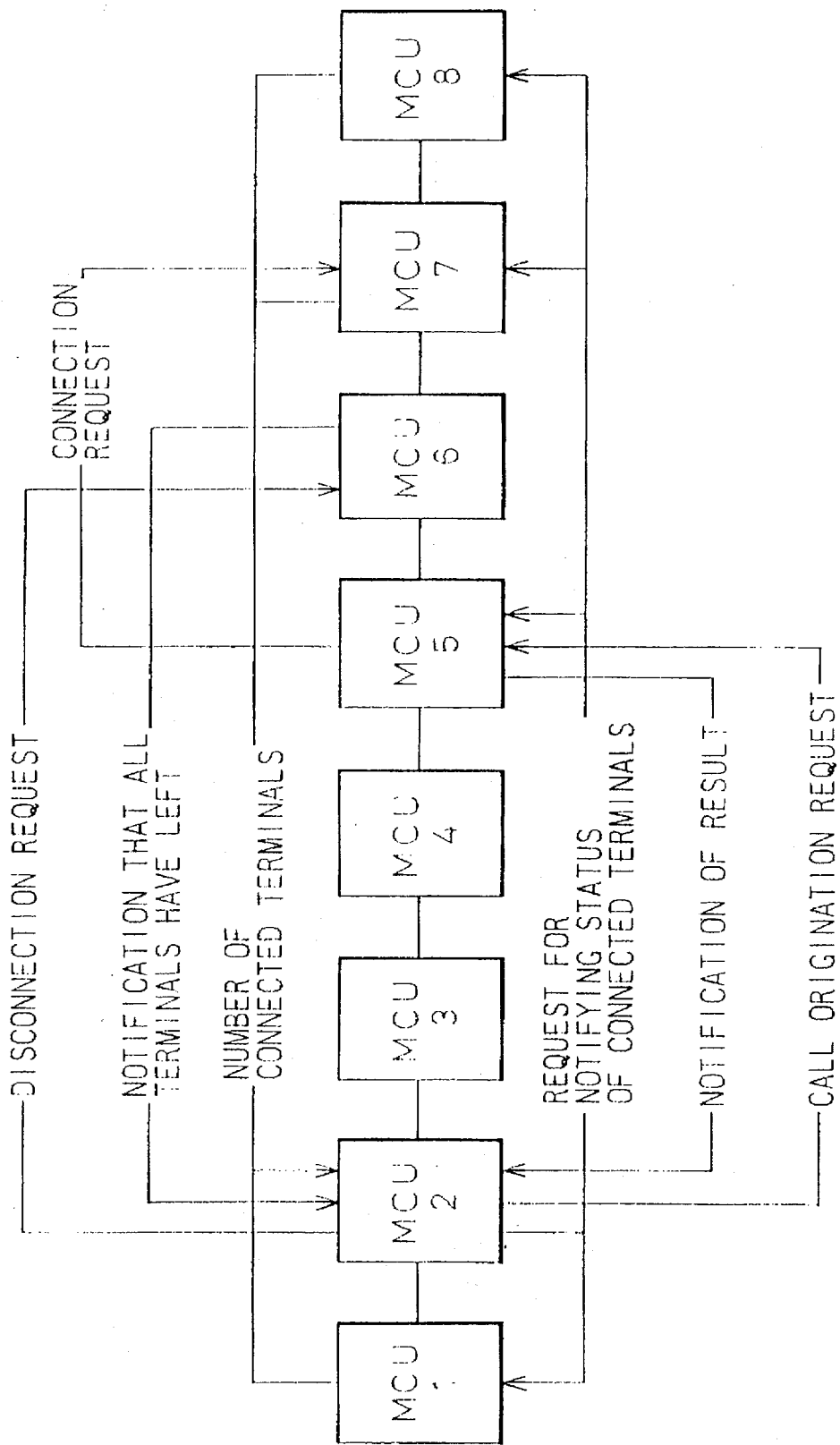
FIG. 31 is a view of a specific example of a bypass connection accompanying manual disconnection of an MCU.
Figure 32:
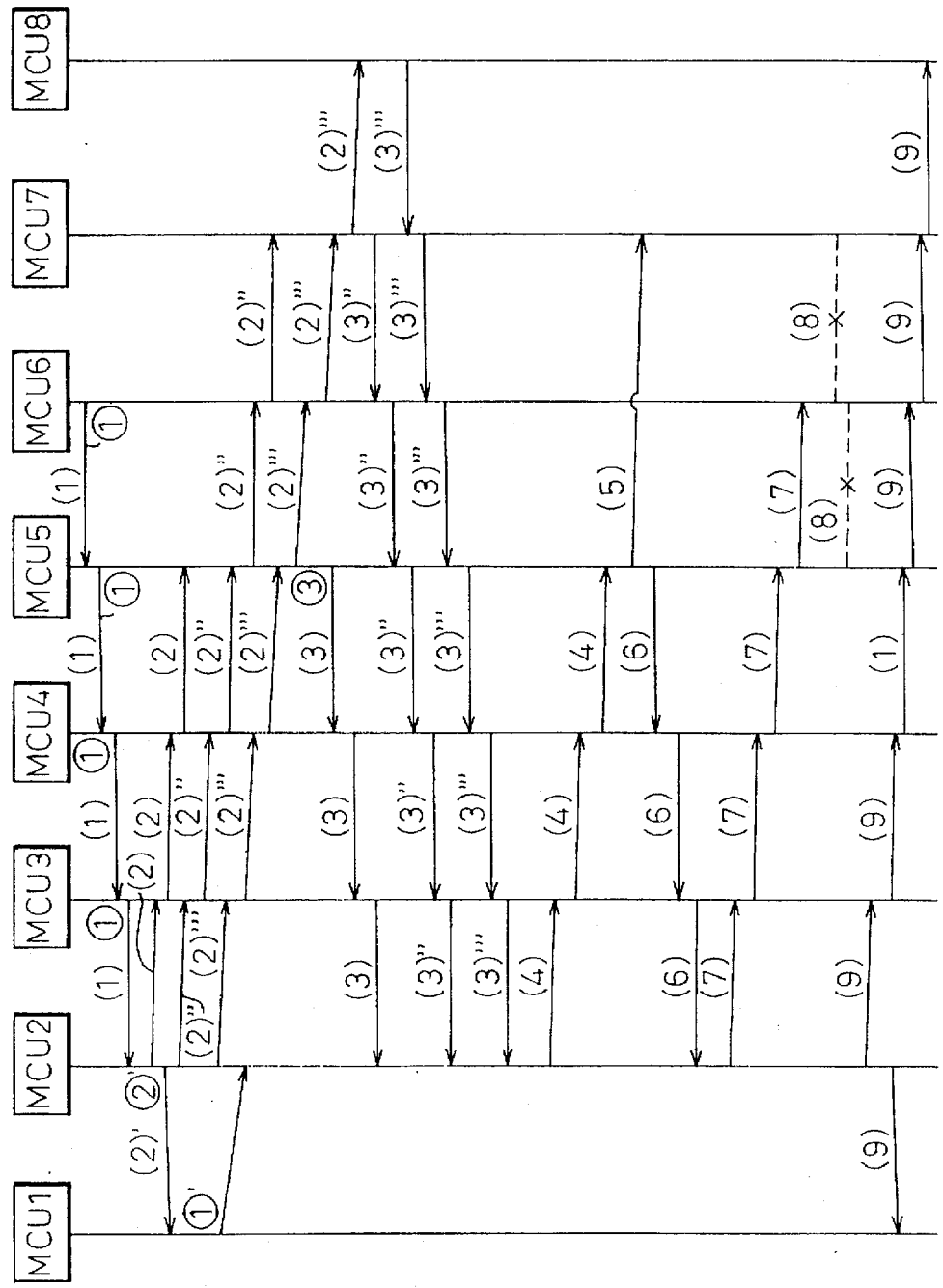
FIG. 32 is a view of the sequence of operations of FIG. 31.

The example of FIG. 31 is the case where the MCU2 among the MCU1 to MCU8 is the administrative MCU and all the terminals under the MCU6 have signed off from the conference. This will be explained with reference to FIG. 32 below.

(1) The MCU6, whose terminals have all signed off, notifies the MCU2 that all terminals have signed off.

(2), (2)', (2)", (2)''' The MCU2 refers to the conference configuration list and sends a request for notification of status of connected terminals to the MCU1 and MCU8 at the two ends of the cascade configuration and the MCU5 and MCU7 at the two ends of the MCU6 to be disconnected.

(3) to (3)''' The MCUs receiving the request for notification of status of connected terminals notify the MCU2 of the numbers of connected terminals. This is displayed on the console.

(4) In accordance with the numbers of terminals notified, the operator of the console decides on a bypass and sends to the MCU5 at one side of the bypass a request for connection with the MCU7. When a large number of terminals are connected to an MCU, the connection is assigned to another MCU with fewer terminals.

(5) The MCU5 receives the request for connection and performs processing for connection with the MCU7.

(6) After connection, it notifies the MCU2 of the results.

(7) Receiving the results (connection completed), the operator sends a request for disconnection to the MCU6 from the console of the MCU2.

(8) The MCU6 receives the request for disconnection and disconnects the lines with the MCU5 and MCU7 on its two sides.

(9) The MCU2 then modifies the conference configuration list based on the results and sends it to all other MCUs.

Next, an explanation will be made of the procedure for automatically selecting a bypass route and disconnecting an intermediate MCU whose terminals have all signed off.

Figure 33:
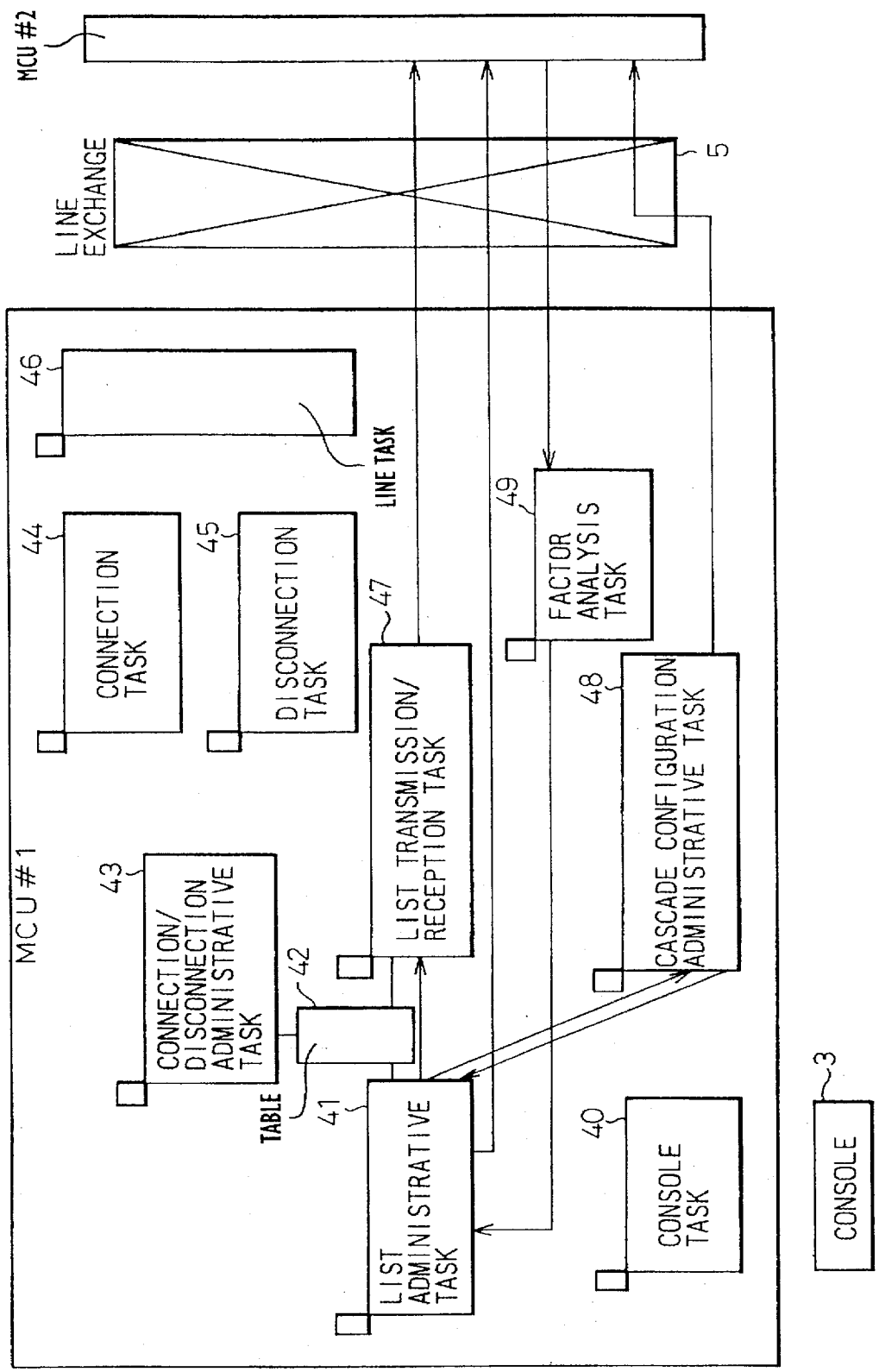
FIG. 33 is a view of the operation among tasks for automatic disconnection of an intermediate MCU whose terminals have all signed off.
Figure 34:
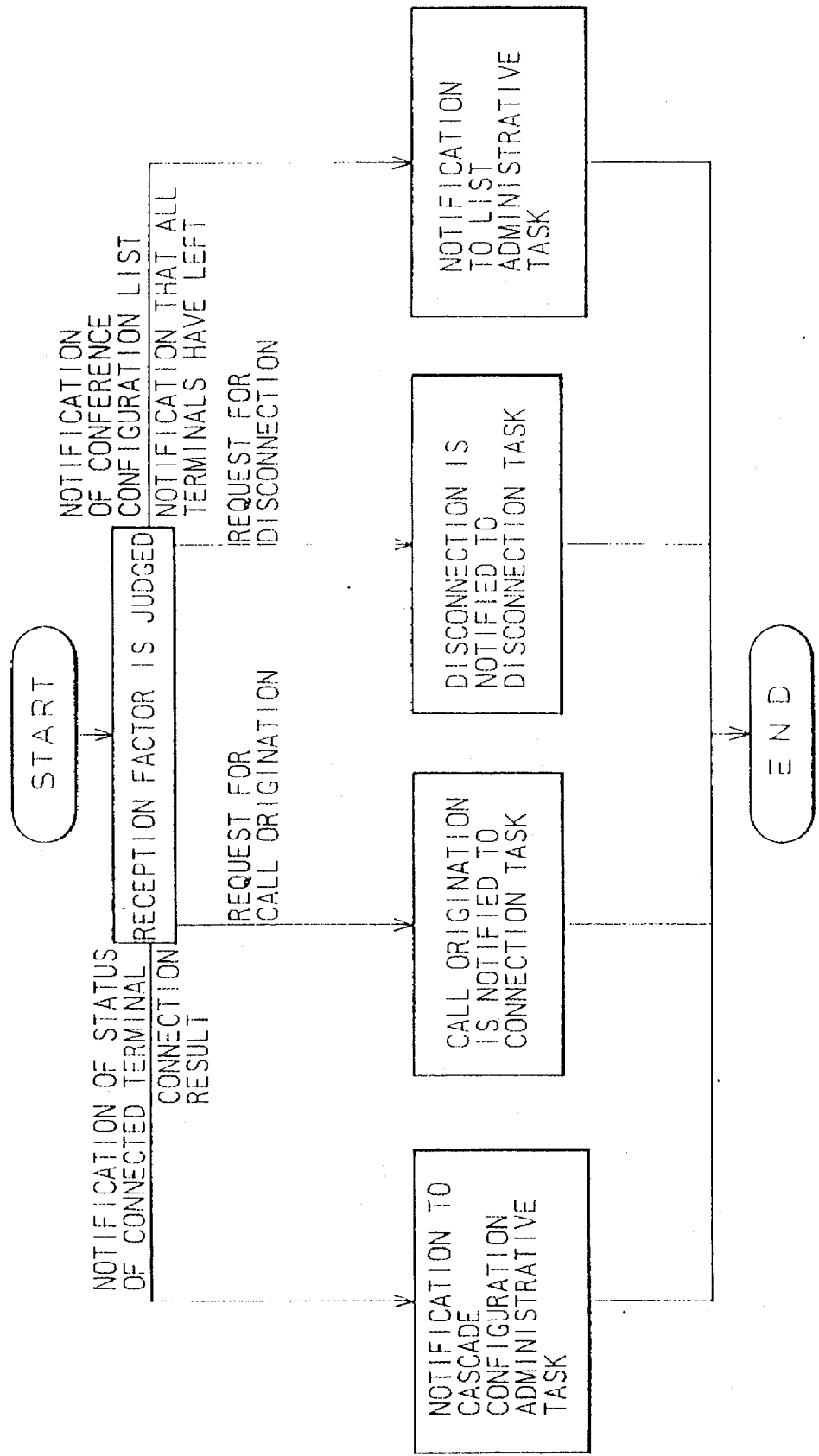
FIG. 34 is a flow chart of the processing of a factor analysis task.

FIG. 33 is a view of the operation among tasks for automatic disconnection of an intermediate MCU whose terminals have all signed off. The operation will be explained below with reference to FIGS. 34 to 37 showing the flow of processing of the tasks.

Figure 35:
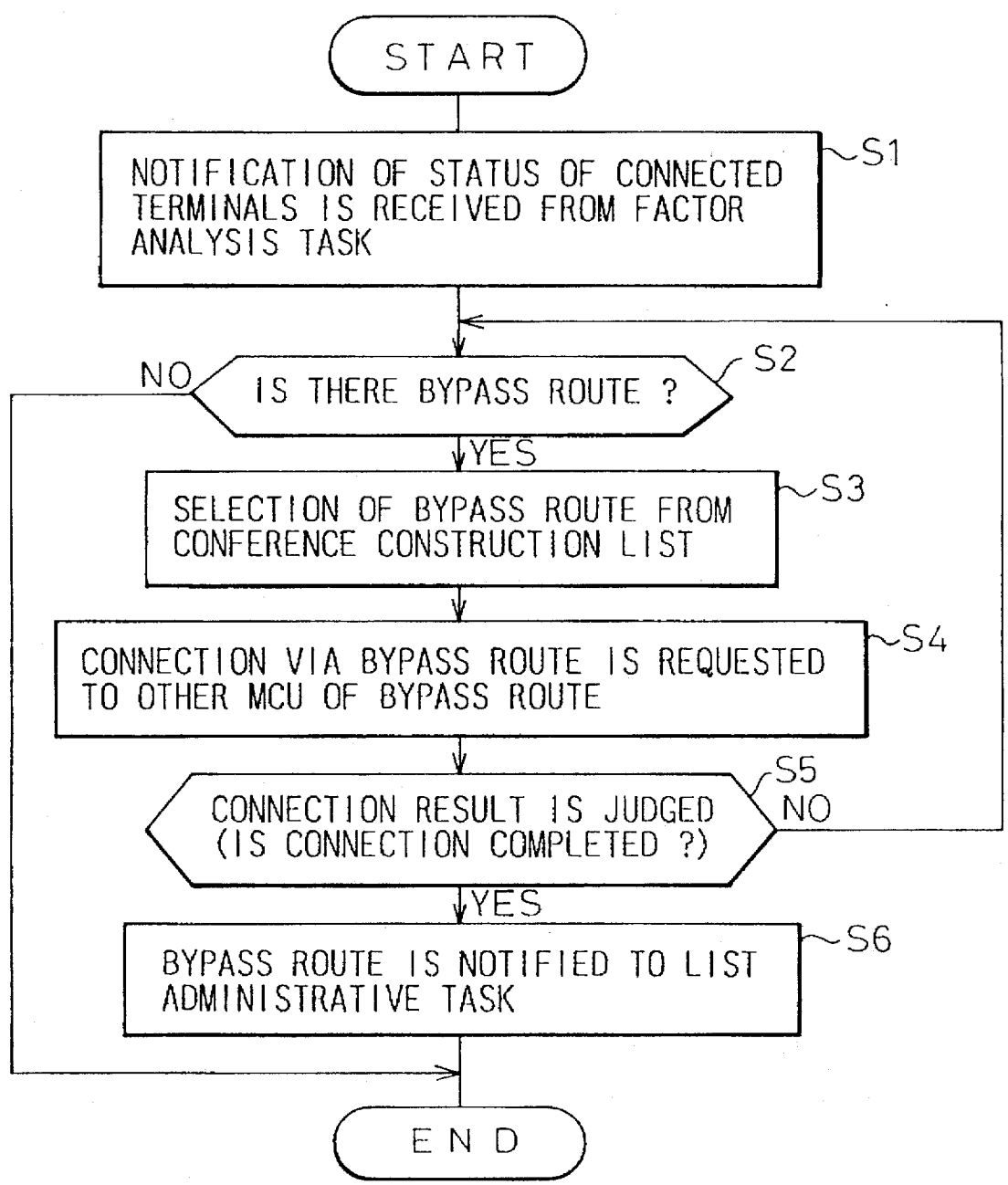
FIG. 35 is a flow chart of the processing of a cascade configuration administrative task.

When an intermediate MCU confirms that all the terminals connected under it have signed off, the list administrative unit 41 requests notification of the status of connected terminals to the adjoining MCUs and the MCUs at the two ends of the configuration. The notifications from the MCUs to which the requests were sent are analyzed by the factor analysis task 49 (see FIG. 34). Any notification of status of connected terminals is sent to the cascade configuration administrative task 48. The flow of processing of the cascade configuration management task is shown in FIG. 35. When the MCU receives a notification of status of connected terminals (S1 in FIG. 35), it judges if there are bypass routes (S2). If there are no bypass routes, the processing is ended. If there are bypass routes, it selects a bypass route from the conference configuration list (S3) and requests connection by the bypass route to the other MCU forming part of the bypass (S4).

In this case, it sends a call origination request to the MCU in question. The result of the call origination request is sent from the factor analysis task (FIG. 34) to the cascade configuration administrative task (FIG. 35). When the results of connection are received, the task judges the content (S5). If the connection is completed, it notifies the list administrative task of the bypass route (S6). If connection is not possible, it selects another bypass route.

Figure 36:
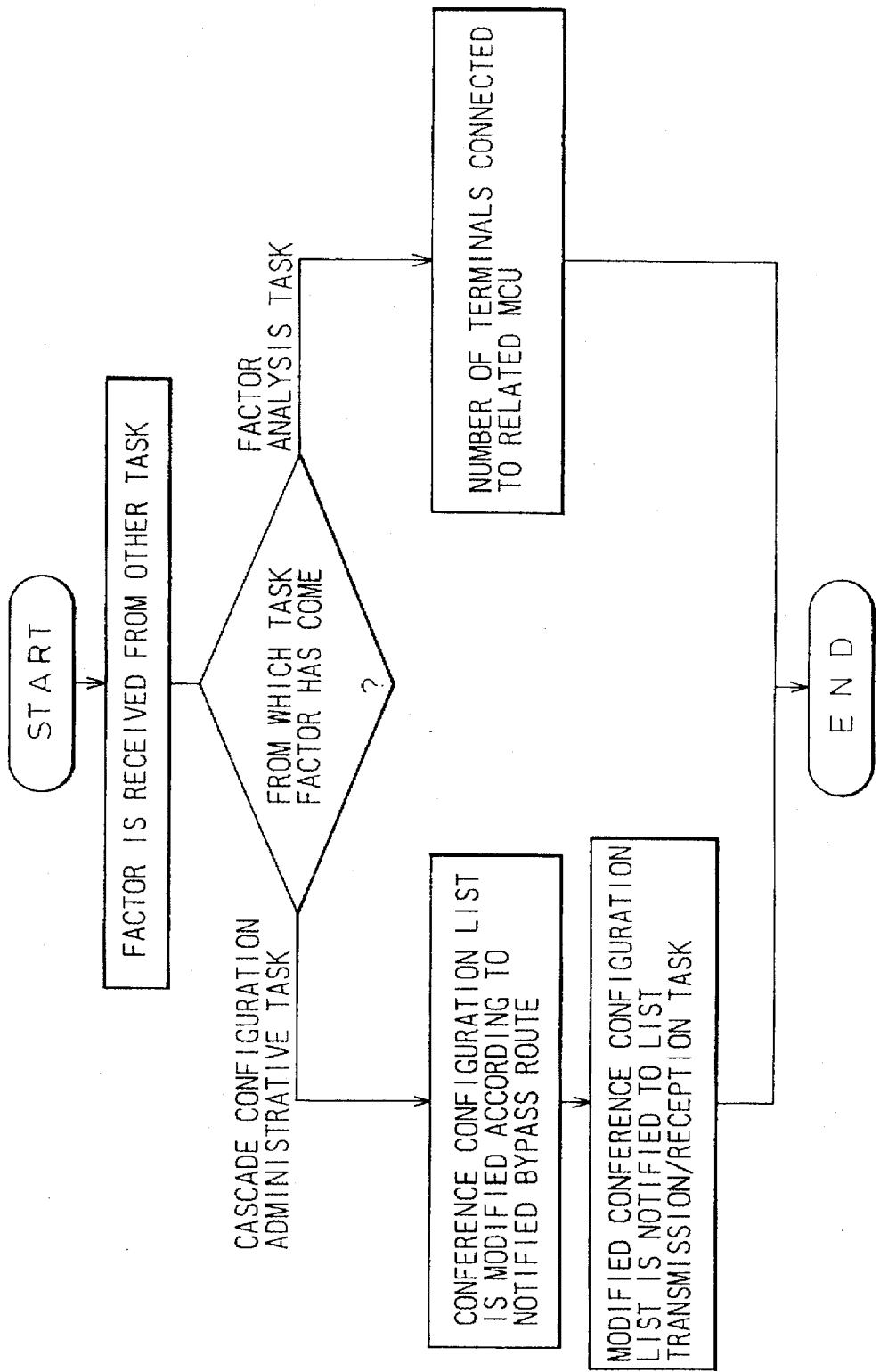
FIG. 36 is a flow chart of the processing of a list administrative task.

The list administrative task, as shown by the flow of processing of FIG. 36, identifies the task of the source of the factor. When the cascade configuration administrative task is the factor, it modifies the conference configuration list by the notified bypass route and sends the modified conference configuration list to the list transmission/reception task. The list transmission/reception task receives the request for transmission of the conference configuration list and sends the conference configuration list to the adjoining MCUs by the processing shown in FIG. 37.

After sending the conference configuration list, the list administrative task 41 requests the connection/disconnection administrative task 43 to disconnect its MCU. The connection/disconnection task 43 then sends a request for disconnection to the disconnection task and performs processing for disconnection of its MCU.

In this way, an intermediate MCU whose terminals have all signed off is automatically disconnected.

Figure 38:
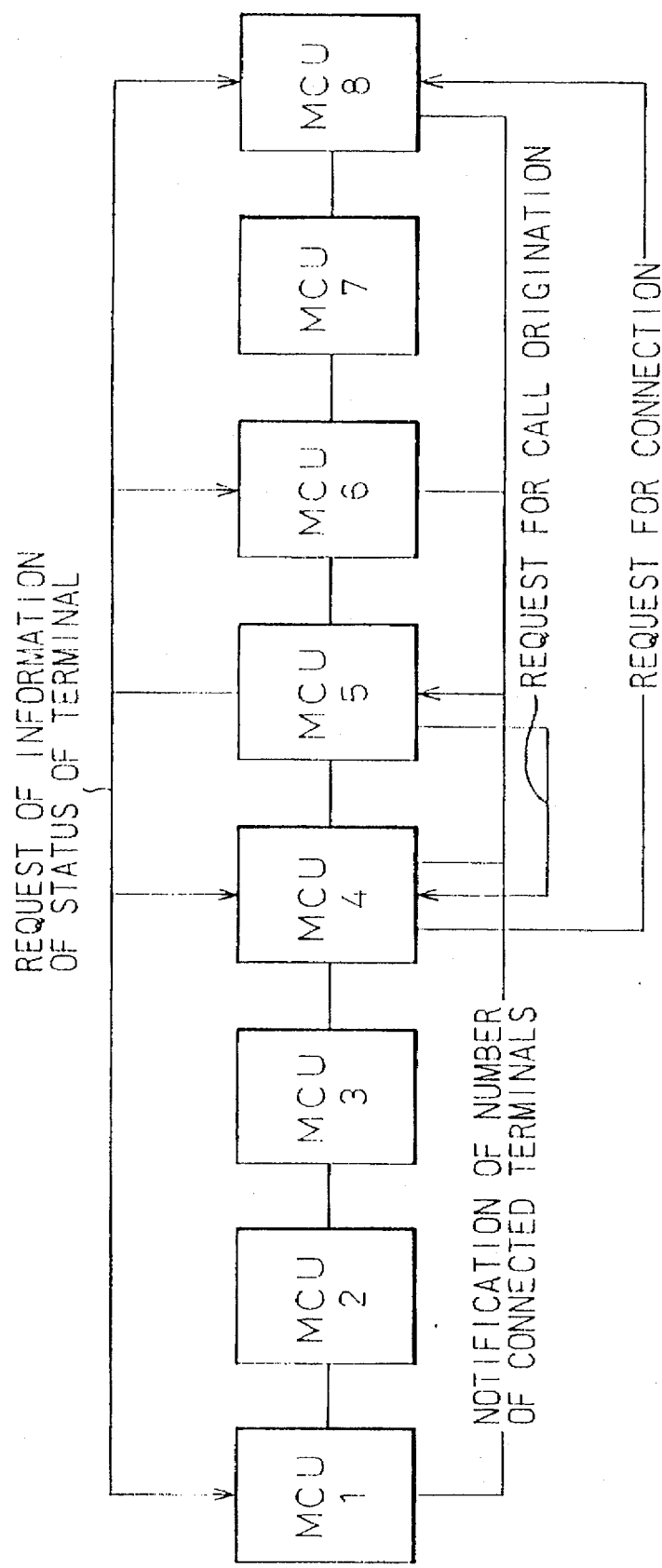
FIG. 38 is a view of a specific example of the automatic disconnection of an intermediate MCU whose terminals have all signed off.

A more concrete example of the automatic disconnection of an intermediate MCU whose terminals have all signed off as explained above is shown in FIG. 38. The sequence of operations is shown in FIG. 39.

Figure 37:
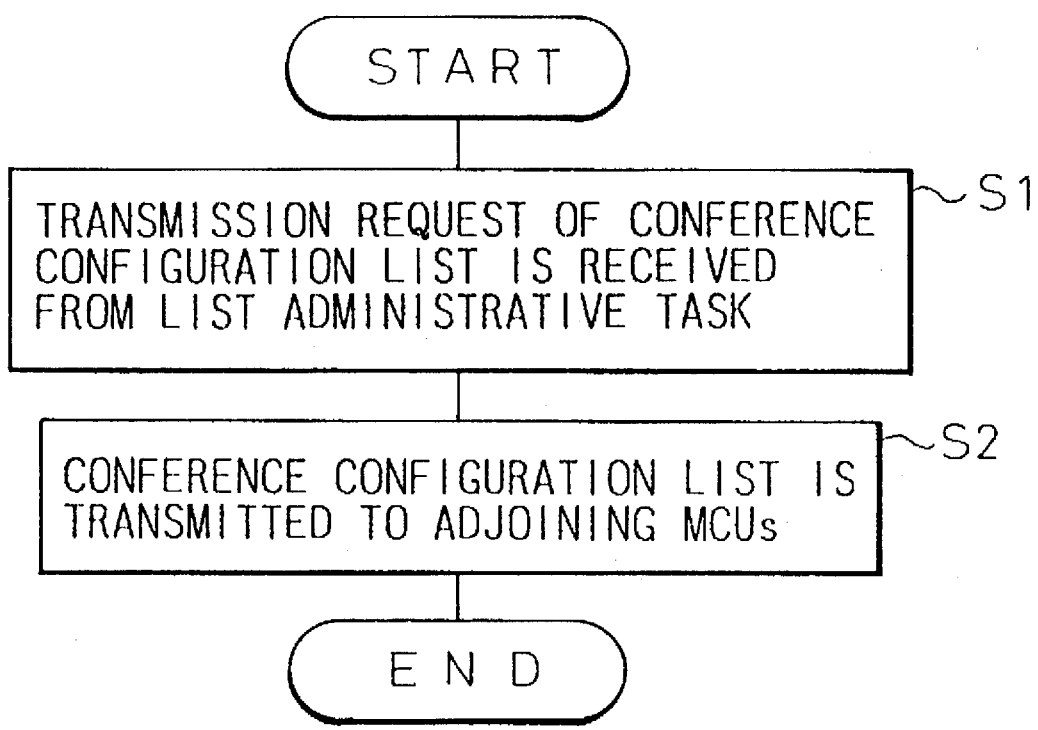
FIG. 37 is a flow chart of the processing of a list transmission/reception task.

The example of FIG. 37 is that of the case where all terminals connected to the MCU5 in a cascade configuration comprised of the MCU1 to MCU8 sign off. The operation will be explained below with reference to FIG. 39.

(1) to (1)''' The MCU5 whose terminals have all signed off sends a request for notification of the status of connected terminals to the MCU1 and MCU8 at the two ends of the cascade configuration and the MCU4 and MCU6 at its own two sides.

(2) to (2)''' MCUs receiving the request for notification of the status of connected terminals notify the MCU5 of the numbers of terminals under them.

(3) Using the statuses notified from the MCUs, the MCU5 automatically selects a bypass route and sends a request to the MCU4 on the bypass route for call origination to the MCU8.

(4) The MCU4 receives the call origination request and then performs processing for connection with the MCU8.

(5) After connection, it notifies the results to the MCU5.

(6) Receiving the results (connection completed), the MCU5 modifies the conference configuration list and sends it to all the other MCUs.

(7) After sending the list, it disconnects the line between the MCU4 and MCU6.

According to the first aspect of the present invention, since the multipoint conference system is realized by a cascade configuration, it is possible to automatically connect and disconnect lines between MCUs and connected television conference terminals from a single location. Further, it is possible to automatically disconnect from the cascade configuration any MCUs which have become unnecessary. This enables central administration and operation of the multipoint conference and enables multipoint conferences to be started and stopped quickly.

Further, due to the improved efficiency of the multipoint conference, it is possible to reduce line charges and to improve the performance of MCUs.

According to a second aspect of the present invention, in addition to the effects exhibited by the first aspect of the invention, it is possible to make effective use of the waiting time until reconnection to a MCU to which initial connection has failed at the time of constructing a cascade configuration so as to perform the connection processing, and the connection processing can be continued omitting the unconnectable MCUs from the cascade configuration, so it becomes possible to construct a cascade configuration more efficiently time-wise.

Further, disconnection of an MCU positioned in the middle of a current cascade configuration becomes possible, so there is no longer a need for connection of unnecessary lines even during a conference, and therefore there is no longer wasteful use of lines, units, and other resources.

We claim:

1. A system for connection and disconnection in a multipoint conference system of a cascade configuration, in which television conference terminals are connected through lines to multipoint connection units (MCUs) and a plurality of MCUs are connected through lines, wherein an MCU provided with an input unit prepares a call origination/disconnection table comprised of the numbers of the lines which an input administrative unit instructs to connect in accordance with the content of a list of line numbers of MCUs and terminals to engage in the conference from the input unit, a call origination/disconnection administrative unit is activated when the call origination/disconnection table is prepared, reads the call origination/disconnection table, drives a line administrative unit to call up and connect to the terminals of its MCU and other MCUs adjoining its MCU, and sends the call origination/disconnection table to the other MCUs when the lines to the other MCUs are established, and the other MCUs, receiving the call origination/disconnection table, call and connect the terminals under them and the unconnected adjoining MCUs based on the call origination/disconnection table.

2. A system for connection and disconnection in a multipoint conference system of a cascade configuration as set forth in claim 1, wherein a plurality of MCUs are automatically connected by inputting just the line numbers of the MCUs as the list of the line numbers.

3. A system for connection and disconnection in a multipoint conference system of a cascade configuration as set forth in claim 1, wherein specific MCUs and the terminals under them are connected by inputting the line numbers of the MCUs and their terminals as the list of the line numbers.

4. A system for connection and disconnection in a multipoint conference system, in which television conference terminals are connected through lines to multipoint connection units (MCUs) and a plurality of MCUs are connected in a cascade configuration through lines, wherein an MCU provided with an input unit prepares a call origination/disconnection table for requesting disconnection when a list of numbers of the lines of the MCUs and terminals to be disconnected is input together with a disconnection instruction from the input unit, a call origination/disconnection administrative unit is activated when the call origination/disconnection table is prepared, identifies the call origination/disconnection table, and sends the call origination/disconnection table to the terminals of its MCU and the other MCUs adjoining its MCU through established lines, the other MCUs read the call origination/disconnection table which has been sent, identify any other MCUs different from the MCUs at the side to which the call origination/disconnection table was input, and sends the call origination/disconnection table to the same, and the MCUs disconnect the lines to the terminals connected to themselves when the lines to the MCUs to which the call origination/disconnection table is sent are to be disconnected, wherein when an end MCU of a cascade configuration detects by a line administrative unit that all the terminals which had been connected to it during the conference have signed off, the line administrative unit issues a request to the call origination/disconnection administrative unit for disconnection of the lines with the adjoining MCUs and in response to that request, the call origination/disconnection administrative unit disconnects the lines with the MCU through the line administrative unit.

5. A system for connection and disconnection in a multipoint conference system of a cascade configuration, in which television conference terminals are connected through lines to multipoint connection units (MCUs) and a plurality of MCUs are connected through lines, wherein an MCU provided with an input unit prepares at an input administrative unit a connection list including the numbers of the lines of the MCUs and the terminals, the order of connection in accordance with the line numbers, and flag regions showing if the connections have been completed or are impossible, in accordance with the content of a list of line numbers of MCUs and terminals to engage in the conference from the input unit, when the connection list is prepared, a connection/disconnection administrative unit identifies the connection list, drives a line administrative unit to perform processing for connection to the terminals of its MCU and other MCUs adjoining its MCU, the connection/disconnection administrative unit writes the results of the connection processing at the line administrative unit in the above regions of the connection list and sends the connection list including the results of connection to the connected adjoining MCUs, and the adjoining MCUs identify the sent connection list and successively connect with the terminals and unconnected adjoining MCUs.

6. A system for connection and disconnection in a multipoint conference system of a cascade configuration as set forth in claim 5, wherein when said MCU tries to connect to another MCU by the line administrative unit in accordance with the connection list, but cannot connect, it writes the result of the connection processing in the connection list and connects to the next higher or lower MCU of the MCU it cannot connect to and, when connected, writes the result of the connection processing in the connection list and sends the connection list including the result of the connection processing to the connected MCU.

7. A system for connection and disconnection in a multipoint conference system of a cascade configuration as set forth in claim 5, wherein an end MCU written on the connection list is provided with a means for sending a connection list including results of connection processing to the origination MCU which prepared the connection list when it identifies from the connection list received from the adjoining MCU that it is an end MCU, performs processing for connecting with its terminals, and writes the results of the connection processing, and when receiving the connection list from one or two end MCUs, the origination MCU identifies the connection flags and orders of connection, prepares a conference configuration list in which the MCU numbers are arranged in order of connection, and notifies the same to all other MCUs which are connected.

8. A system for connection and disconnection in a multipoint conference system of a cascade configuration, wherein an origination MCU receives a connection list from one or two ends MCUs, identifies the connection flags and orders of connection, and prepares a conference configuration list in which the MCU numbers are arranged in order of connection and wherein the MCUs are all provided with the thus prepared conference configuration list in proceeding with the conference, wherein

- an MCU positioned in the middle of the cascade configuration notifies the origination MCU when all terminals under it sign off during the conference,
- when receiving the notification of sign-off, the origination MCU sends to the related MCUs a request for the status of connected terminals and receives from the MCUs the information on the status of disconnected terminals, and
- when the input unit of the origination MCU issues a call origination request designating another MCU for performing bypass connection of an MCU whose terminals have signed off and completes the connection, it sends the MCU whose terminals have signed off a request for disconnection to cause it to perform disconnection processing.

9. A system for connection and disconnection in a multipoint conference system of a cascade configuration, wherein an origination MCU receives a connection list from one or two ends MCUs, identifies the connection flags and orders of connection, and prepares a conference configuration list in which the MCU numbers are arranged in order of connection and wherein the MCUs are all provided with the thus prepared conference configuration list in proceeding with the conference, wherein

- when all terminals of an MCU positioned in the middle of the cascade configuration sign off during the conference,
- the MCU whose terminals have signed off sends a request for notification of the connected terminals to the adjoining MCUs and the MCUs at their two ends and, when receiving the notification from the requested MCUs, refers to the conference configuration list, determines a bypass route, and sends a call origination request to the MCUs concerned,
- identifies the results of the call origination request and, when finding that the connections have been completed, prepares a new conference configuration list based on the connected bypass and sends the new conference configuration list to the other MCUs and
- disconnects itself after sending the conference configuration list.

* * * * *